(12) United States Patent
Sadeghi et al.

(10) Patent No.: US 12,537,178 B2
(45) Date of Patent: Jan. 27, 2026

(54) INTEGRATED HARDWARE-SOFTWARE COMPUTER VISION SYSTEM FOR AUTONOMOUS CONTROL AND INSPECTION OF SUBSTRATE PROCESSING SYSTEMS

(71) Applicant: LAM RESEARCH CORPORATION, Fremont, CA (US)

(72) Inventors: Hossein Sadeghi, San Jose, CA (US); Scott Baldwin, Reston, VA (US); Andrew D. Bailey, III, Milpitas, CA (US)

(73) Assignee: LAM RESEARCH CORPORATION, Fremont, CA (US)

( * ) Notice: Subject to any disclaimer, the term of this patent is extended or adjusted under 35 U.S.C. 154(b) by 844 days.

(21) Appl. No.: 17/629,014

(22) PCT Filed: Jul. 22, 2020

(86) PCT No.: PCT/US2020/042954
§ 371 (c)(1),
(2) Date: Jan. 21, 2022

(87) PCT Pub. No.: WO2021/021501
PCT Pub. Date: Feb. 4, 2021

(65) Prior Publication Data
US 2022/0270901 A1    Aug. 25, 2022

Related U.S. Application Data

(60) Provisional application No. 62/879,741, filed on Jul. 29, 2019.

(51) Int. Cl.
*H01J 37/32* (2006.01)
*G05B 19/418* (2006.01)
(Continued)

(52) U.S. Cl.
CPC .. *H01J 37/32935* (2013.01); *G05B 19/41875* (2013.01); *G06V 10/56* (2022.01);
(Continued)

(58) Field of Classification Search
CPC ......... H01J 37/32935; G05B 19/41875; G05B 2219/32368; G05B 19/056; G06V 10/56;
(Continued)

(56) References Cited

U.S. PATENT DOCUMENTS

2003/0198376 A1    10/2003   Sadighi et al.
2005/0031187 A1    2/2005    Lin et al.
(Continued)

FOREIGN PATENT DOCUMENTS

CN    106920276 A    7/2017
JP    2005525709 A   8/2005
(Continued)

OTHER PUBLICATIONS

International Search Report and Written Opinion of the ISA issued in PCT/US2020/042954, mailed Nov. 5, 2020; ISA/KR.
(Continued)

*Primary Examiner* — Kidest Bahta

(57) ABSTRACT

A substrate processing system comprises an edge computing device including processor that executes instructions stored in a memory to process an image or video captured by camera(s) of at least one of a substrate and a component of the substrate processing system. The component is associated with a robot transporting the substrate between processing chambers of the substrate processing system or between the substrate processing system and a second substrate processing system. The cameras are located along a travel path of the substrate. The instructions configure the processor to transmit first data from the image to a remote server via a network and to receive second data from the
(Continued)

remote server via the network in response to transmitting the first data to the remote server. The instructions configure the processor to operate the substrate processing system according to the second data in an automated or autonomous manner.

19 Claims, 42 Drawing Sheets

(51) Int. Cl.
*G06V 10/56* (2022.01)
*G06V 20/52* (2022.01)
*H01L 21/67* (2006.01)
*H01L 21/687* (2006.01)

(52) U.S. Cl.
CPC ........ *G06V 20/52* (2022.01); *H01L 21/67253* (2013.01); *G05B 2219/32368* (2013.01); *H01L 21/67167* (2013.01); *H01L 21/67173* (2013.01); *H01L 21/68707* (2013.01)

(58) Field of Classification Search
CPC ................ G06V 20/52; G06V 2201/06; H01L 21/67253; H01L 21/67167; H01L 21/67173; H01L 21/68707; H01L 21/67161; H01L 21/67184; H01L 21/67276; H01L 21/67742
See application file for complete search history.

(56) References Cited

U.S. PATENT DOCUMENTS

| | | | | |
|---|---|---|---|---|
| 2005/0099637 | A1* | 5/2005 | Kacyra | G01B 11/002 356/601 |
| 2009/0314205 | A1* | 12/2009 | Patalay | G02B 23/2492 118/713 |
| 2014/0176701 | A1* | 6/2014 | Okuno | H01L 21/67742 348/125 |
| 2016/0202050 | A1 | 7/2016 | Lee et al. | |
| 2016/0216185 | A1* | 7/2016 | Gottscho | H01J 37/3299 |
| 2017/0117170 | A1* | 4/2017 | Wong | H01L 21/67369 |
| 2017/0263478 | A1* | 9/2017 | MccChesney | H01J 37/20 |
| 2019/0120775 | A1 | 4/2019 | Sawlani et al. | |

FOREIGN PATENT DOCUMENTS

| | | |
|---|---|---|
| JP | 2006228966 A | 8/2006 |
| JP | 2012216614 A | 11/2012 |
| JP | 2016154224 A | 8/2016 |
| JP | 2017098540 A | 6/2017 |
| JP | 2018026558 A | 2/2018 |
| KR | 100728414 B1 | 6/2007 |
| KR | 101841668 B1 | 3/2018 |
| TW | 201919142 A | 5/2019 |
| WO | WO-2018072433 A1 | 4/2018 |
| WO | WO-2018222430 A2 | 12/2018 |

OTHER PUBLICATIONS

Taiwanese Office Action for Taiwanese Application No. 109125238 issued on Jan. 4, 2024.
Japanese Office Action for Japanese Application No. 2022-506066 mailed Jul. 30, 2024.
Chinese Office Action for Chinese Application No. 202080068163.7 dated May 29, 2025.
Korean Office Action for Korean Application No. 10-2022-7006731 dated Jul. 15, 2025.
Chinese Office Action and Search Report for Chinese Application No.

* cited by examiner

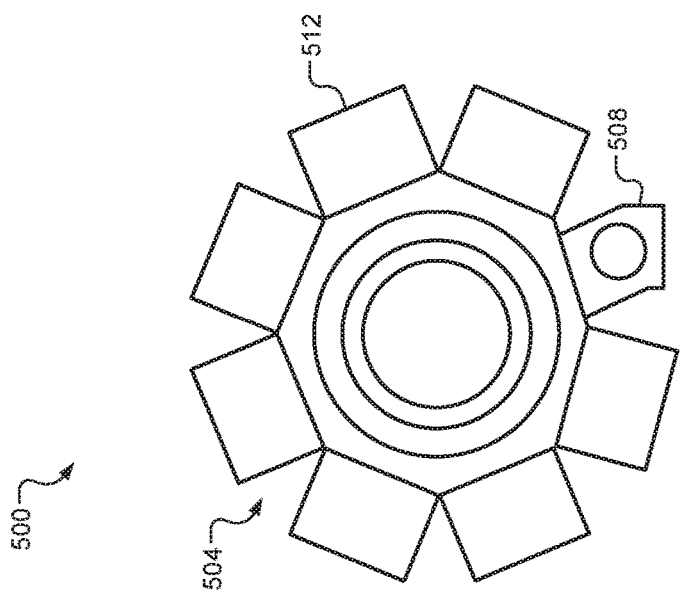
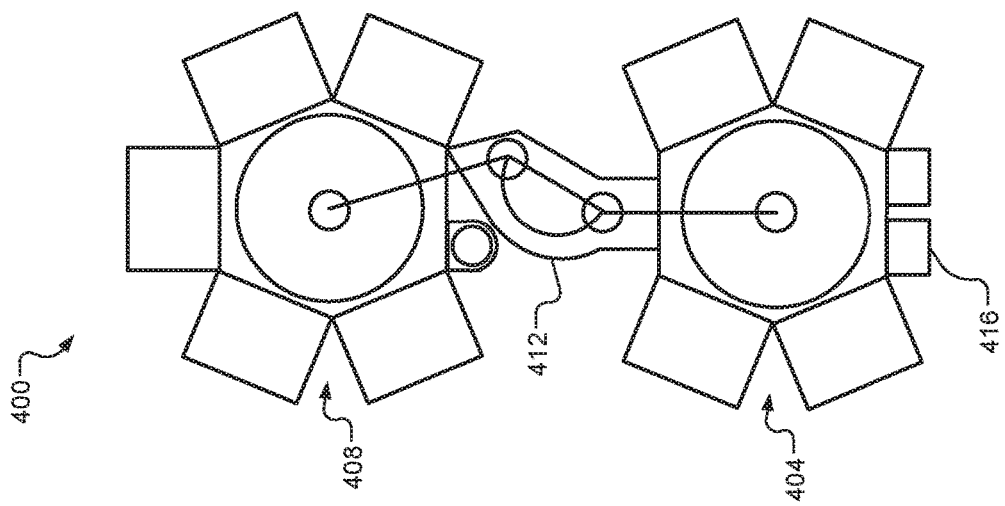
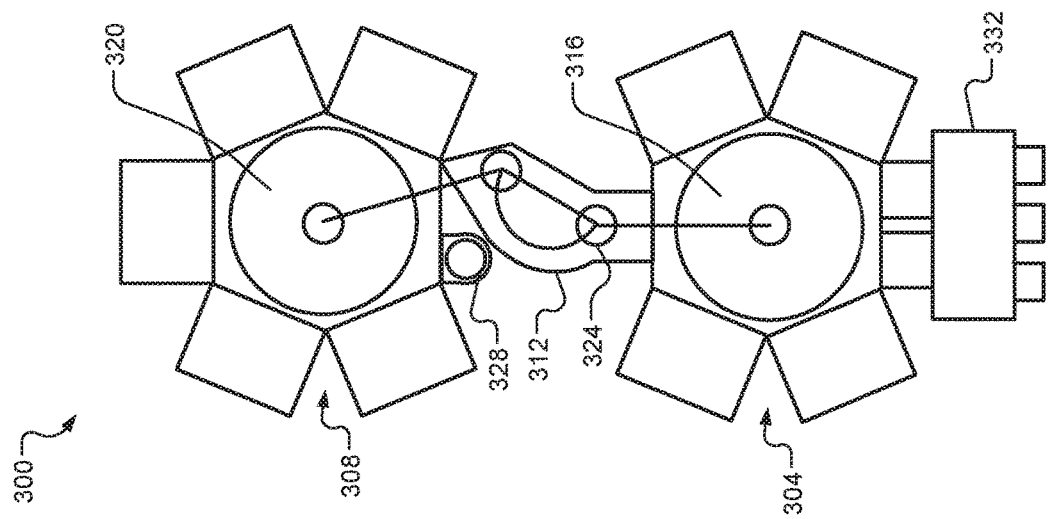
FIG. 3C
FIG. 3B
FIG. 3A

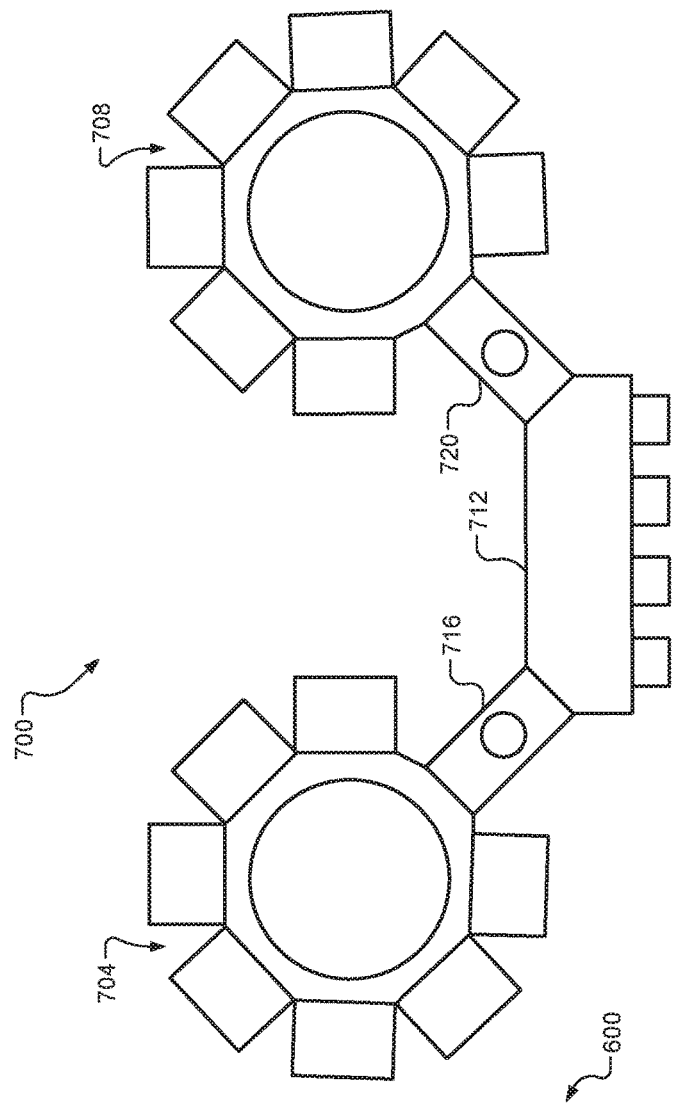
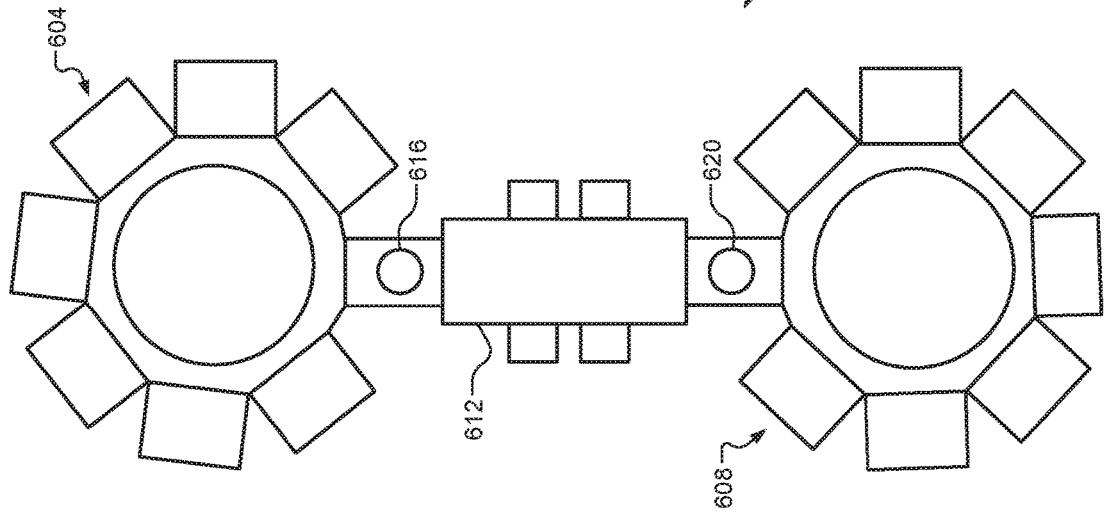
FIG. 3E
FIG. 3D

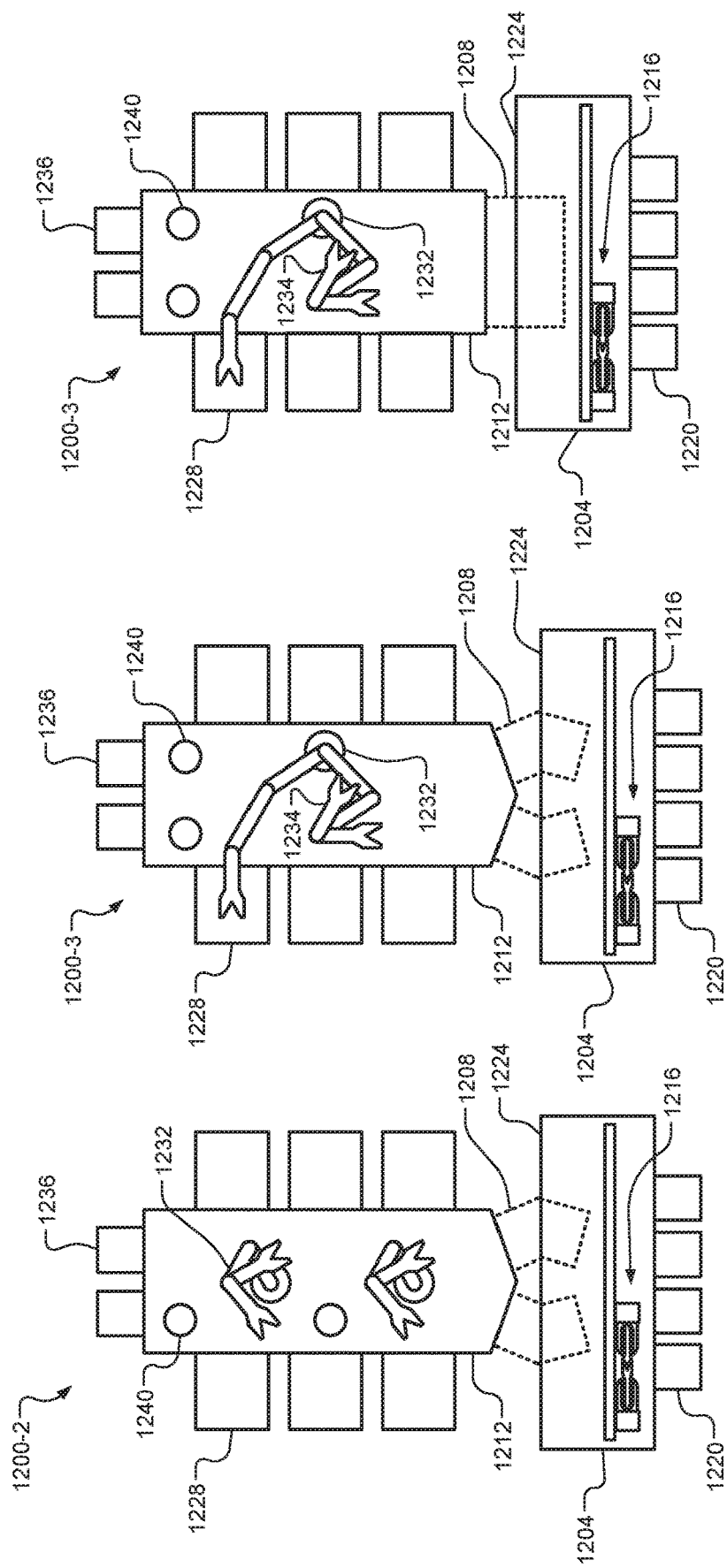

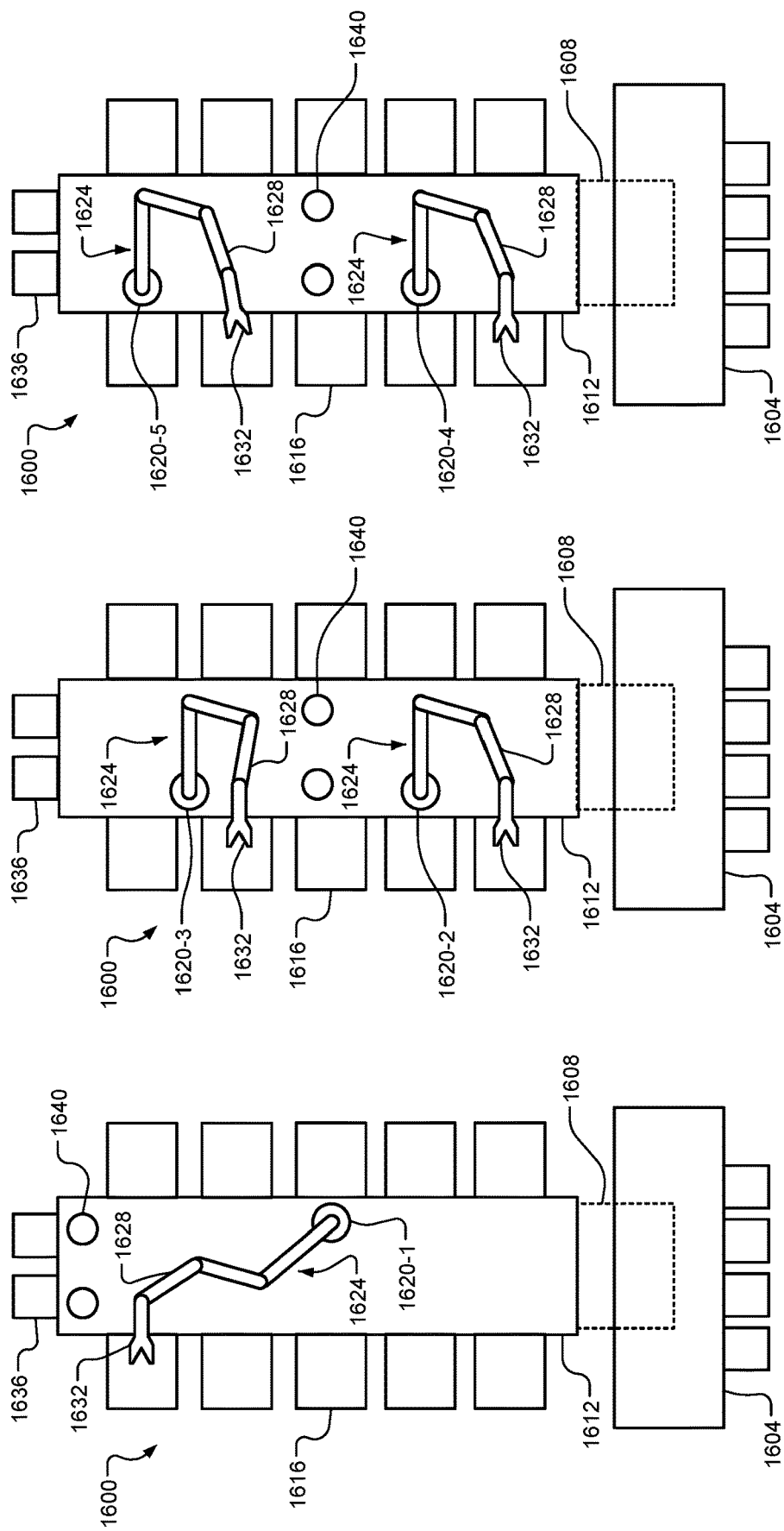

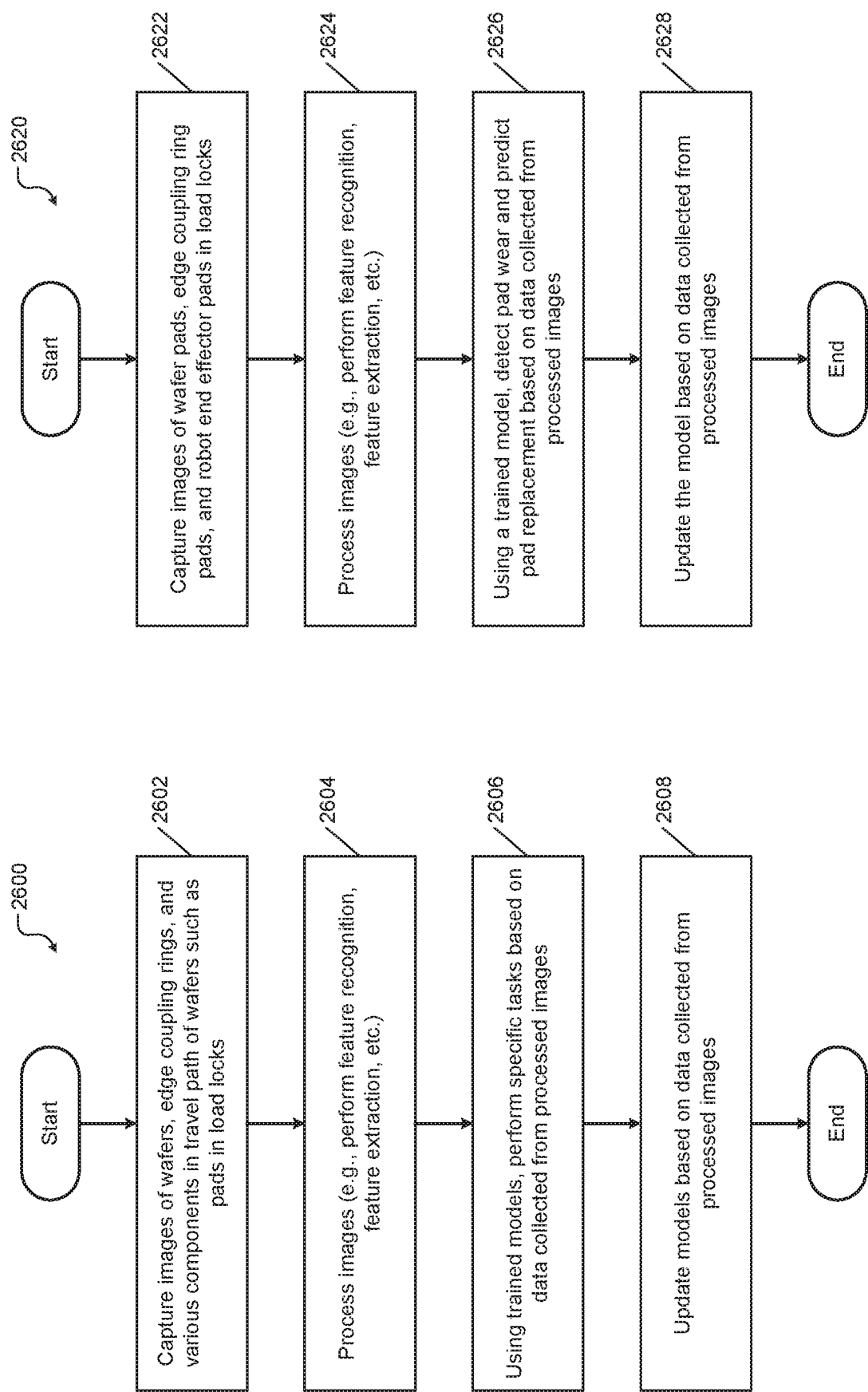

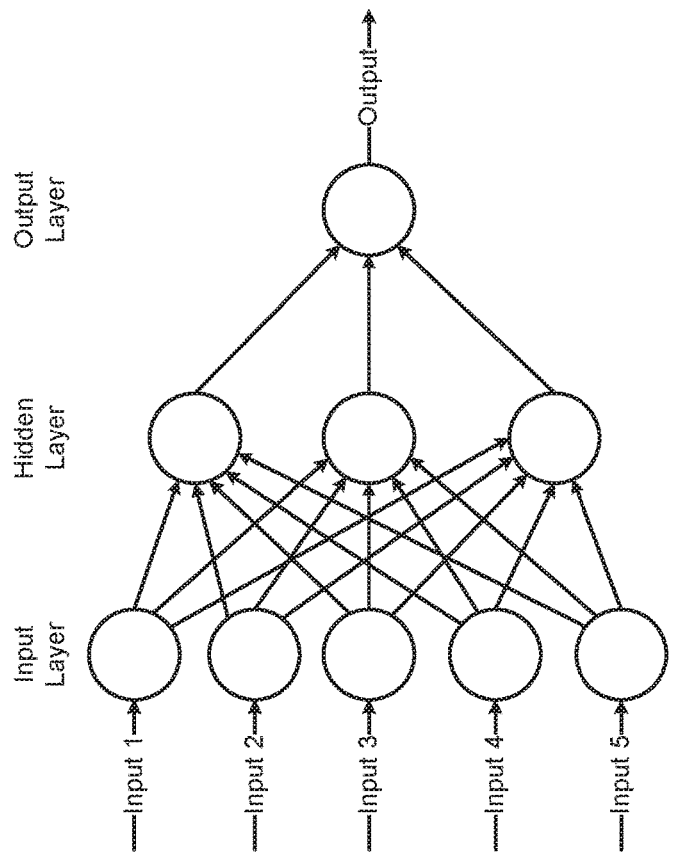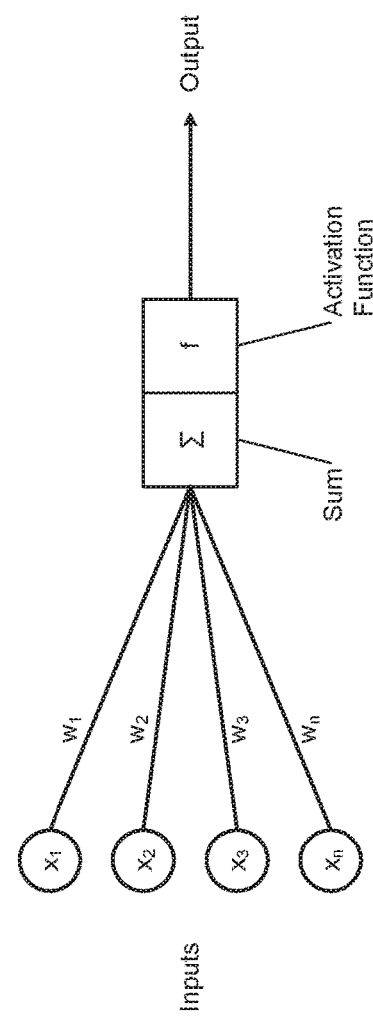
FIG. 16A
FIG. 16B

Triangulation

$$\frac{x'_1}{x_1} = \frac{f}{z_1}$$

$$\frac{x'_2}{x_1+d_x} = \frac{f}{z_1+d_z}$$

$$z_1 = \frac{f d_x - x'_2 d_z}{x'_2 - x'_1}$$

$$x_1 = \frac{x'_1}{f} z_1$$

$$y_1 = \frac{y'_1}{f} z_1$$

INTEGRATED HARDWARE-SOFTWARE COMPUTER VISION SYSTEM FOR AUTONOMOUS CONTROL AND INSPECTION OF SUBSTRATE PROCESSING SYSTEMS

CROSS-REFERENCE TO RELATED APPLICATIONS

This application is a U.S. National Phase Application under 35 U.S.C. 371 of International Application No. PCT/US2020/042954, filed on Jul. 22, 2020, which claims the benefit of U.S. Provisional Application No. 62/879,741, filed on Jul. 29, 2019. The entire disclosures of the applications referenced above are incorporated herein by reference.

FIELD

The present disclosure relates generally to substrate processing systems and more particularly to an integrated computer vision system for real-time in-situ inspection and control of substrate processing systems.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A substrate processing system typically includes a plurality of processing chambers (also called process modules) to perform deposition, etching, and other treatments of substrates such as semiconductor wafers. Examples of processes that may be performed on a substrate include, but are not limited to, a plasma enhanced chemical vapor deposition (PECVD) process, a chemically enhanced plasma vapor deposition (CEPVD) process, and a sputtering physical vapor deposition (PVD) process. Additional examples of processes that may be performed on a substrate include, but are not limited to, etching (e.g., chemical etching, plasma etching, reactive ion etching, etc.) and cleaning processes.

During processing, a substrate is arranged on a substrate support such as a pedestal, an electrostatic chuck (ESC), and so on in a processing chamber of the substrate processing system. During deposition, gas mixtures including one or more precursors are introduced into the processing chamber, and plasma is struck to activate chemical reactions. During etching, gas mixtures including etch gases are introduced into the processing chamber, and plasma is struck to activate chemical reactions. A computer-controlled robot typically transfers substrates from one processing chamber to another in a sequence in which the substrates are to be processed.

SUMMARY

A substrate processing system comprises a processor and a memory storing instructions for execution by the processor to process an image captured by a camera of at least one of a substrate and a component of the substrate processing system. The component is associated with transporting the substrate between processing chambers of the substrate processing system or between the substrate processing system and a second substrate processing system. The camera is located along a travel path of the substrate in the substrate processing system between the processing chambers. The instructions further configure the processor to transmit first data from the image to a remote server via a network and to receive second data from the remote server via the network in response to transmitting the first data to the remote server. The instructions further configure the processor to operate the substrate processing system according to the second data.

In other features, in response to the image being of the component and the component including a pad located in a load lock of the substrate processing system, the pad being used to support the substrate, an edge coupling ring associated with the substrate, or a robot transporting the substrate, the second data includes one or more of the following: an indication of a condition of the pad; and a recommendation regarding one or more of service and replacement of the pad. The instructions further cause the processor to generate a schedule for one or more of servicing and replacing the pad in response to the second data including the recommendation regarding one or more of service and replacement of the pad.

In other features, in response to the image being of the substrate and the substrate being used during cleaning of one of the processing chambers in the substrate processing system, the second data includes one or more of the following: an indication that the substrate is of a type that is used during cleaning of the one of the processing chambers in the substrate processing system; an indication of a condition of the substrate; a recommendation regarding replacement of the substrate; and a recommendation regarding selecting a recipe in the one of the processing chambers. The instructions further cause the processor to select the recipe in the one of the processing chambers in response to the second data including the recommendation regarding selecting the recipe.

In other features, in response to the image being of the substrate, the second data includes one or more of the following: an indication of a type of the substrate; and an indication for selecting a recipe for processing the substrate. The instructions further cause the processor to select the recipe for processing the substrate in response to the second data including the indication regarding selecting the recipe.

In other features, in response to the image being of the substrate, the second data includes one or more of the following: an indication of a type of the substrate; an indication of a process performed on the substrate in one of the processing chambers; an indication of a condition of the one of the processing chambers that processed the substrate; and an indication for selecting a recipe for cleaning the one of the processing chambers that processed the substrate. The instructions further cause the processor to schedule service for the one of the processing chambers in response to the second data including the indication of the condition of the one of the processing chambers. The instructions further cause the processor to select the recipe for cleaning the one of the processing chambers that processed the substrate in response to the second data including the indication regarding selecting the recipe.

In other features, in response to the image being of the substrate captured by the camera located in a load lock of the substrate processing system, the second data includes one or more of the following: an indication of a drift in placement of the substrate in the load lock by a robot transporting the substrate from one of the processing chambers that processed the substrate; and a recommendation regarding servicing the robot or the one of the processing chambers that processed the substrate. The instructions further cause the processor to generate a schedule for servicing the robot in response to the second data including the recommendation regarding servicing the robot. The instructions further cause the processor to perform an adjustment in the one of the processing chambers relating to releasing the substrate to the robot in response to the second data including the recommendation regarding servicing the one of the processing chambers that processed the substrate.

In other features, in response to the image being of the component and the component being an edge coupling ring associated with the substrate received from one of the processing chambers, the second data includes one or more of the following: a serial number of the edge coupling ring; and a recommendation regarding replacing the edge coupling ring with a second edge coupling ring having a correct serial number for the one of the processing chambers. The instructions further cause the processor to generate a schedule for replacing the edge coupling ring with the second edge coupling ring having the correct serial number for the one of the processing chambers in response to the second data including the recommendation.

In other features, in response to the image being of the component and the component being an edge coupling ring associated with the substrate received from one of the processing chambers, the second data includes one or more of the following: an indication that the edge coupling ring is incorrect; an indication that a problem associated with processing the substrate is due to the edge coupling ring being incorrect; and a recommendation to replace the edge coupling ring with a correct edge coupling ring for the one of the processing chambers. The instructions further cause the processor to generate a schedule for replacing the edge coupling ring with the correct edge coupling ring for the one of the processing chambers in response to the second data including the recommendation.

In other features, in response to the image being of the component and the component being an edge coupling ring associated with the substrate received from one of the processing chambers, the second data includes one or more of the following: an indication of an etch rate in the one of the processing chambers; and an indication of an adjustment for a recipe used in the one of the processing chambers. The instructions further cause the processor to adjust the recipe used in the one of the processing chambers in response to the second data including the indication regarding the adjustment.

In other features, in response to the image being of the component and the component being an edge coupling ring associated with the substrate received from one of the processing chambers, the second data includes the following: an indication to adjust at least one of the edge coupling ring and a recipe used in the one of the processing chambers in response to the edge coupling ring being correct for the one of the processing chambers, the processing chambers using the same recipe, and the edge coupling ring exhibiting a different change than edge coupling rings in other processing chambers in the substrate processing system. The instructions further cause the processor to adjust at least one of the edge coupling ring and the recipe used in the one of the processing chambers.

In still other features, a system comprises a processor and a memory storing instructions for execution by the processor to receive, via a network, data from an image captured by a camera of at least one of a substrate and a component of a substrate processing system. The component is associated with transporting the substrate between processing chambers of the substrate processing system or between the substrate processing system and a second substrate processing system. The camera is located along a travel path of the substrate in the substrate processing system between the processing chambers. The instructions further configure the processor to input a portion of the data to a model trained to provide an output useful for operating the substrate processing system and to transmit the output from the model to the substrate processing system via the network.

In other features, in response to the image being of the component and the component including a pad located in a load lock of the substrate processing system, the pad being used to support the substrate, an edge coupling ring associated with the substrate, or a robot transporting the substrate, the output of the model indicates a condition of the pad and includes a recommendation regarding one or more of service and replacement of the pad.

In other features, in response to the image being of the substrate and the substrate being used during cleaning of one of the processing chambers in the substrate processing system, the output of the model includes one or more of the following: an indication that the substrate is of a type that is used during cleaning of the one of the processing chambers in the substrate processing system; an indication of a condition of the substrate; a recommendation regarding replacement of the substrate; and a recommendation regarding selecting a recipe in the one of the processing chambers.

In other features, in response to the image being of the substrate, the output of the model includes one or more of the following: an indication of a type of the substrate; and an indication for selecting a recipe for processing the substrate.

In other features, in response to the image being of the substrate, the output of the model includes one or more of the following an indication of a type of the substrate; an indication of a process performed on the substrate in one of the processing chambers; an indication of a condition of the one of the processing chambers that processed the substrate; and an indication for selecting a recipe for cleaning the one of the processing chambers that processed the substrate.

In other features, in response to the image being of the substrate captured by the camera located in a load lock of the substrate processing system, the output of the model includes one or more of the following: an indication of a drift in placement of the substrate in the load lock by a robot transporting the substrate from one of the processing chambers that processed the substrate; and a recommendation regarding servicing the robot or the one of the processing chambers that processed the substrate.

In other features, in response to the image being of the component and the component being an edge coupling ring associated with the substrate received from one of the processing chambers, the output of the model includes one or more of the following: a serial number of the edge coupling ring; and a recommendation regarding replacing the edge coupling ring with a second edge coupling ring having a correct serial number for the one of the processing chambers.

In other features, in response to the image being of the component and the component being an edge coupling ring associated with the substrate received from one of the processing chambers, the output of the model includes one or more of the following: an indication that the edge coupling ring is incorrect; an indication that a problem associated with processing the substrate is due to the edge coupling ring being incorrect; and a recommendation to replace the edge coupling ring with a correct edge coupling ring for the one of the processing chambers.

In other features, in response to the image being of the component and the component being an edge coupling ring associated with the substrate received from one of the processing chambers, the output of the model includes one or more of the following: an indication of an etch rate in the one of the processing chambers; and an indication of an adjustment for a recipe used in the one of the processing chambers.

In other features, in response to the image being of the component and the component being an edge coupling ring associated with the substrate received from one of the processing chambers, the output of the model includes the following: an indication to adjust at least one of the edge coupling ring and a recipe used in the one of the processing chambers in response to the edge coupling ring being correct for the one of the processing chambers, the processing chambers using the same recipe, and the edge coupling ring exhibiting more change than edge coupling rings in other processing chambers in the substrate processing system.

In still other features, a system comprises a processor and a memory storing instructions for execution by the processor to receive data from one or more cameras arranged in a substrate processing system. The substrate processing system comprises a plurality of process modules and a robot configured to transport substrates between the process modules and between the substrate processing system and a second substrate processing system. The instructions cause the processor to automatically configure the substrate processing system based on the data received from the one or more cameras arranged in the substrate processing system.

In other features, the instructions cause the processor to automatically identify one or more subsystems installed in the substrate processing system based on the data received from the one or more cameras and to automatically configure the substrate processing system based on the identified subsystems.

In other features, the instructions cause the processor to automatically identify one or more subsystems installed in the substrate processing system based on the data received from the one or more cameras and to automatically configure a user interface of the substrate processing system based on the identified subsystems.

In other features, the instructions cause the processor to automatically configure the substrate processing system based on the data received from the one or more cameras in response to the substrate processing system being powered on.

In other features, the instructions cause the processor to automatically configure the substrate processing system based on the data received from the one or more cameras in response to the substrate processing system being serviced.

In other features, the instructions cause the processor to automatically identify, based on the data received from the one or more cameras, a subsystem or a component of the subsystem that is added, and to automatically configure the substrate processing system based on the identified subsystem or the component of the subsystem that is added.

In other features, the instructions cause the processor to automatically identify, based on the data received from the one or more cameras, a subsystem or a component of the subsystem that is removed, and to automatically configure the substrate processing system based on the identified subsystem or the component of the subsystem that is removed.

In still other features, a system comprises a processor and a memory storing instructions for execution by the processor to receive data from one or more cameras arranged in a substrate processing system. The substrate processing system comprises a plurality of process modules and a robot configured to transport substrates between the process modules and between the substrate processing system and a second substrate processing system. The instructions cause the processor to automatically identify a status of one or more subsystems in the substrate processing system based on the data received from the one or more cameras arranged in the substrate processing system.

In other features, the data received from the one or more cameras includes video data, and the instructions cause the processor to automatically identify the status of one or more subsystems by processing the video data in real time.

In other features, the instructions cause the processor to automatically identify and track movement of an object in the substrate processing system based on the data received from the one or more cameras and to automatically identify the status of one or more subsystems in the substrate processing system based on the movement of the object in the substrate processing system. The object includes the robot, one of the substrates, an edge coupling ring used with the substrates, a door of one of the process modules, a door of a load lock module of the substrate processing system, or a door of a load port module of the substrate processing system.

In other features, in response to the status being an error, the instructions cause the processor to automatically correct the error based on the data received from the one or more cameras.

In other features, the processor is configured to communicate with a remote computing device via a network, and in response to the status being an error, the instructions cause the processor to automatically correct the error based on data received from the remote computing device via the network.

In other features, the processor is configured to communicate the data received from the one or more cameras to a remote computing device via a network, and the instructions cause the processor to allow the remote computing device to control the substrate processing system via the network based on the data received from the one or more cameras.

In other features, the processor is configured to communicate with a remote computing device via a network, and the instructions cause the processor to allow the remote computing device to control the substrate processing system and to disallow manual control of the substrate processing system while the remote computing device controls the substrate processing system via the network.

In other features, the processor is configured to communicate with a remote computing device via a network, and the instructions cause the processor to disallow the remote computing device from controlling the substrate processing system while the substrate processing system is being manually controlled.

In other features, in response to the status being an error associated with one of the subsystems, the instructions cause the processor to automatically disable the one of the subsystems.

In still other features, a system comprises a processor and a memory storing instructions for execution by the processor to receive data captured from an edge coupling ring by a single camera arranged in a substrate processing system, process the data using triangulation to generate a three-dimensional point cloud representing a thickness profile of the edge coupling ring, and determine an amount of erosion of the edge coupling ring based on the thickness profile.

In other features, the instructions cause the processor to determine whether the amount of erosion is greater than or equal to a predetermined threshold and to generate an indication of the amount of erosion.

In other features, the instructions cause the processor to determine the amount of erosion by comparing the thickness profile to a prior thickness profile generated from a prior three-dimensional point cloud created when the edge coupling ring is first installed in the substrate processing system.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 3A-3I show various example configurations of the substrate processing tools;

FIGS. 5A through 5D show plan views of various example configurations of the substrate processing tools according to certain features of the present disclosure;

FIGS. 6A through 6C show plan views of example configurations of the substrate processing tools according to certain features of the present disclosure.

FIGS. 13A-13F show example flowcharts of methods performed in a tool using the trained models based on images captured during production;

FIGS. 16A and 16B show graphical representations of example recurrent neural networks used to generate the models;

In the drawings, reference numbers may be reused to identify similar and/or identical elements.

DETAILED DESCRIPTION

Figure 2:
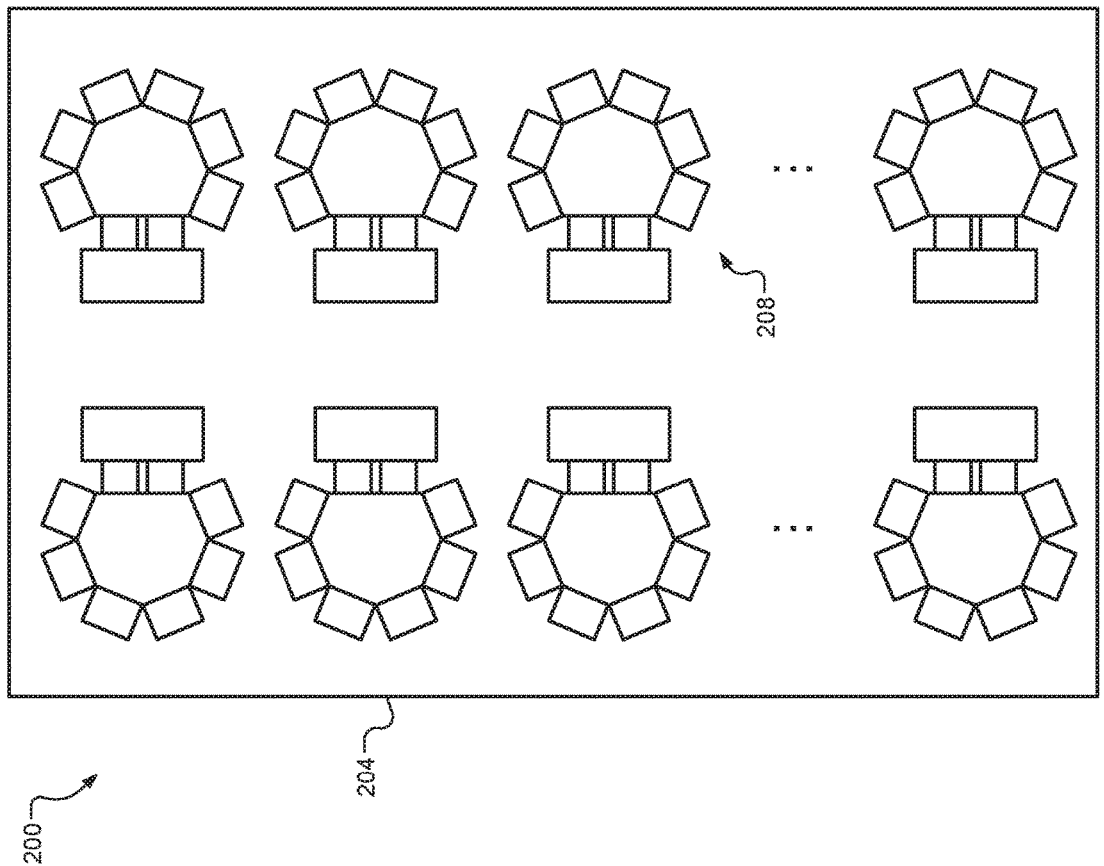
FIG. 2 shows an example arrangement of the substrate processing tools in a fabrication facility.

The present disclosure relates to systems and methods that capture images of substrates such as semiconductor wafers (hereinafter wafers) and of portions of surrounding apparatus where the wafers are temporarily parked while being transported between process modules and/or between tools (e.g., in airlocks). The images are processed for feature recognition and feature extraction. The images are captured and processed for a period of time to generate data that is used to train various models using machine learning. The trained models are then used to determine health of the process modules, tools, and components thereof, and to adapt the process modules and tools in real time to improve throughput, yield, and on-wafer process quality.

The systems and methods complement various sensors, computer vision algorithms, and feedback mechanisms typically used to determine health of the process modules and tools and to recommend measures to control the tool and improve throughput, yield, and on-wafer process quality. The systems and methods continue to learn from images being captured on an ongoing basis. The systems and methods automate performance of some of the preventive and corrective tasks that typically require human intervention. The systems and methods oversee tool operations across the fleet in a semiconductor fab and provide feedback for autonomous control of the tool.

The computer vision system of the present disclosure comprises detectors and/or sensors such as cameras and further comprises image processing algorithms, perception algorithms, sensor fusion algorithms, models trained using machine learning, and closed-loop control algorithms. Throughout the present disclosure, cameras are used only as examples of detectors/sensors, and it is understood that any other detectors/sensors may be used instead. The computer vision system of the present disclosure supplants the expensive and time consuming metrology equipment and processes that are typically used to inspect wafers and tools and to diagnose problems in the process modules and tools across the fleet, and uses closed-loop algorithms to automate the control of the tools. Further, the computer vision system performs these and many more tasks described below more effectively than humans and the metrology systems. These and other features of the present disclosure are explained below in detail.

Organization

The present disclosure is organized as follows. Initially, numerous examples of substrate processing tools, their configurations, and processing chambers used therein are shown and described with reference to FIGS. 1-7D. These drawings and corresponding description are provided to illustrate various processes that can be performed on different wafers and various paths traveled by the wafers between different chambers and tools. Further, these figures are provided to illustrate the complexity, diversity, and expanse of data that is typically gathered from various sensors in the chambers and the tools. The data is used to diagnose, correct, and prevent problems, and to perform various adjustments, calibrations, and preventive maintenance procedures in the chambers and the tools.

The systems and methods of the present disclosure can operate standalone or in conjunction with these sensors and the data collected therefrom and can significantly improve the diagnostic, corrective, and preventive procedures performed in the chambers and the tools. These figures provide insights into the operations of the chambers and the tools, which help in comprehending the scope of operations performed by the systems and methods of the present disclosure.

Figure 8A:
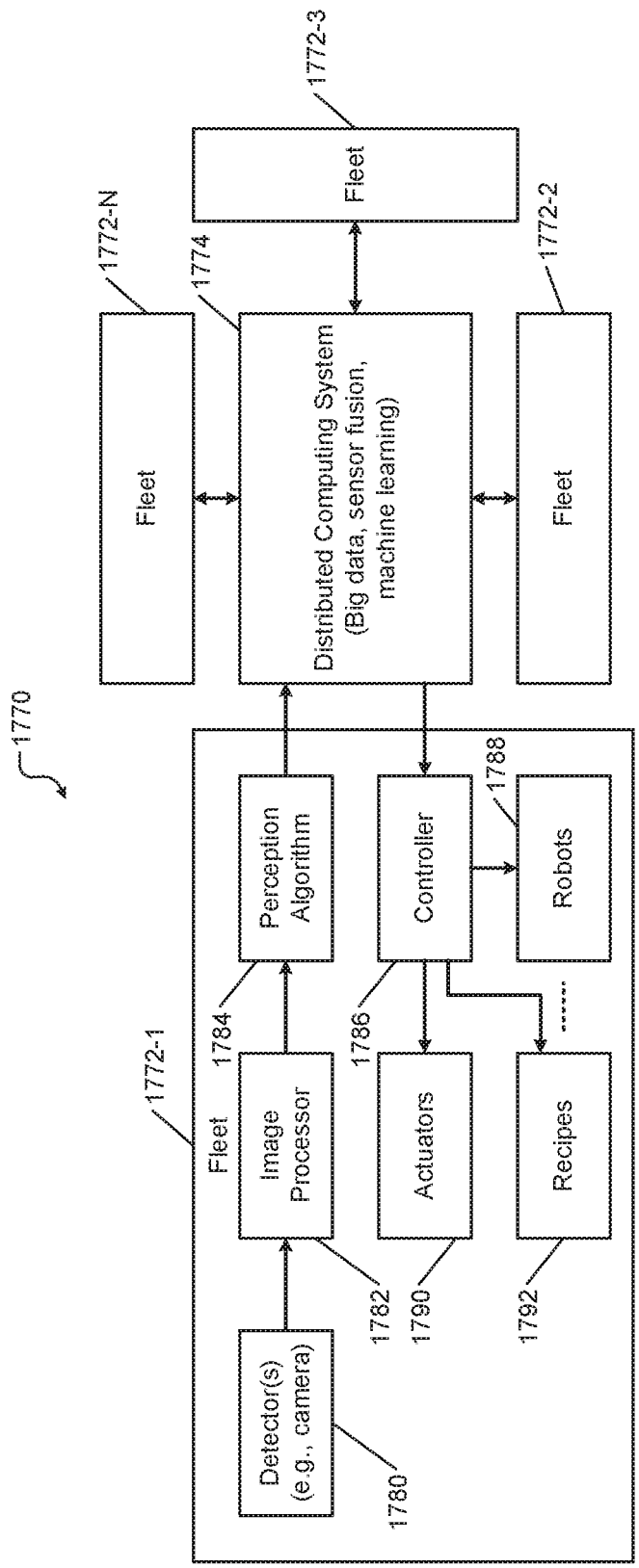
FIG. 8A shows a high level architecture of a computer vision system according to certain features of the present disclosure.
Figure 8B:
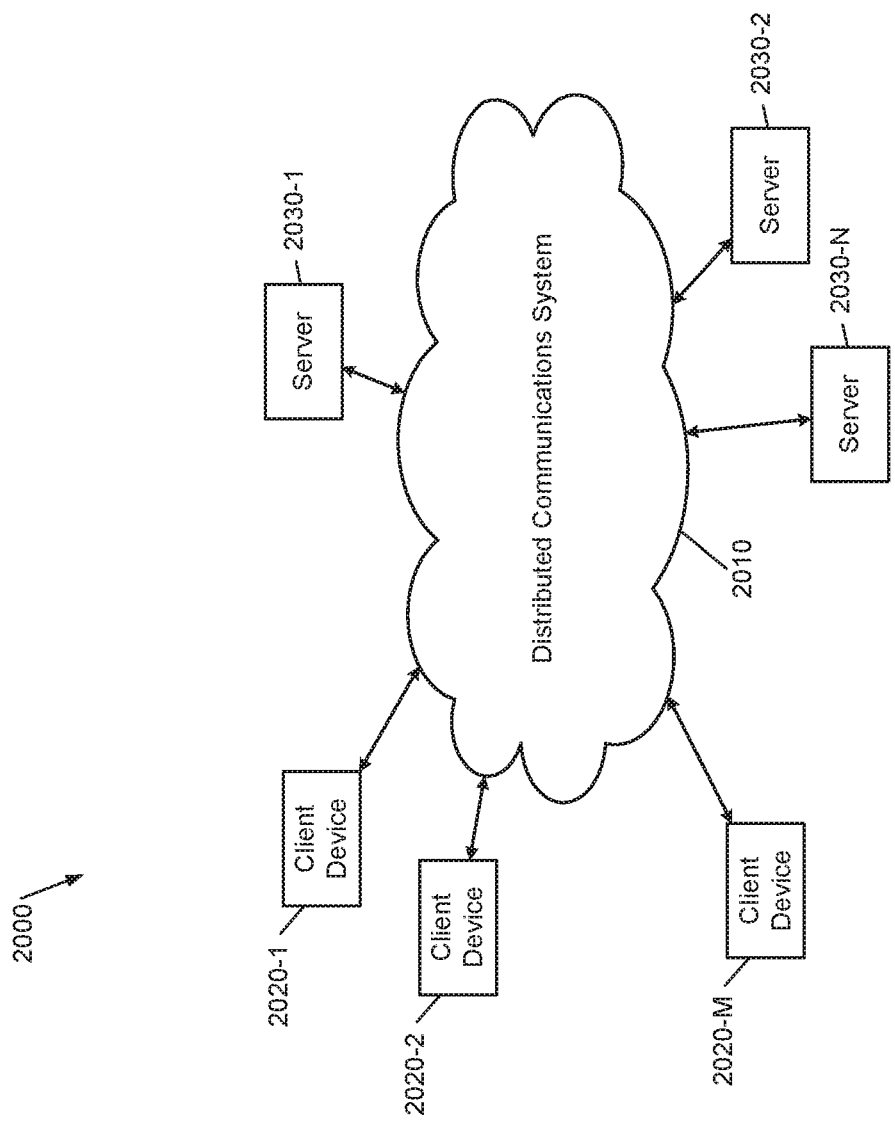
FIGS. 8B-8D show a client-server architecture for implementing the systems and methods according to certain features of the present disclosure.
Figure 8C:
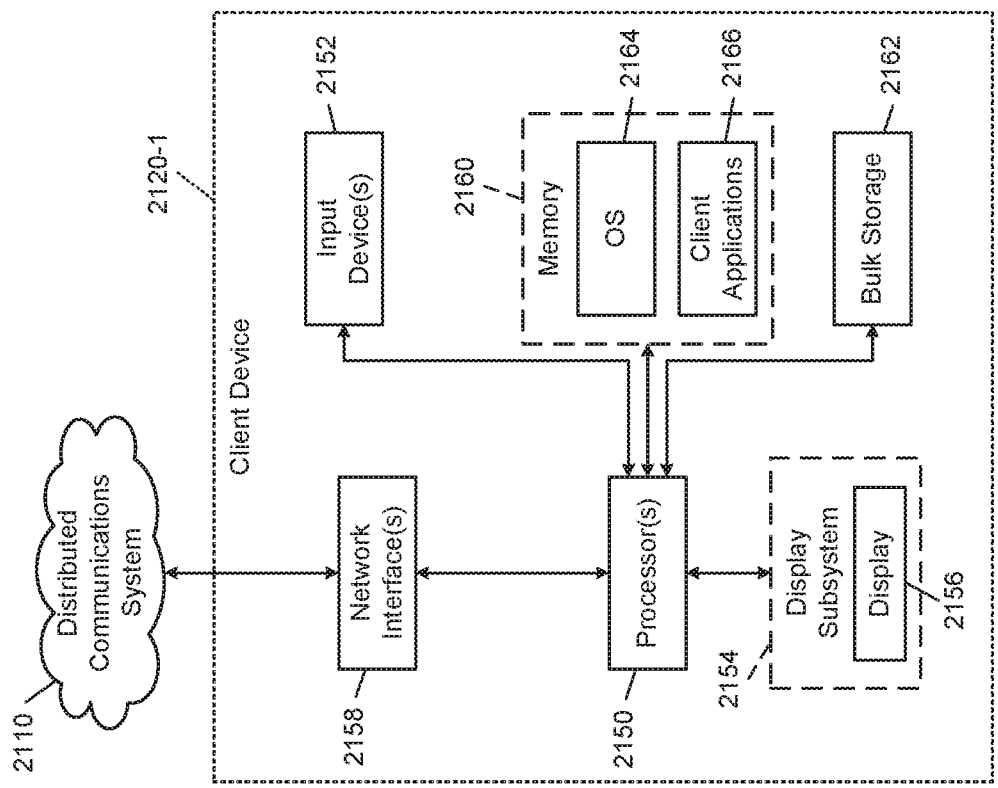
Figure 8D:
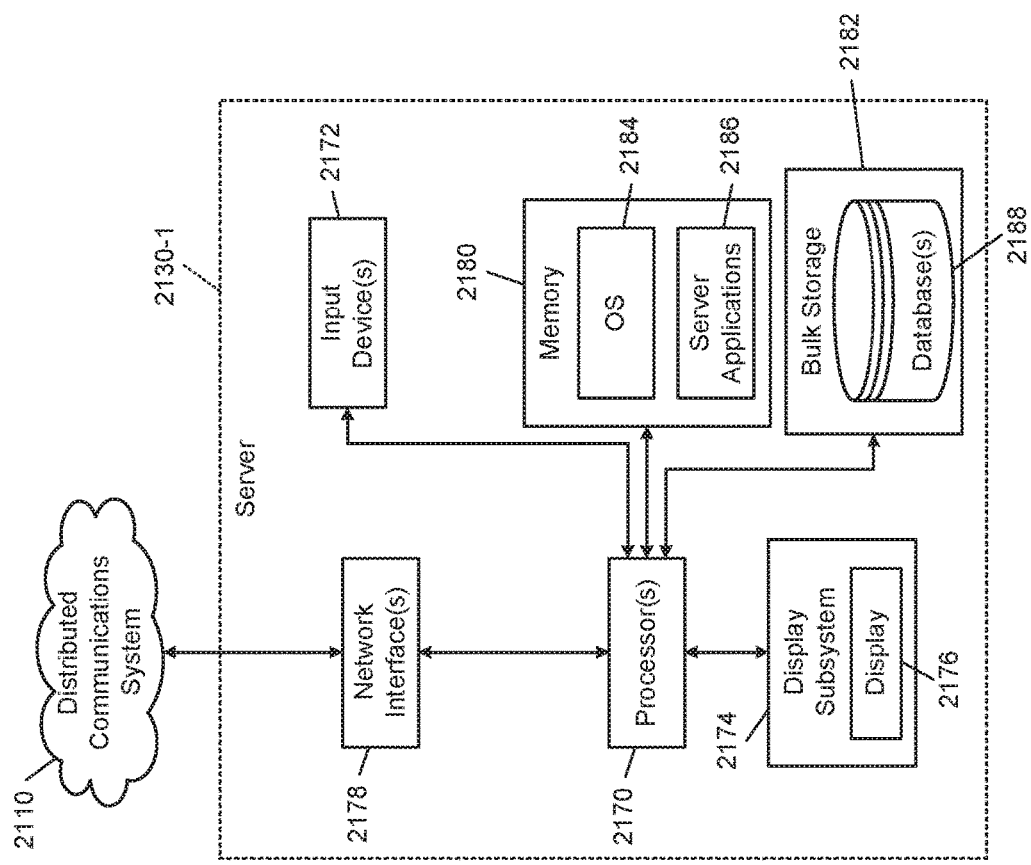
Figure 10A:
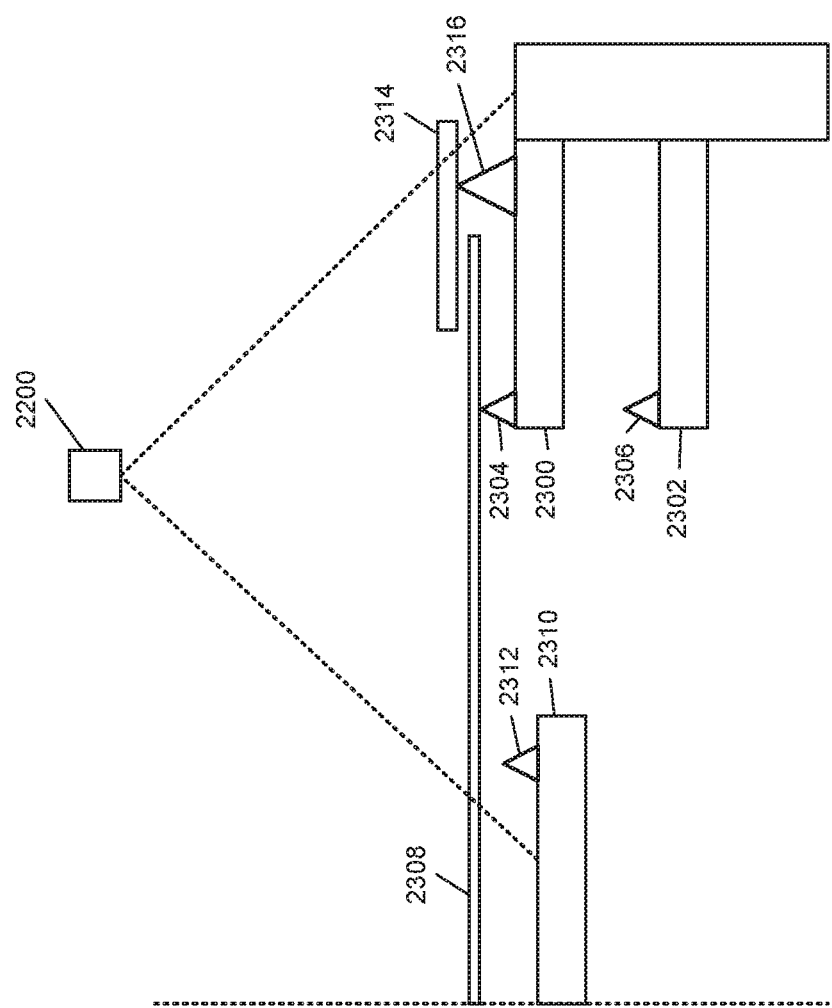
FIG. 10A shows an exemplary schematic of components located in a load lock in a tool that are observed by one of the cameras shown in FIGS. 9A-9F.
Figure 10B:
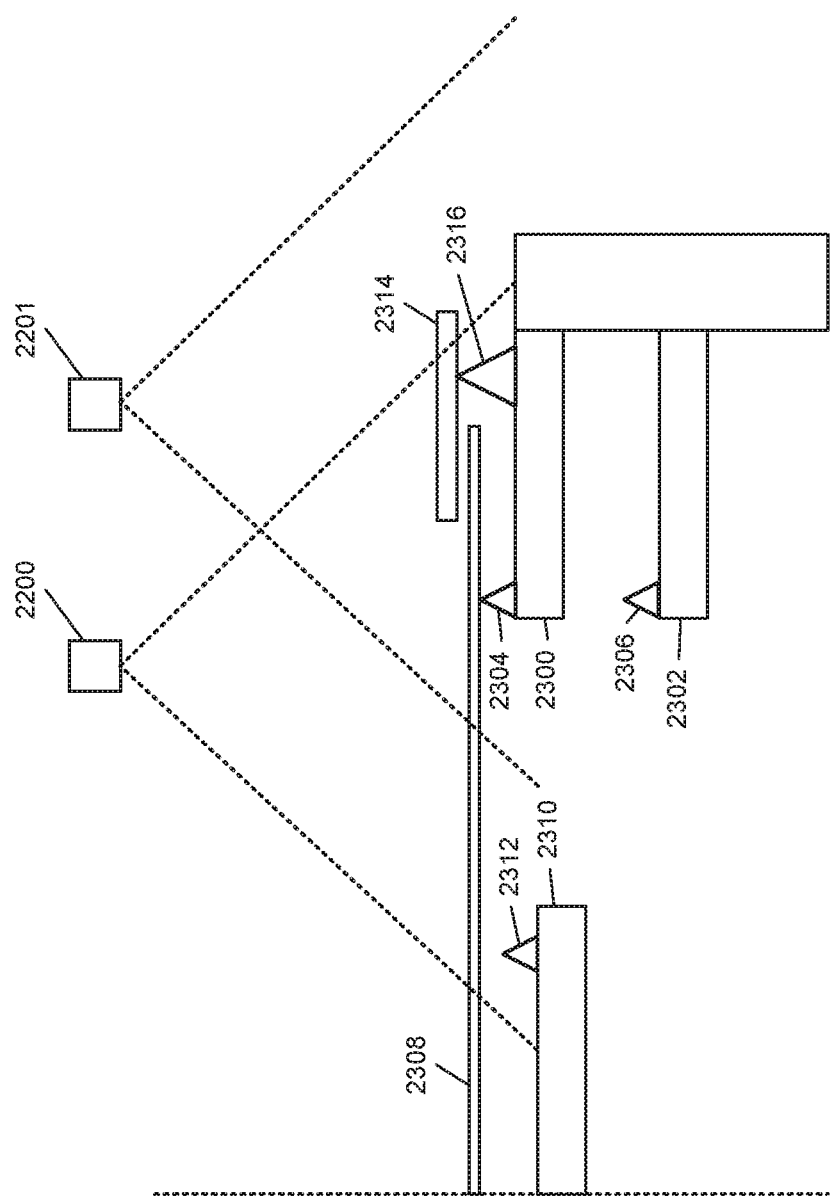
FIG. 10B shows an arrangement of two cameras for capturing three-dimensional images according to certain features of the present disclosure.
Figure 11:
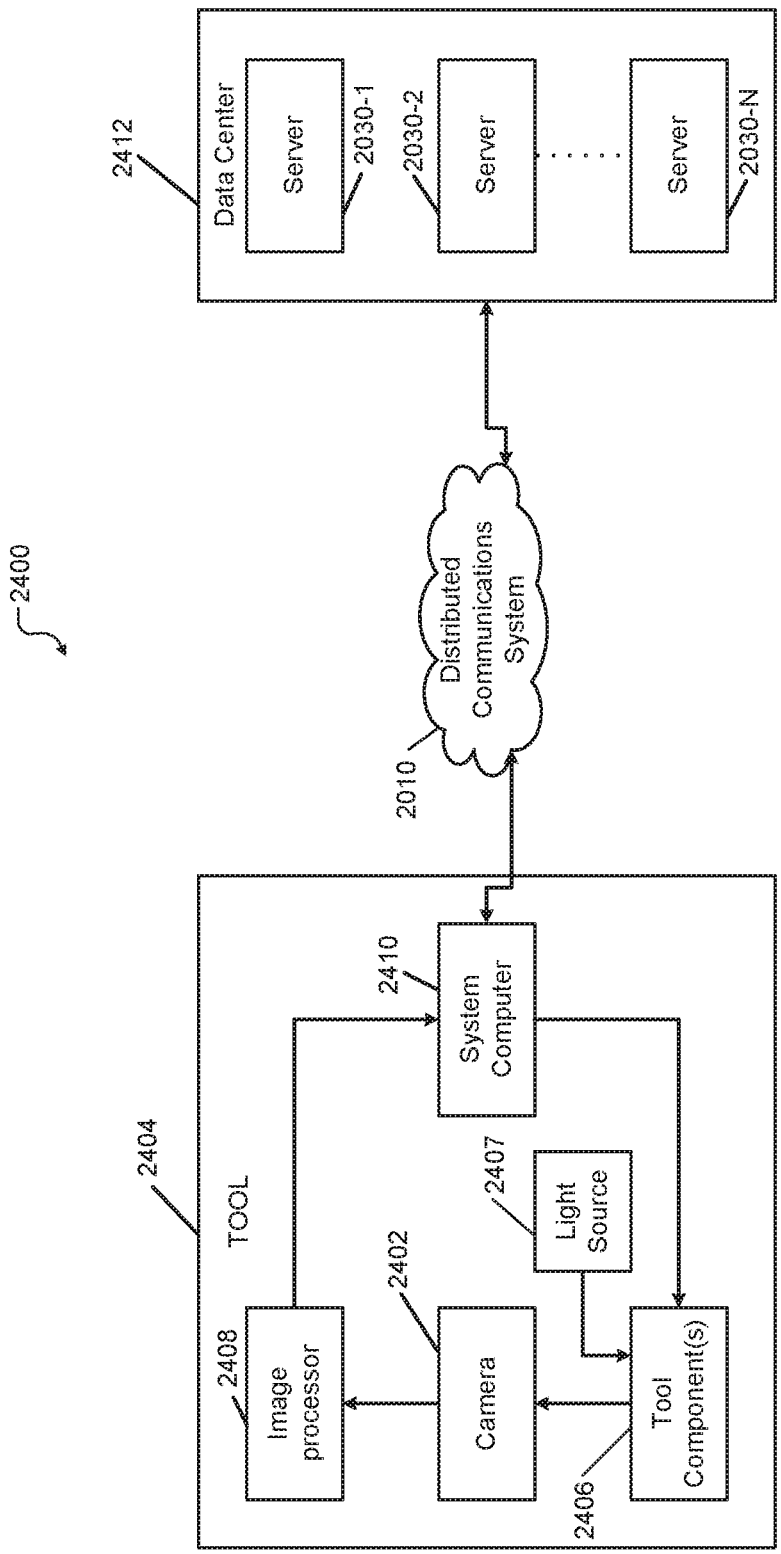
FIG. 11 shows an example block diagram of a computer vision system implemented using the client-server architecture of FIGS. 8B-8D and using a camera arrangement shown in FIGS. 9A-9F.

FIG. 8A shows a high level architecture of a computer vision system according to certain features of the present disclosure. FIGS. 8B-8D show exemplary client-server architectures that can be used to implement the systems and methods of the present disclosure. FIGS. 9A-9F show examples of locations in tools where one or more detectors such as cameras of the computer vision system of the present disclosure can be located. FIG. 10A shows a schematic of components located in a load lock in a tool that can be captured by one of the cameras shown in FIGS. 9A-9F. FIG. 10B shows an arrangement of at least two cameras for capturing three-dimensional images of the components shown in FIG. 10A. FIG. 11 shows an example of the computer vision system implemented using the client-server architecture of FIGS. 8A-8D and using a camera arrangement shown in FIGS. 9A-9F.

FIGS. 12A-12F show examples of methods for training various models using machine learning based on images captured by the computer vision computer vision system from various tools. FIGS. 13A-13F show examples of methods performed using the trained models based on images captured in real time (i.e., on the fly, or when the tool is being used during production to process wafers). FIGS. 14A-14I show additional examples of model-based methods performed for improving operations of tools using the computer vision system. FIGS. 15A-16B show examples of methods for training models using machine learning.

FIGS. 17A-17D show an example of a system and methods for performing auto-configuration and automatic error detection and error recovery in substrate processing systems shown in FIGS. 1-6C. FIGS. 18A-18E show an example system and method for performing stereo image processing using a single camera.

Examples of Tools

Figure 1:
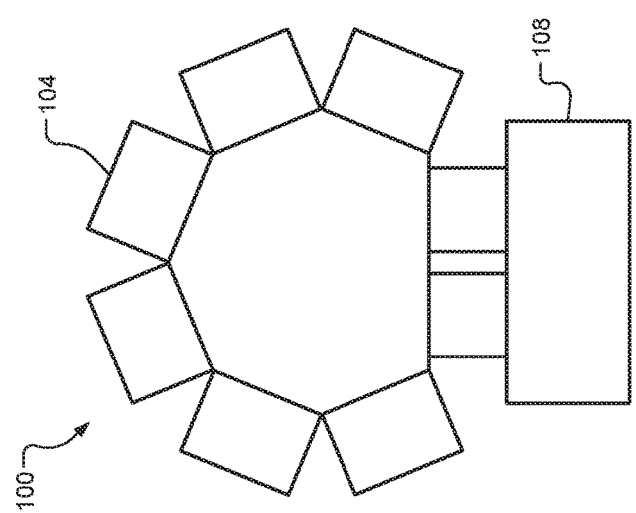
FIG. 1 shows an example of a substrate processing tool.

FIG. 1 shows a top-down view of an example of a substrate processing tool 100. The substrate processing tool 100 includes a plurality of process modules 104. For example only, each of the process modules 104 may be configured to perform one or more respective processes on a substrate. Substrates to be processed are loaded into the substrate processing tool 100 via ports of a loading station of an equipment front end module (EFEM) 108 and then transferred into one or more of the process modules 104. For example, a substrate may be loaded into each of the process modules 104 in succession.

FIG. 2 shows an example arrangement 200 of a fabrication room 204 including a plurality of substrate processing tools 208 such as the substrate processing tool 100. FIGS. 3A-3I show various examples of configurations in which the plurality of substrate processing tools 208 such as the substrate processing tool 100 can be arranged. In these examples, the wafers travel through varying paths. Accordingly, the configuration and operation of the robots used to transport the wafers through these paths vary. Further, a variety of sensors are used in these examples to sense various aspects of robots and the wafers. In addition, as will be explained in detail with reference to FIGS. 9A-11, one or more detectors such as cameras of the computer vision system can be placed anywhere in these examples.

FIG. 3A shows a first example configuration 300 including a first substrate processing tool 304 and a second substrate processing tool 308 according to certain embodiments of the present disclosure. The first substrate processing tool 304 and the second substrate processing tool 308 are arranged sequentially and are connected by a transfer stage 312, which is under vacuum. As shown, the transfer stage 312 includes a pivoting transfer mechanism configured to transfer substrates between a vacuum transfer module (VTM) 316 of the first substrate processing tool 304 and a VTM 320 of the second substrate processing tool 308. In other examples, the transfer stage 312 may include other suitable transfer mechanisms, such as a linear transfer mechanism.

For example only, a first robot (not shown) of the VTM 316 may place a substrate on a support 324 arranged in a first position, the support 324 is pivoted to a second position, and a second robot (not shown) of the VTM 320 retrieves the substrate from the support 324 in the second position. In some examples, the second substrate processing tool 308 may include a storage buffer 328 configured to store one or more substrates between processing stages. The transfer mechanism may also be stacked to provide two or more transfer systems between the substrate processing tools 308 and 304. Transfer stage 324 may also have multiple slots to transport or buffer multiple substrates at one time. In the configuration 300, the first substrate processing tool 304 and the second substrate processing tool 308 are configured to share a single equipment front end module (EFEM) 332.

FIG. 3B shows a second example configuration 400 including a first substrate processing tool 404 and a second substrate processing tool 408 arranged sequentially and connected by a transfer stage 412. The configuration 400 is similar to the configuration 300 of FIG. 3A except that in the configuration 400, the EFEM is eliminated. Accordingly, substrates may be loaded into the first substrate processing tool 408 directly via airlock loading stations 416 (e.g., using a storage or transport carrier such as a vacuum wafer carrier, front opening unified pod (FOUP), etc., or other suitable mechanisms). The arrangement of sensors and cameras in this configuration may correspondingly differ from configuration 300.

FIG. 3C shows a third example configuration 500 including a substrate processing tool 504. The configuration 500 eliminates the EFEM and uses only a single loading station 508, allowing for a greater number (e.g., 7) of process modules 512. At the loading station 508, substrates may be loaded into the second substrate processing tool 408 directly via airlock loading station 416 (e.g., using a storage or transport pod such as a Vacuum Wafer Carrier, front opening unified pod (FOUP), etc., or other suitable mechanisms). Accordingly, the arrangement of sensors and cameras in this configuration may correspondingly differ from configurations 300 and 400.

FIG. 3D shows a fourth example configuration 600 including a first substrate processing tool 604 and a second substrate processing tool 608 sharing a single EFEM 612. More specifically, the first substrate processing tool 604 and the second substrate processing tool 608 are connected to respective ends of the EFEM 612 via respective loading stations 616 and 620. The loading stations 616 and 620 may each have a stacked configuration, which may include suitable sensors and cameras.

FIG. 3E shows a fifth example configuration 700 including a first substrate processing tool 704 and a second substrate processing tool 708 sharing a single EFEM 712. The first substrate processing tool 704 and the second substrate processing tool 708 are connected to respective ends of the EFEM 712 via respective loading stations 716 and 720. The loading stations 716 and 720 may each have a stacked configuration, which may include suitable sensors and cameras.

Figure 3F:
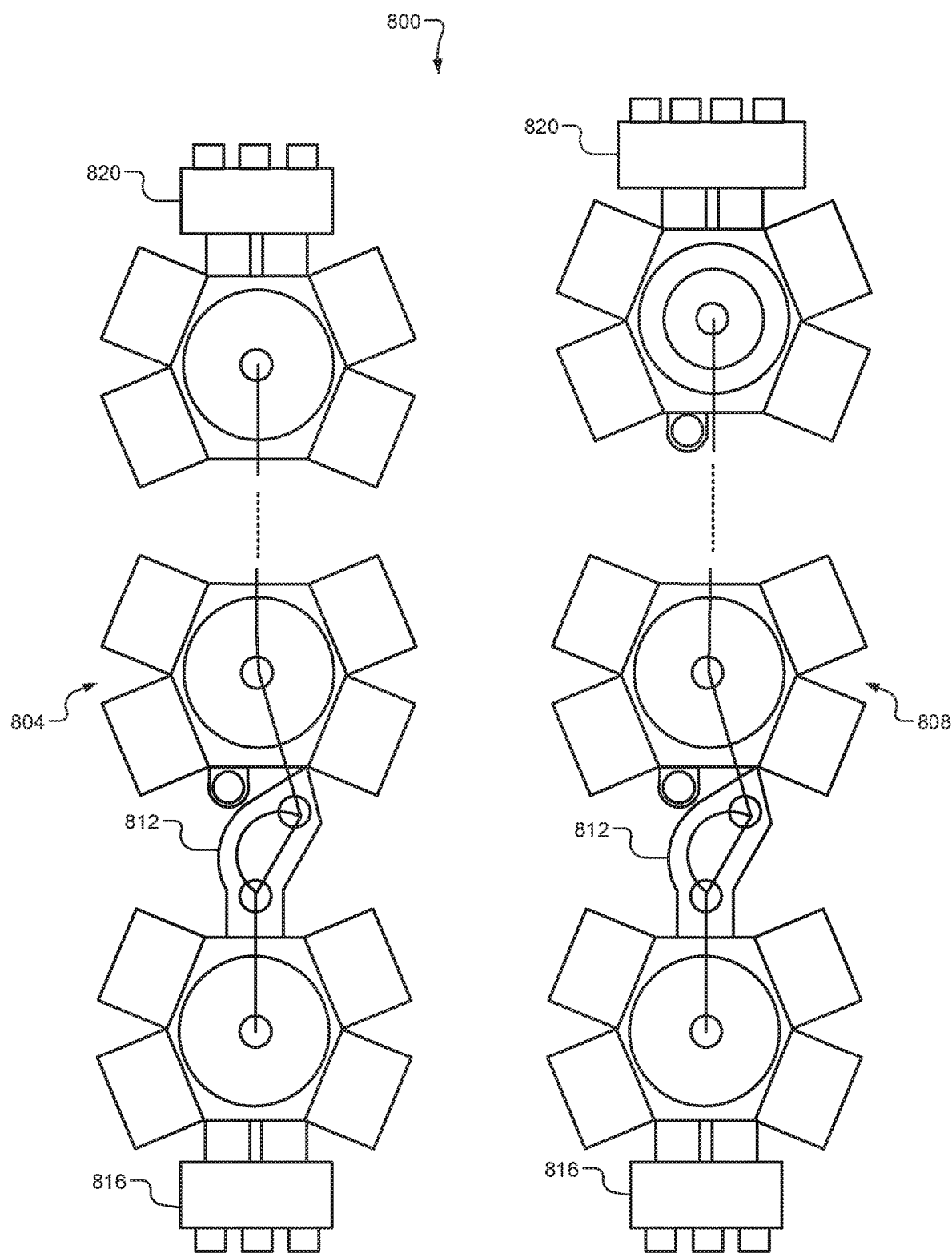

FIG. 3F shows a sixth example configuration 800 including one or more rows of sequentially arranged substrate processing tools 804, 808, etc. In the configuration 800, each row may include 3 or more substrate processing tools connected via respective transfer stages 812. The transfer stages 812 may include pivoting transfer mechanisms, linear transfer mechanisms, etc. A first EFEM 816 is provided at a first end of the row of substrate processing tools 804, 808 and a second EFEM 820 is provided at a second end of the row of substrate processing tools 804, 808. For example, substrates may be loaded at the first EFEM 816, processed and transferred sequentially through the various process modules of the substrate processing tools 804, 808, and then unloaded/retrieved from the second EFEM 820. In some examples, transfer mechanisms within the transfer stages 812 may be vertically stacked to provide two or more transfer systems between adjacent substrate processing tools. The transfer stages 812 may also have multiple slots to move or buffer multiple substrates at a time. As can be appreciated, the arrangement of sensors and cameras in configuration 800 can be different than the sensor arrangements in other configurations.

Figure 3H:
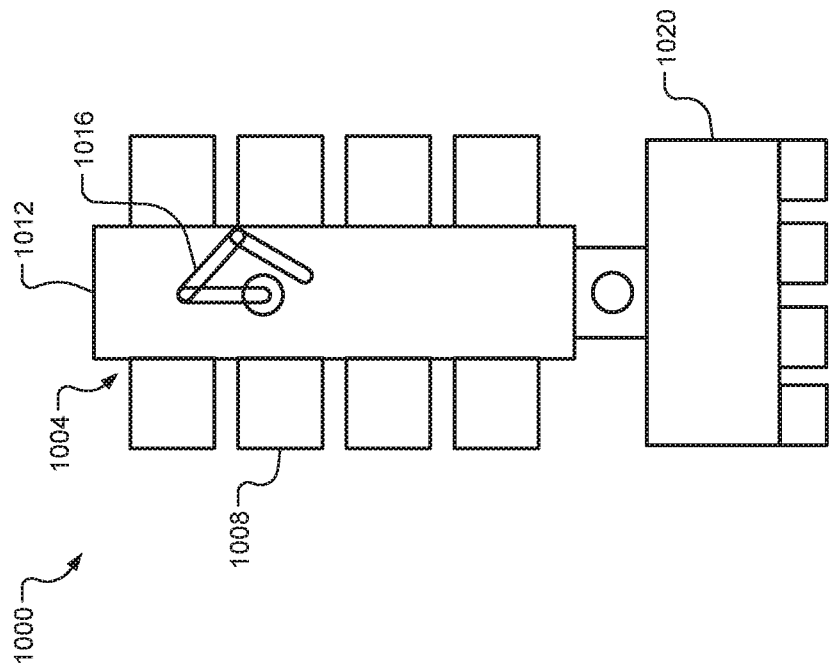
Figure 3G:
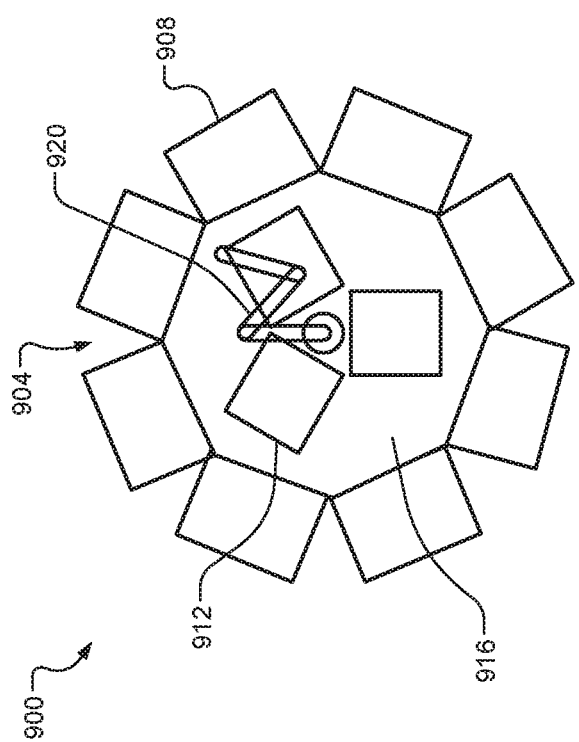

FIG. 3G shows a seventh example configuration 900 including a substrate processing tool 904. In the configuration 900, the substrate processing tool 904 includes, for example, 8 process modules 908 and eliminates both the EFEM and any exterior loading stations. Instead, one or more transport carriers (e.g., vacuum wafer carriers) 912 are provided in an interior 916 of the substrate processing tool 904. For example, the carriers 912 may be transported from above the substrate processing tool 904 using an automated transport system, such as an automated material handling system (AMHS). A robot 920 retrieves substrates from the carriers 912 and transfers the substrates to the process modules 908. As can be appreciated, the arrangement of sensors and cameras in configuration 900 can be different than in other configurations.

FIG. 3H shows an eighth example configuration 1000 including a substrate processing tool 1004 having a plurality of process modules 1008. The substrate processing tool 1004 includes a linear VTM 1012 and robot 1016 configured to transfer substrates between EFEM 1020 and the process modules 1008. The VTM 1012 is configured to adjust a linear position of the robot 1016 relative to the process modules 1008 (i.e., adjust an end-to-end position of the robot 1016 relative to the VTM 1012).

Figure 3I:
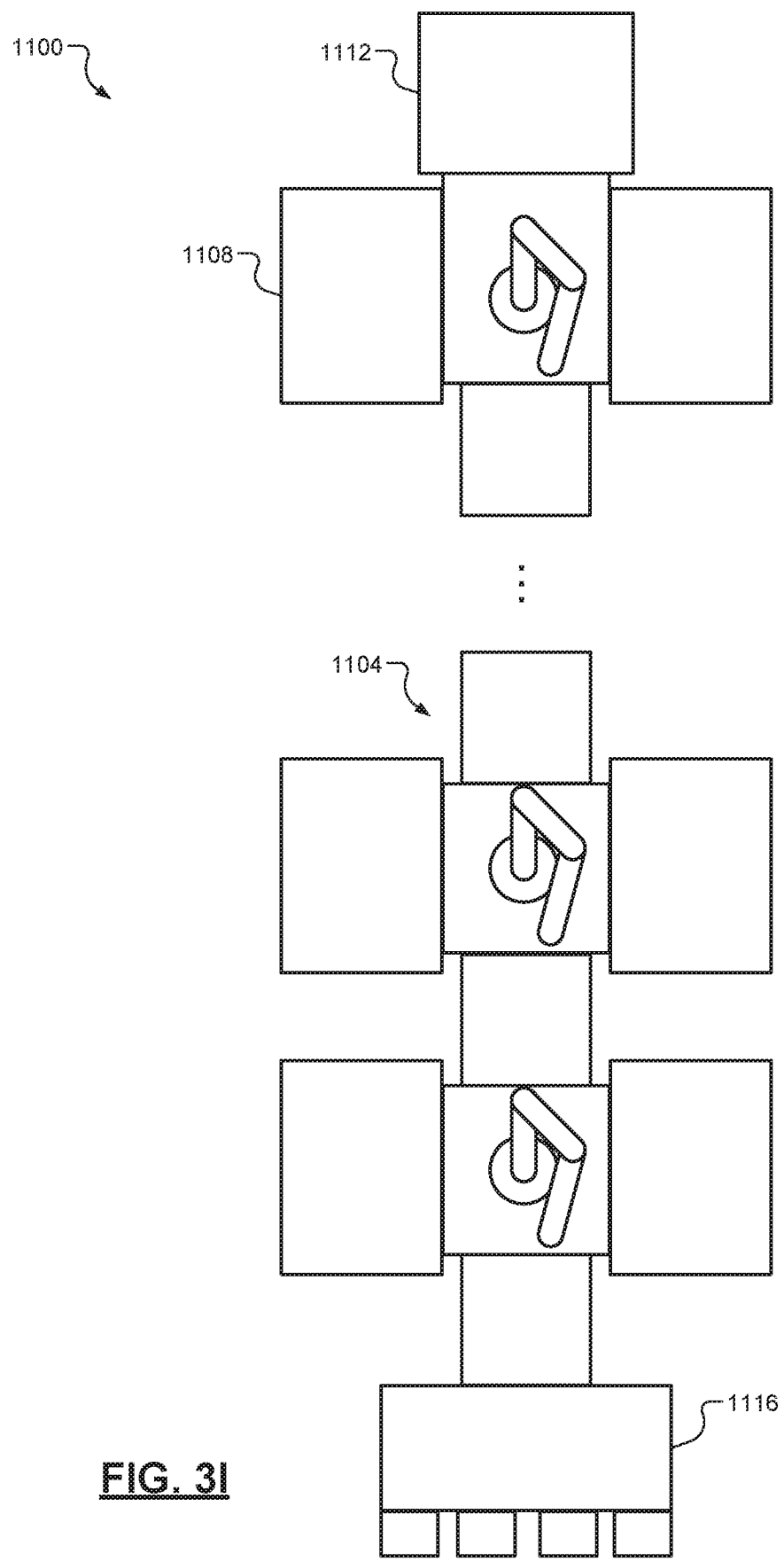
Figure 5A:
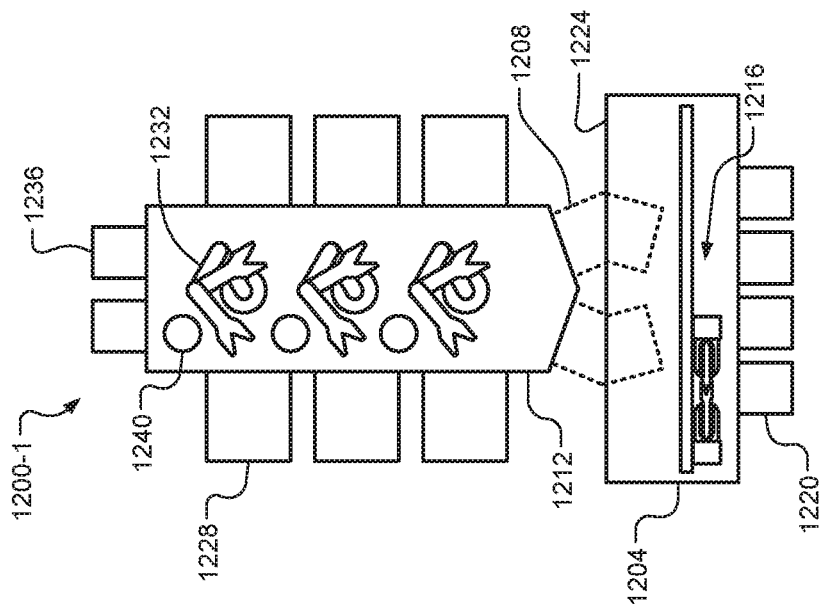

FIG. 3I shows a ninth example configuration 1100 including a substrate processing tool 1104. The substrate processing tool 1104 includes a cluster arrangement of process modules 1108, and an optional end process module 1112. The process modules 1108 share a single EFEM 1116. Again, the arrangement of sensors and cameras in configurations 1000 and 1100 can differ from other configurations.

In some examples, any of the processing tools described herein may implement loading stations having a stacked configuration. For example, loadings stations 508, 716, 720, etc. as shown in FIGS. 3C and 3E may implement a stacked configuration. In other words, in a stacked configuration, a loading station may include two or more vertically stacked loading stations. In some examples, the stacked configuration may also include a process module or chamber (such as an integrated critical strip (ICS) chamber) vertically stacked with one or more loading stations. According to certain embodiments, additional sensors and cameras can be used in these stacked configurations.

Additional Examples of Tools

Figure 4:
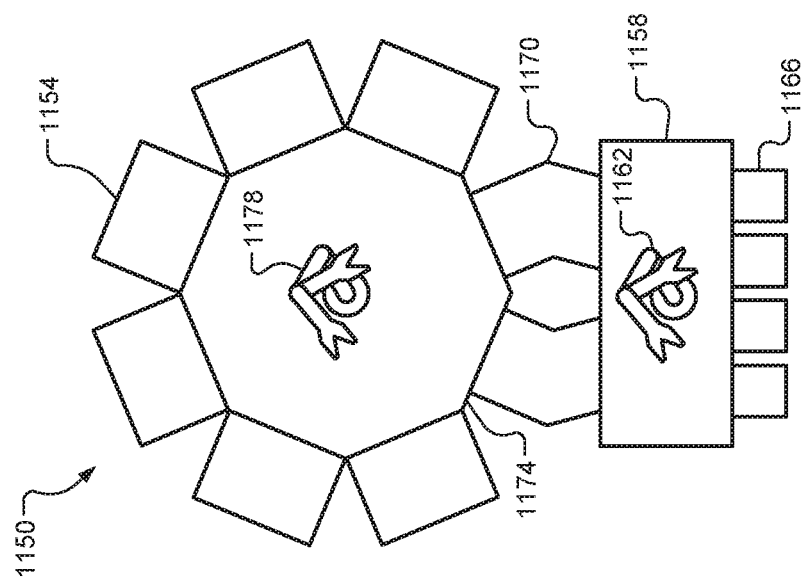
FIG. 4 shows an example of a substrate processing tool.

FIG. 4 shows a top-down view of yet another example of a substrate processing tool 1150. The substrate processing tool 1150 includes a plurality of process modules 1154. For example, each of the process modules 1154 may be configured to perform one or more respective processes on a substrate. Substrates to be processed are loaded into the substrate processing tool 1150 via ports of a loading station of an atmosphere-to-vacuum (ATV) transfer module, such as an equipment front end module (EFEM) 1158, and then transferred into one or more of the process modules 1154. For example, a transfer robot 1162 is arranged to transfer substrates from loading stations 1166 to airlocks, or load locks, 1170, and a vacuum transfer robot 1178 of a vacuum transfer module 1174 is arranged to transfer substrate from the load locks 1170 to the various process modules 1154.

For example, an equipment front end module (EFEM) of a substrate processing tool may include one or more transfer robots for transferring substrates between the EFEM and load locks arranged between the EFEM and a vacuum transfer module (VTM). An internal volume of the EFEM must be sufficient to accommodate the transfer robot. Accordingly, the load locks are typically located outside of a footprint of an equipment front end module (EFEM) between the EFEM and the VTM. In some examples, the EFEM may include a transfer robot having a configuration that allows the airlocks to be located at least partially within the EFEM. The fabrication room 204 shown in FIG. 2 may include a plurality of substrate processing tools 1150.

FIGS. 5A-6C show various examples of configurations in which the plurality of substrate processing tools such as the substrate processing tool 1150 can be arranged. In these examples, the wafers travel through varying paths. Accordingly, the configuration and operation of the robots used to transport the wafers through these paths vary. Further, a variety of sensors are used in these examples to sense various aspects of robots and the wafers. In addition, as will be explained in detail with reference to FIGS. 9A-11, one or more detectors such as cameras of the computer vision system can be placed anywhere in these example configurations.

FIGS. 5A-5D show plan views of example configurations of a first substrate processing tool 1200-1, a second substrate processing tool 1200-2, and a third substrate processing tool 1200-3 (collectively substrate processing tools 1200). Each of the substrate processing tools 1200, similar to the substrate processing tool 1150, includes a modified equipment front end module (EFEM) 1204 configured to accommodate at least a portion of load locks 1208. In other words, instead of being located outside of the EFEM 1204 in a gap between the EFEM 1204 and a vacuum transfer module (VTM) 1212, the load locks 1208 extend into an interior of the EFEM 1204.

Accordingly, the EFEM 1204 can be located closer to the VTM 1212, reducing the overall footprint and increasing the pitch of the substrate processing tools 1200. For example, a transfer robot 1216 of the EFEM 1204 is arranged closer to loading stations 1220 on a front wall (e.g., a first side) than a back wall 1224 (e.g., a second side) of the EFEM 1204 to provide space for the load locks 1208 to extend into the interior of the EFEM 1204. In some examples, the load locks 1208 may be configured as shown in an alternative arrangement of the substrate processing tool 1200-3 in FIG. 5D. For example only, the loading stations 1220 may correspond to front opening unified pods (FOUPs).

As shown, the substrate processing tools 1200 include six process modules 1228. However, other configurations of the substrate processing tools 1200 may include more than six of the process modules 1228. For example, a length of the VTM 1212 may be extended to accommodate additional process modules 1228. Similarly, the VTM 1212 may include vacuum transfer robots 1232 having various configurations. For example, the substrate processing tool 1200-1 includes three vacuum transfer robots 1232 and the substrate processing tool 1200-2 includes two vacuum transfer robots 1232. In the substrate processing tools 1200-1 and 1200-2, the robots 1232 are aligned with a center lengthwise axis of the VTM 1212.

Conversely, the substrate processing tool 1200-3 includes a single vacuum transfer robot 1232 arranged off-center (i.e. shifted to the right or left toward the process modules 1228) relative to the center lengthwise axis of the VTM 1212. In other words, a primary pivot point of the robot 1232 in the substrate processing tool 1200-3 is off-center. Although shown as having one or two arms, each of the robots 1216 and 1232 may have configurations including one, two, or more arms. In some examples, the robot 1232 may include two end effectors 1234 on each of the arms as shown in FIGS. 5C and 5D.

The substrate processing tools 1200 may include one or more storage buffers 1236 configured to store one or more substrates between processing stages. In some examples, one or more storage buffers 1240 may be located within the VTM 1212. In some examples, one or more of the storage buffers 1236 may be replaced with process modules or other components.

In some examples, one or more of the EFEM 1204, the load locks 1208, the VTM 1212, and the process modules 1228 may have a stacked configuration. For example, each of the process modules 1228 may correspond to two process modules 1228 in a vertically stacked configuration (i.e., one process module 1228 arranged above/below the other), the VTM 1212 may correspond to two VTMs 1212 in the vertically stacked configuration, each of the load locks 1208 may correspond to two load locks 1208 in the vertically stacked configuration, and each of the loading stations 1220 may correspond to two loading stations 1220 in the vertically stacked configuration. A height of the EFEM 1204 may be increased to allow the robot 1216 to be raised and lowered to different levels within the EFEM 1204 to access multiple levels of the loading stations 1220 and the load locks 1208. As can be appreciated, the arrangement of sensors and cameras in these configurations can vary correspondingly.

FIGS. 6A-6C show plan views of example configurations of another substrate processing tool 1600. The substrate processing tool 1600 includes a modified equipment front end module (EFEM) 1604 configured to accommodate at least a portion of one or more load locks 1608. In other words, instead of being located entirely outside of the EFEM 1604 in a gap between the EFEM 1604 and a vacuum transfer module (VTM) 1612, the load locks 1608 extend into an interior of the EFEM 1604. Accordingly, the EFEM 1604 can be located closer to the VTM 1612, reducing the overall footprint and increasing the pitch of a plurality of the substrate processing tools 1600.

As shown, the substrate processing tool 1600 includes ten process modules 1616. However, other configurations of the substrate processing tool 1600 may include more than ten of the process modules 1616. For example, a length of the VTM 1612 may be extended to accommodate additional process modules 1616. Similarly, the VTM 1612 may include one or more vacuum transfer robots 1620 (e.g., transfer robots 1620-1, 1620-2, 1620-3, 1620-4, and 1620-5) having various configurations. As shown in FIG. 6A, the transfer robots 1620 include one arm 1624 having three arm segments 1628 and one end effector 1632 in each of the configurations. In other configurations, the transfer robots 1620 may include one, two, or more arms 1624. In some examples, the robots 1620 may include two of the end effectors 1632 on each of the arms 1624.

In FIG. 6A, the substrate processing tool 1600 includes a single vacuum transfer robot 1620-1 arranged off-center (i.e. shifted to the right or left toward the process modules 1616) relative to the center lengthwise axis of the VTM 1612. In other words, a primary pivot point of the robot 1620-1 is off-center. The robot 1620-1 is positioned and configured to access each of the ten process modules 1616 and the load lock(s) 1608. In configurations where the substrate processing tool 1600 includes storage buffers 1636 and/or storage buffers 1640, the robot 1620-1 is also configured to access the storage buffers 1636/1640.

In FIGS. 6B and 6C, the substrate processing tool 1600 includes two vacuum transfer robot 1620-2 and 1620-3 or 1620-4 and 1620-5, respectively, arranged off-center (i.e. shifted to the right or left toward the process modules 1616) relative to the center lengthwise axis of the VTM 1612. The robots 1620-2 and 1620-4 are positioned and configured to access selected ones of the ten process modules 1616 and the load lock(s) 1608. Conversely, the robots 1620-3 and 1620-5 are positioned and configured to access others of the ten process modules 1616. In configurations where the substrate processing tool 1600 includes storage buffers 1636 and/or storage buffers 1640, the robots 1620-3 and 1620-5 may also be configured to access the storage buffers 1636, while both of the robots 1620-2 and 1620-3 in FIG. 6B and both of the robots 1620-4 and 1620-5 in FIG. 6C are configured to access the storage buffers 1640.

For example, as shown in FIG. 6B, the robot 1620-2 is aligned with (e.g., centered on a horizontal axis of) a respective one of the process modules 1616 while the robot 1620-3 is arranged centered between adjacent ones of the process modules 1616. Conversely, as shown in FIG. 6C, each of the robots 1620-4 and 1620-5 is aligned with a respective one of the process modules 1616. As can be appreciated, the arrangement of sensors and cameras in these configurations can vary correspondingly.

Examples of Chambers

Figure 7A:
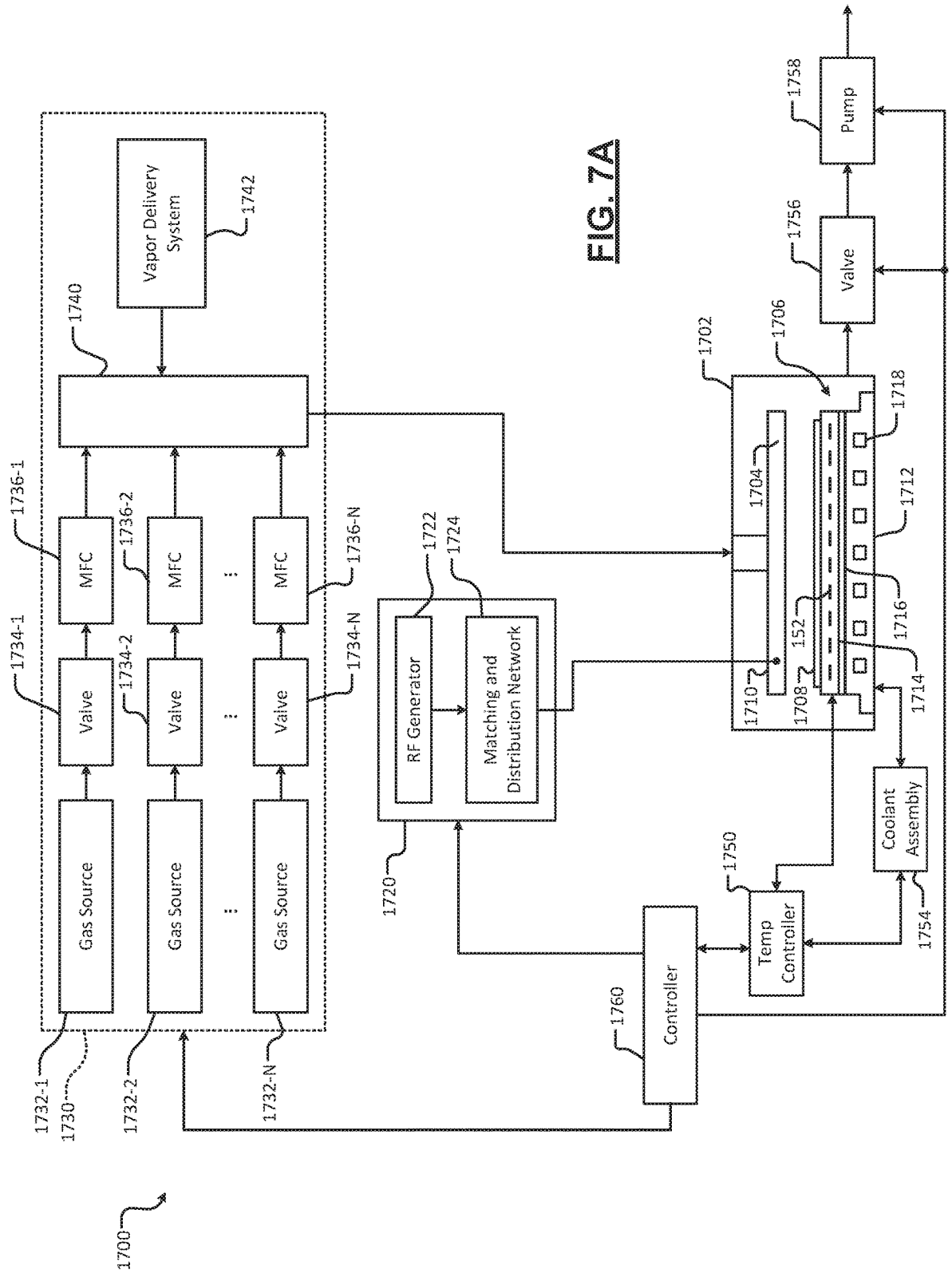
FIGS. 7A-7C show functional block diagrams of substrate processing systems comprising various processing chambers according to certain features of the present disclosure.
Figure 7B:
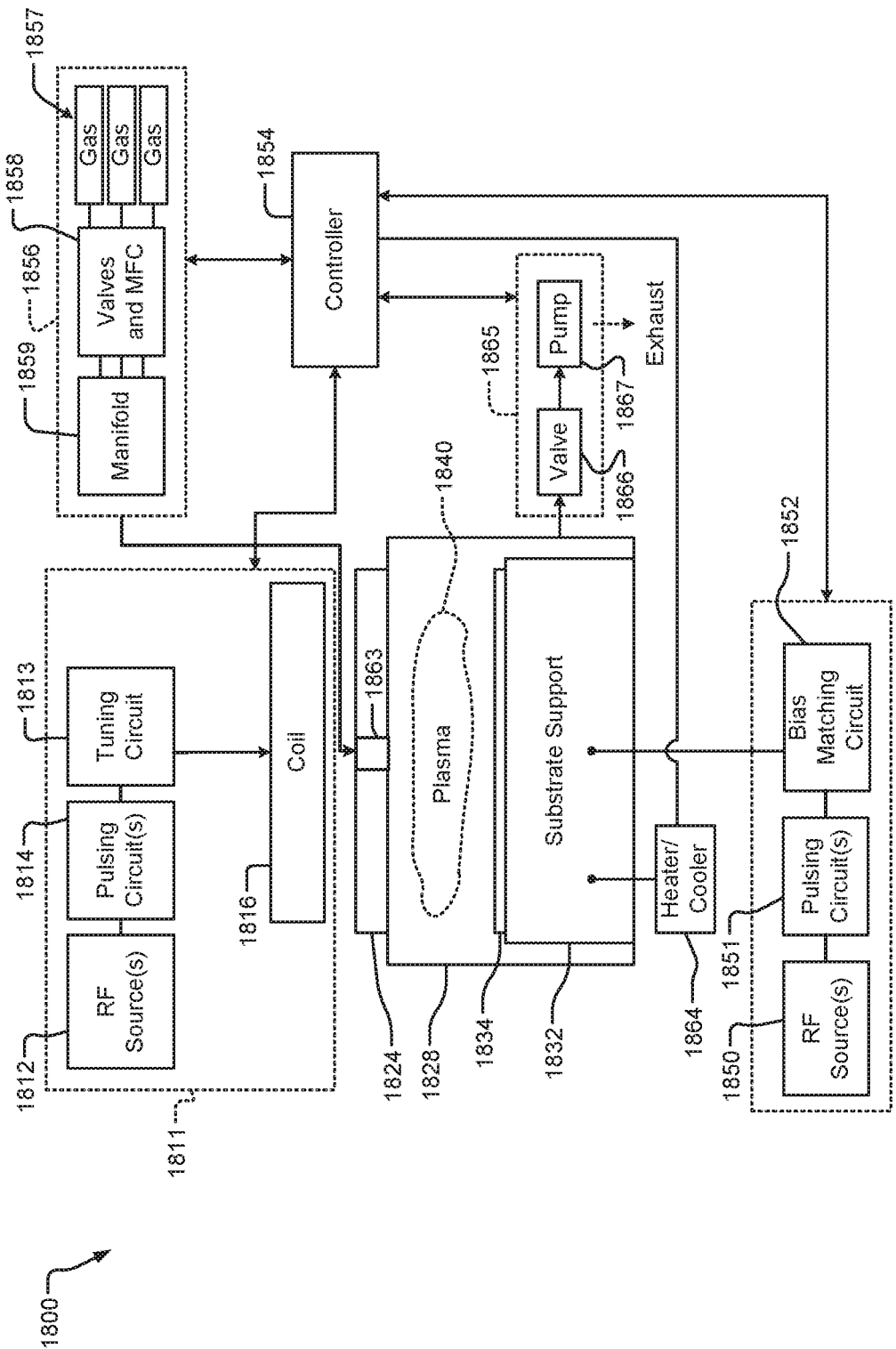
Figure 7C:
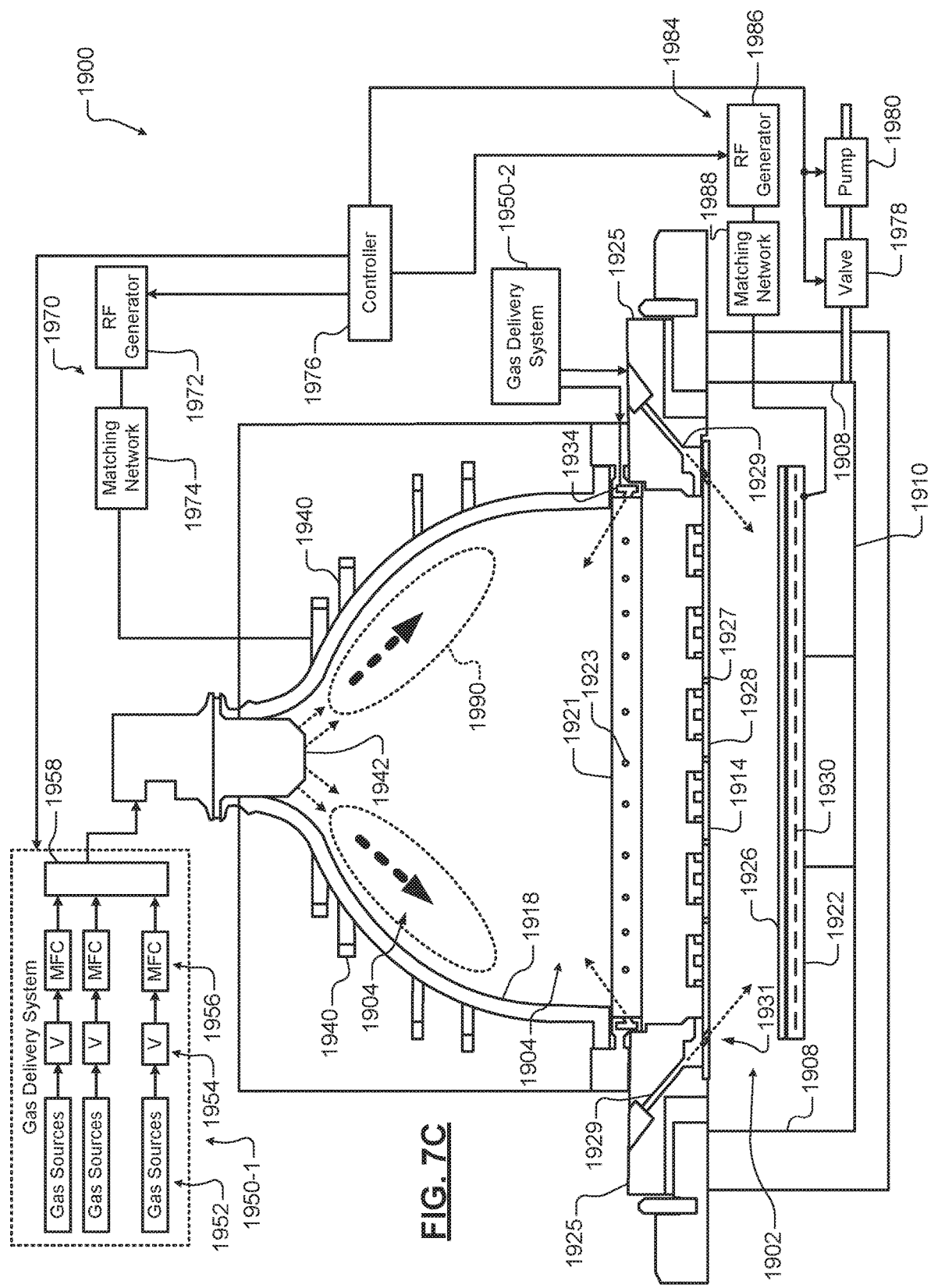

FIGS. 7A-7C show different examples of process modules (PMs) that can be used in the tools shown in FIGS. 1-6C. These process chambers may also be equipped with one or more cameras that are separate and in addition to the cameras of the computer vision system. Rather, these cameras, which are placed outside a window of a PM are used to monitor in the interior of the PM. These cameras (not shown) are part of the sensors typically used to sense various operations of the PMs and the tool. The computer vision system operates in tandem with these sensors and cameras as will be explained below with reference to FIGS. 9A-11. The controllers described in FIGS. 7A-7C may exchange data with the computer vision system and may operate respective PMs based on data received from the computer vision system as explained below with reference to FIGS. 9A-11.

FIG. 7A shows an example of a substrate processing system 1700 comprising a processing chamber 1702. While the example is described in the context of plasma enhanced chemical vapor deposition (PECVD), the teachings of the present disclosure can be applied to other types of substrate processing such as atomic layer deposition (ALD), plasma enhanced ALD (PEALD), CVD, or also other processing including etching processes. The system 1700 comprises the processing chamber 1702 that encloses other components of the system 1700 and contains an RF plasma (if used). The processing chamber 1702 comprises an upper electrode 1704 and an electrostatic chuck (ESC) 1706 or other substrate support. During operation, a substrate 1708 is arranged on the ESC 1706.

For example, the upper electrode 1704 may include a gas distribution device 1710 such as a showerhead that introduces and distributes process gases. The gas distribution device 1710 may include a stem portion including one end connected to a top surface of the processing chamber 1702. A base portion of the showerhead is generally cylindrical and extends radially outwardly from an opposite end of the stem portion at a location that is spaced from the top surface of the processing chamber 1702. A substrate-facing surface or faceplate of the base portion of the showerhead includes a plurality of holes through which vaporized precursor, process gas, or purge gas flows. Alternately, the upper electrode 1704 may include a conducting plate, and the process gases may be introduced in another manner.

The ESC 1706 comprises a baseplate 1712 that acts as a lower electrode. The baseplate 1712 supports a heating plate 1714, which may correspond to a ceramic multi-zone heating plate. A thermal resistance layer 1716 may be arranged between the heating plate 1714 and the baseplate 1712. The baseplate 1712 may include one or more channels 1718 for flowing coolant through the baseplate 1712.

If plasma is used, an RF generating system 1720 generates and outputs an RF voltage to one of the upper electrode 1704 and the lower electrode (e.g., the baseplate 1712 of the ESC 1706). The other one of the upper electrode 1704 and the baseplate 1712 may be DC grounded, AC grounded, or floating. For example, the RF generating system 1720 may include an RF generator 1722 that generates RF power that is fed by a matching and distribution network 1724 to the upper electrode 1704 or the baseplate 1712. In other examples, the plasma may be generated inductively or remotely.

A gas delivery system 1730 includes one or more gas sources 1732-1, 1732-2, . . . , and 1732-N (collectively gas sources 1732), where N is an integer greater than zero. The gas sources 1732 are connected by valves 1734-1, 1734-2, . . . , and 1734-N (collectively valves 1734) and mass flow controllers 1736-1, 1736-2, . . . , and 1736-N (collectively mass flow controllers 1736) to a manifold 1740. A vapor delivery system 1742 supplies vaporized precursor to the manifold 1740 or another manifold (not shown) that is connected to the processing chamber 1702. An output of the manifold 1740 is fed to the processing chamber 1702.

A temperature controller 1750 may be connected to a plurality of thermal control elements (TCEs) 1752 arranged in the heating plate 1714. The temperature controller 1750 may be used to control the plurality of TCEs 1752 to control a temperature of the ESC 1706 and the substrate 1708. The temperature controller 1750 may communicate with a coolant assembly 1754 to control coolant flow through the channels 1718. For example, the coolant assembly 1754 may include a coolant pump, a reservoir, and one or more temperature sensors (not shown). The temperature controller 1750 operates the coolant assembly 1754 to selectively flow the coolant through the channels 1718 to cool the ESC 1706. A valve 1756 and pump 1758 may be used to evacuate reactants from the processing chamber 1702. A system controller 1760 controls the components of the system 1700.

FIG. 7B shows another example of a substrate processing system 1800. The substrate processing system 1800 includes a coil driving circuit 1811. In some examples, the coil driving circuit 1811 includes an RF source 1812, a pulsing circuit 1814, and a tuning circuit (i.e., matching circuit) 1813. The pulsing circuit 1814 controls a transformer coupled plasma (TCP) envelope of an RF signal generated by the RF source 1812 and varies a duty cycle of TCP envelope between 1% and 99% during operation. As can be appreciated, the pulsing circuit 1814 and the RF source 1812 can be combined or separate.

The tuning circuit 1813 may be directly connected to an inductive coil 1816. While the substrate processing system 1810 uses a single coil, some substrate processing systems may use a plurality of coils (e.g., inner and outer coils). The tuning circuit 1813 tunes an output of the RF source 1812 to a desired frequency and/or a desired phase, and matches an impedance of the coil 1816.

A dielectric window 1824 is arranged along a top side of a processing chamber 1828. The processing chamber 1828 comprises a substrate support (or pedestal) 1832 to support a substrate 1834. The substrate support 1832 may include an electrostatic chuck (ESC), or a mechanical chuck or other type of chuck. Process gas is supplied to the processing chamber 1828 and plasma 1840 is generated inside of the processing chamber 1828. The plasma 1840 etches an exposed surface of the substrate 1834. An RF source 1850, a pulsing circuit 1851, and a bias matching circuit 1852 may be used to bias the substrate support 1832 during operation to control ion energy.

A gas delivery system 1856 may be used to supply a process gas mixture to the processing chamber 1828. The gas delivery system 1856 may include process and inert gas sources 1857, a gas metering system 1858 such as valves and mass flow controllers, and a manifold 1859. A gas injector 1863 may be arranged at a center of the dielectric window 1824 and is used to inject gas mixtures from the gas delivery system 1856 into the processing chamber 1828. Additionally or alternatively, the gas mixtures may be injected from the side of the processing chamber 1828.

A heater/cooler 1864 may be used to heat/cool the substrate support 1832 to a predetermined temperature. An exhaust system 1865 includes a valve 1866 and pump 1867 to control pressure in the processing chamber and/or to remove reactants from the processing chamber 1828 by purging or evacuation.

A controller 1854 may be used to control the etching process. The controller 1854 monitors system parameters and controls delivery of the gas mixture; striking, maintaining, and extinguishing the plasma; removal of reactants; supply of cooling gas; and so on. Additionally, as described below, the controller 1854 may control various aspects of the coil driving circuit 1810, the RF source 1850, and the bias matching circuit 1852, and so on.

FIG. 7C shows a processing chamber 1900 for etching a layer of a substrate. The processing chamber 1900 includes a lower chamber region 1902 and an upper chamber region 1904. The lower chamber region 1902 is defined by chamber sidewall surfaces 1908, a chamber bottom surface 1910, and a lower surface of a gas distribution device 1914.

The upper chamber region 1904 is defined by an upper surface of the gas distribution device 1914 and an inner surface of a dome 1918. In some examples, the dome 1918 rests on a first annular support 1921. In some examples, the first annular support 1921 includes one or more spaced holes 1923 for delivering process gas to the upper chamber region 1904. In some examples, the process gas is delivered by the one or more spaced holes 1923 in an upward direction at an acute angle relative to a plane including the gas distribution device 1914, although other angles/directions may be used. In some examples, a gas flow channel 1934 in the first annular support 1921 supplies gas to the one or more spaced holes 1923.

The first annular support 1921 may rest on a second annular support 1925 that defines one or more spaced holes 1927 for delivering process gas from a gas flow channel 1929 to the lower chamber region 1902. In some examples, holes 1931 in the gas distribution device 1914 align with the holes 1927. In other examples, the gas distribution device 1914 has a smaller diameter, and the holes 1931 are not needed. In some examples, the process gas is delivered by the one or more spaced holes 1927 in a downward direction towards a substrate 1926 at an acute angle relative to the plane including the gas distribution device 1914, although other angles/directions may be used. In other examples, the upper chamber region 1904 is cylindrical with a flat top surface and one or more flat inductive coils may be used. In still other examples, a single chamber may be used with a spacer located between a showerhead and the substrate support.

A substrate support 1922 is arranged in the lower chamber region 1904. In some examples, the substrate support 1922 includes an electrostatic chuck (ESC), although other types of substrate supports can be used. The substrate 1926 is arranged on an upper surface of the substrate support 1922 during etching. In some examples, a temperature of the substrate 1926 may be controlled by a heater plate 1930, an optional cooling plate with fluid channels, and one or more sensors (not shown), although any other suitable substrate support temperature control system may be used.

In some examples, the gas distribution device 1914 includes a showerhead (for example, a plate 1928 having a plurality of spaced holes 1927). The plurality of spaced holes 1927 extend from the upper surface of the plate 1928 to the lower surface of the plate 1928. In some examples, the spaced holes 1927 have a diameter in a range from 0.4" to 0.75" and the showerhead is made of a conducting material such as aluminum or a non-conductive material such as ceramic with an embedded electrode made of a conducting material.

One or more inductive coils 1940 are arranged around an outer portion of the dome 1918. When energized, the one or more inductive coils 1940 create an electromagnetic field inside of the dome 1918. In some examples, an upper coil and a lower coil are used. A gas injector 1942 injects one or more gas mixtures from a gas delivery system 1950-1.

In some examples, the gas delivery system 1950-1 includes one or more gas sources 1952, one or more valves 1954, one or more mass flow controllers (MFCs) 1956, and a mixing manifold 158, although other types of gas delivery systems may be used. A gas splitter (not shown) may be used to vary flow rates of a gas mixture. Another gas delivery system 1950-2 may be used to supply an etch gas or an etch gas mixture to the gas flow channels 1929 and/or 1934 (in addition to or instead of etch gas from the gas injector 1942).

In some examples, the gas injector 1942 includes a center injection location that directs gas in a downward direction and one or more side injection locations that inject gas at an angle with respect to the downward direction. In some examples, the gas delivery system 1950-1 delivers a first portion of the gas mixture at a first flow rate to the center injection location and a second portion of the gas mixture at a second flow rate to the side injection location(s) of the gas injector 1942. In other examples, different gas mixtures are delivered by the gas injector 1942. In some examples, the gas delivery system 1950-1 delivers tuning gas to the gas flow channels 1929 and 1934 and/or to other locations in the processing chamber as will be described below.

A plasma generator 1970 may be used to generate RF power that is output to the one or more inductive coils 1940. Plasma 1990 is generated in the upper chamber region 1904. In some examples, the plasma generator 1970 includes an RF generator 1972 and a matching network 1974. The matching network 1974 matches an impedance of the RF generator 1972 to the impedance of the one or more inductive coils 1940. In some examples, the gas distribution device 1914 is connected to a reference potential such as ground. A valve 1978 and a pump 1980 may be used to control pressure inside of the lower and upper chamber regions 1902, 1904 and to evacuate reactants.

A controller 1976 communicates with the gas delivery systems 1950-1 and 1950-2, the valve 1978, the pump 1980, and the plasma generator 1970 to control flow of process gas, purge gas, RF plasma and chamber pressure. In some examples, plasma is sustained inside the dome 1918 by the one or more inductive coils 1940. One or more gas mixtures are introduced from a top portion of the chamber using the gas injector 1942 (and/or holes 1923), and plasma is confined within the dome 1918 using the gas distribution device 1914.

Confining the plasma in the dome 1918 allows volume recombination of plasma species and effusing desired etchant species through the gas distribution device 1914. In some examples, there is no RF bias applied to the substrate 1926. As a result, there is no active sheath on the substrate 1926 and ions are not hitting the substrate with any finite energy. Some amount of ions will diffuse out of the plasma region through the gas distribution device 1914. However, the amount of plasma that diffuses is an order of magnitude lower than the plasma located inside the dome 1918. Most ions in the plasma are lost by volume recombination at high pressures. Surface recombination loss at the upper surface of the gas distribution device 1914 also lowers ion density below the gas distribution device 1914.

In other examples, an RF bias generator 1984 is provided and includes an RF generator 1986 and a matching network 1988. The RF bias can be used to create plasma between the gas distribution device 1914 and the substrate support or to create a self-bias on the substrate 1926 to attract ions. The controller 1976 may be used to control the RF bias.

An edge coupling ring can be used to adjust an etch rate and/or etch profile of the plasma near a radially outer edge of the substrate. The edge coupling ring is typically located on the pedestal around the radially outer edge of the substrate. Process conditions at the radially outer edge of the substrate can be modified by changing a position of the edge coupling ring, a shape or profile of an inner edge of the edge coupling ring, a height of the edge coupling ring relative to an upper surface of the substrate, a material of the edge coupling ring, etc.

Figure 7D:
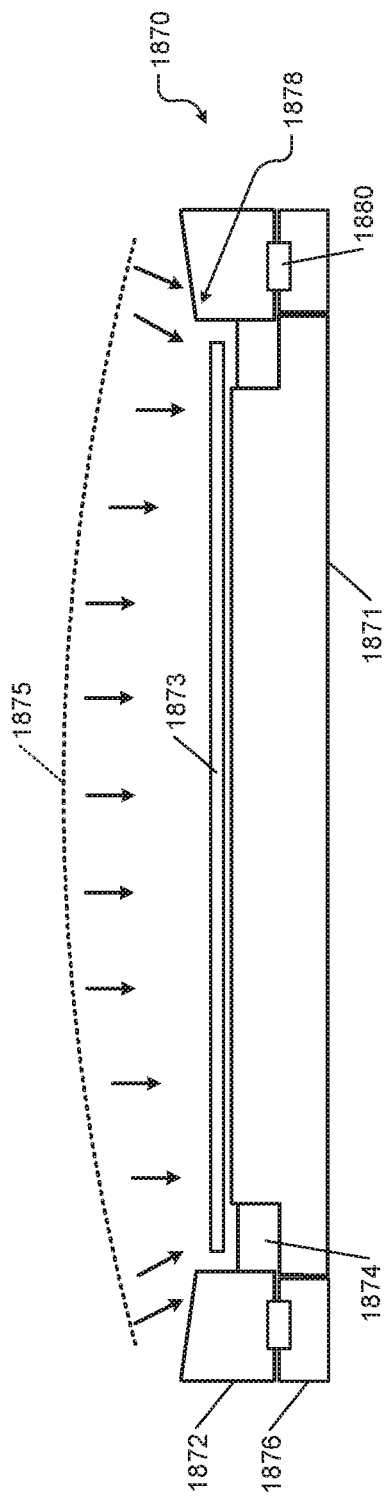
FIG. 7D shows an example of an edge coupling ring in a processing chamber according to certain features of the present disclosure.

FIG. 7D shows an example of an edge coupling ring 1870 surrounding a pedestal 1871. The edge coupling ring 1870 may include a single portion or two or more portions. In the example shown, the edge coupling ring 1870 includes a first annular portion 1872 arranged radially outside of a substrate 1873. A second annular portion 1874 is located radially inwardly from the first annular portion 1872 below the substrate 1873. A third annular portion 1876 is arranged below the first annular portion 1872. During use, plasma 1875 is directed at the substrate 1873 to etch the exposed portions of the substrate 1873. The edge coupling ring 1870 is arranged to help shape the plasma such that uniform etching of the substrate 1873 occurs. After the edge coupling ring 1870 has been used, an upper surface of a radially inner portion of the edge coupling ring 1870 may exhibit erosion (e.g., at 1878). As a result, plasma 1875 may tend to etch a radially outer edge of the substrate 1873 at a faster rate than etching of radially inner portions thereof, and non-uniform etching of the substrate 1873 may occur near a radially outer edge of the substrate 1873.

One or more portions of an edge coupling ring 1870 may be moved vertically and/or horizontally relative to a substrate or pedestal 1871. The movement changes an edge coupling effect of the plasma 1875 relative to the substrate 1873 during etching or other substrate treatment without requiring the processing chamber to be opened. An actuator 1880 may be arranged in various locations to move one or more portions of the edge coupling ring 1870 relative to the substrate 1873. For example only, the actuator 1880 can be arranged between the first annular portion 1872 and the third annular portion 1876 of the edge coupling ring 1870. In some examples, the actuator 1880 may include a piezoelectric actuator, a stepper motor, a pneumatic drive, or other suitable actuator. In some examples, one, two, three, or four or more actuators are used. In other examples, multiple actuators can be arranged uniformly around the edge coupling ring 1870. The actuators may be arranged inside or outside of the processing chamber.

The actuator 1880 is used to move one or more portions of the edge coupling ring 60 to alter the position of the one or more portions of the edge coupling ring 1870. For example, the actuator 1880 may be used to move the first annular portion 1872 of the edge coupling ring 1870. In this example, the actuator 1880 moves the first annular portion 1872 of the edge coupling ring 1870 in an upward or vertical direction such that an edge of the first annular portion 1872 of the edge coupling ring 1870 is higher relative to the radially outer edge of the substrate 1873. As a result, etch uniformity near the radially outer edge of the substrate 1873 is improved.

The actuator 1880 may move in other directions such as horizontal, diagonal, etc. Horizontal movement of the portion of the edge coupling ring 1870 may be performed to center the edge coupling effect relative to the substrate 1873. For example, the actuator 1880 may be arranged radially outside of the edge coupling ring 1870. In addition, the actuator 1880 can move in a vertical (or an up/down) direction as well as in a horizontal (or side to side) direction. Horizontal repositioning may be used when etching of the substrates shows a horizontal offset of the edge coupling ring 1870 relative to the substrates. The horizontal offset may be corrected without opening the processing chamber. Likewise, tilting of the edge coupling ring 1870 may be performed by actuating some of the actuators differently than others of the actuators to correct or create side-to-side asymmetry.

Computer Vision System

As can be appreciated from the above descriptions, there are various types of processes performed on various types of wafers. The wafers are processed in process module arranged tools having different configurations. Depending on the processes being performed and the configurations of the tools, the wafers often travel (i.e., are transported) between chambers and tools. Various types of data is collected from these chambers and tools using sensors that are disposed at various locations in the chambers and tools. In addition, one or more detectors such as cameras can be arranged around a processing chamber to observe and provide additional data about various components within the processing chamber.

A wide range of computer vision detector (sensor) hardware can be used that can work at different wavelengths (e.g., optical camera, IR camera, X-ray imaging, etc.) with different configurations (resolution, depth of field, aperture size, etc.), using different lens types (e.g. field of view, focal length, filters, etc.), and with different communication protocols (USB, MIPI, etc.). Various types of light sources and lighting configurations with different wavelengths can be used. Various techniques, including a checker board or a wafer with a pattern, can be used for in-situ calibration of the camera to account for lens distortions, camera mounting variability, lighting variabilities, etc. The data collected from the detectors and sensors is used to verify whether the processes are being carried out correctly, whether the processes and/or any components in the chambers/tools need to be altered, whether any preventive maintenance needs to be performed or any component needs to be replaced, and so on.

The computer vision system according to certain embodiments of the present disclosure comprises one or more detectors such as cameras placed at one or more locations in a tool (e.g., on top of an airlock of a tool, on a robot arm, on an aligner, and so on). These cameras are in addition to and separate from the cameras often used to observe interior of the process modules. Instead, these cameras capture images of wafers as the wafers are being transported within the platform, between process modules of a tool or between tools.

For example, these cameras capture images of incoming/outgoing wafers, edge coupling rings placed in the airlock, ATM and VTM robot end effectors, and airlock finger pads. This allows for in-situ inspection of the wafer handling system, enabling tool self-aware capabilities, and fleet identification, as well as providing tool adaptation features. The images collected by these cameras are processed on an embedded processor or an external printed circuit board for feature extraction. The extracted features are transmitted to and collected on a fleet-wide distributed computing and communication system capable of big data storage incoming from various tools in the fab, where machine learning is used to build and train models to correlate the data to determine tool health, fleet identification, and for real-time closed-loop control of the tools across the fleet.

Thus, the models trained using image processing techniques allow for in-situ tool inspection and health monitoring of the semiconductor equipment, which also enables real-time adaptive capabilities. It can be appreciated that the computer vision system enables autonomous operation and control of semiconductor tools across the fleet by automating various maintenance, troubleshooting, and tool control tasks.

The computer vision system can provide many benefits. The following are only a few examples of the use cases. For example, the computer vision system can be used to monitor robot end effector and airlock finger pads, in the airlock to detect pad wear (e.g., change in shape, size, color, etc.) over time and predict pad replacement time and alert the user for pad change. For example, the computer vision system can be used to monitor wafer edges to determine wafer placement accuracy in the airlock and its potential drift over time. The observed drift over time can be used to determine ATM/VTM robot health and recommend preventive maintenance schedule. Different wafer placement drift patterns/profiles observed over time can be correlated to different robot subsystem malfunction, which can guide operating personnel for maintenance, and which can reduce troubleshooting cost and time. For example, different types of edge detection algorithms can be used for robot end effector position in this system.

For example, the computer vision system can be used to identify the type of incoming wafer (e.g., logic, memory, 3D NAND, etc.) by determining the die pattern on the wafer and to correlate the tool health to the type of incoming wafer together with the type of recipe used in the processing module. For example, by using object detection algorithms to identify the die patterns and by analyzing gray value histograms in different RGB channels, different wafer type categories can be identified. For example, the computer vision system can be used to monitor changes in color of the CWAC wafer over time and predict CWAC wafer replacement based thereon.

For example, the computer vision system can be used to monitor thickness and edge profile of the edge coupling ring in the airlock to determine if the incoming edge coupling ring is new or used. For example, the computer vision system can be used to monitor thickness and edge erosion profile of the edge coupling ring in the airlock to determine the condition of an outgoing edge coupling ring. For example, the computer vision system can be used to determine an etch rate in a process module based on changes between edge erosion profiles of incoming/outgoing edge coupling ring. This data can be used to auto-adjust recipe of a process module or to automatically adjust the height of the edge coupling ring above the chuck via the lift pins for tool-to-tool process module matching. Many other use cases are contemplated.

Environment

Below are simplistic examples of a distributed computing environment in which the systems and methods of the present disclosure can be implemented. Throughout the description, references to terms such as servers, client devices, applications and so on are for illustrative purposes only. The terms server and client device are to be understood broadly as representing computing devices with one or more processors and memory configured to execute machine readable instructions. The terms application and computer program are to be understood broadly as representing machine readable instructions executable by the computing devices.

FIG. 8A shows a high level architecture of a computer vision system 1770 according to the present disclosure. The computer vision system 1770 comprises a plurality of fleets 1772-1, 1772-2, . . . , and 1772-N (collectively fleets 1772) communicatively connected to a distributed computing system 1774. For example, a fleet of tools can be similar to the arrangement of tools in a fabrication facility shown in FIG. 2. Each fleet 1772 comprises one or more detectors (e.g., cameras) 1780, an image processor 1782, a perception algorithm 1784, a controller 1786, robots 1788, actuators 1790, and recipes 1792. An overview of the computer vision system 1770 is presented below. Details of the computer vision system 1770 are described subsequently with reference to FIG. 9A onwards.

Briefly, the detectors 1780 capture images of various components of the tools in the fleet 1772. The image processor 1784 processes the images. For example, the image processor 1784 may adjust brightness, enhance contrast, and perform operations such as noise filtering, histogram equalization, edge detection, object recognition and tracking, image segmentation, image de-blurring, geometric transformations, feature detection, depth estimation, and so on of an image.

According to certain embodiments, the distributed computing system 1774 comprises a plurality of servers (e.g., see FIGS. 8B-8D and FIG. 11). The distributed computing system 1774 trains various models that can be used for automatically performing specific tasks in the fleet 1772. The distributed computing system 1774 trains the various models based on the data collected from images from the fleets 1172 over time. The distributed computing system 1774 trains the various models using perception, sensor fusion, and machine learning algorithms.

In use, during operation of the fleets 1772, image data is sent to the trained models in the distributed computing system 1774. In response, the controller 1786 in the fleet 1772 receives as inputs the outputs of the trained models in real time to automatically carry out operations such as adjustments, cleaning, servicing and so on of the components of the tools in the fleet 1772, as described below in further detail. In some implementations, the controller 1786 may include an edge computing device.

FIG. 8B shows a simplified example of a distributed computing system 2000. The distributed computing system 2000 includes a distributed communications system 2010, one or more client devices 2020-1, 2020-2, . . . , and 2020-M (collectively, client devices 2020), and one or more servers 2030-1, 2030-2, . . . , and 2030-N (collectively, servers 2030). M and N are integers greater than or equal to one. The distributed communications system 2010 may include a local area network (LAN), a wide area network (WAN) such as the Internet, or other type of network. The client devices 2020 and the servers 2030 may be located at different geographical locations and communicate with each other via the distributed communications system 2010. The client devices 2020 and the servers 2030 connect to the distributed communications system 2010 using wireless and/or wired connections.

The client devices 2020 may include one or more tools, system computers controlling the tools, PMs, and controllers controlling the PMs. The client devices 2020 may also include smartphones, personal digital assistants (PDAs), tablets, laptop computers, personal computers (PCs), etc. used by operators of the tools. The servers 2030 may provide multiple services to the client devices 2020. For example, the servers 2030 may execute software and machine learning applications developed by one or more vendors. The servers 2030 may host multiple databases that are relied on by the software applications in providing services to users of the client devices 2020. The servers 2030 and the databases may be hosted in cloud, on premises, or both.

In some examples, one or more of the client devices 2020 or servers 2030 execute one or more applications that processes the images captures by the cameras installed on the tools. The applications also train one or more models based on the data collected from the images using machine learning techniques. In addition, the applications receive and analyze data from various sensors in the tools and PMs. The applications use the models to analyze data gathered from images and sensors, perform various functions such as diagnostics and troubleshooting root causes of problems in the tools and PMs, adjust processes running in the PMs, and so on. The applications may be implemented as Software-as-a-Service (SaaS).

FIG. 8C shows a simplified example of the client device 2120-1. The client device 2120-1 may typically include one or more central processing unit (CPU), one or more graphical processing unit (GPU), and one or more tensor processing unit (TPU) (collectively shown as processor(s) 2150), one or more input devices 2152 (e.g., a keypad, touchpad, mouse, touchscreen, detectors or sensors such as cameras, etc.), a display subsystem 2154 including a display 2156, a network interface 2158, memory 2160, and bulk storage 2162.

The network interface 2158 connects the client device 2120-1 to the distributed computing system 2000 via the distributed communications system 2110. For example, the network interface 2158 may include a wired interface (e, an Ethernet, EtherCAT, or RS-485 interface) and/or a wireless interface (e.g., Wi-Fi, Bluetooth, near field communication (NFC), or other wireless interface). The memory 2160 may include volatile or nonvolatile memory, cache, or other type of memory. The bulk storage 2162 may include flash memory, a magnetic hard disk drive (HDD), and other bulk storage devices.

The processor 2150 of the client device 2120-1 executes an operating system (OS) 2164 and one or more client applications 2166. The client applications 2166 include an application that accesses the servers 2130 via the distributed communications system 2110. The client applications 2166 may include applications executed by system computers that control the tools. The client applications 2166 may also may include applications that process images captured by the cameras installed on the tools and applications that run a perceptron algorithm, which is a simplest type of artificial neural network. It is a model of a single neuron that can be used for two-class classification problems and provides data for large machine learning algorithms.

FIG. 8D shows a simplified example of the server 2130-1. The server 2130-1 typically includes one or more CPUs/GPUs or processors 2170, a network interface 2178, memory 2180, and bulk storage 2182. In some implementations, the server 2130-1 may be a general-purpose server and may include one or more input devices 2172 (e.g., a keypad, touchpad, mouse, etc.) and a display subsystem 2174 including a display 2176.

The network interface 2178 connects the server 2130-1 to the distributed communications system 2110. For example, the network interface 2178 may include a wired interface (e.g., an Ethernet or EtherCAT interface) and/or a wireless interface (e.g., a Wi-Fi, Bluetooth, near field communication (NFC), or other wireless interface). The memory 2180 may include volatile or nonvolatile memory, cache, or other type of memory. The bulk storage 2182 may include flash memory, one or more magnetic hard disk drives (HDDs), or other bulk storage devices.

The processor 2170 of the server 2130-1 executes one or more operating system (OS) 2184 and one or more server applications 2186, which may be housed in a virtual machine hypervisor or containerized architecture with shared memory. The bulk storage 2182 may store one or more databases 188 that store data structures used by the server applications 2186 to perform respective functions. The server applications 2186 may include applications that process images captured by the cameras installed on the tools, applications that run a perceptron algorithm, applications that train one or more models based on the data collected from the images using machine learning techniques, and sensor fusion applications that receive and analyze data from various sensors in the tools and PMs. As explained below, only camera data may not be sufficient to pinpoint an issue in a tool. Using sensor fusion applications, data from other sensors in the tool can be used in conjunction with the camera data to determine details of the source or root cause of the issue. The server applications 2186 may include applications that use the models to analyze data gathered from images and sensors, that determine root causes of problems in the tools and PMs, and that use these data as the feedback for closed-loop autonomous control of the tool and adjust processes running in the PMs, and so on as described below in detail.

Block Diagrams

Figure 9A:
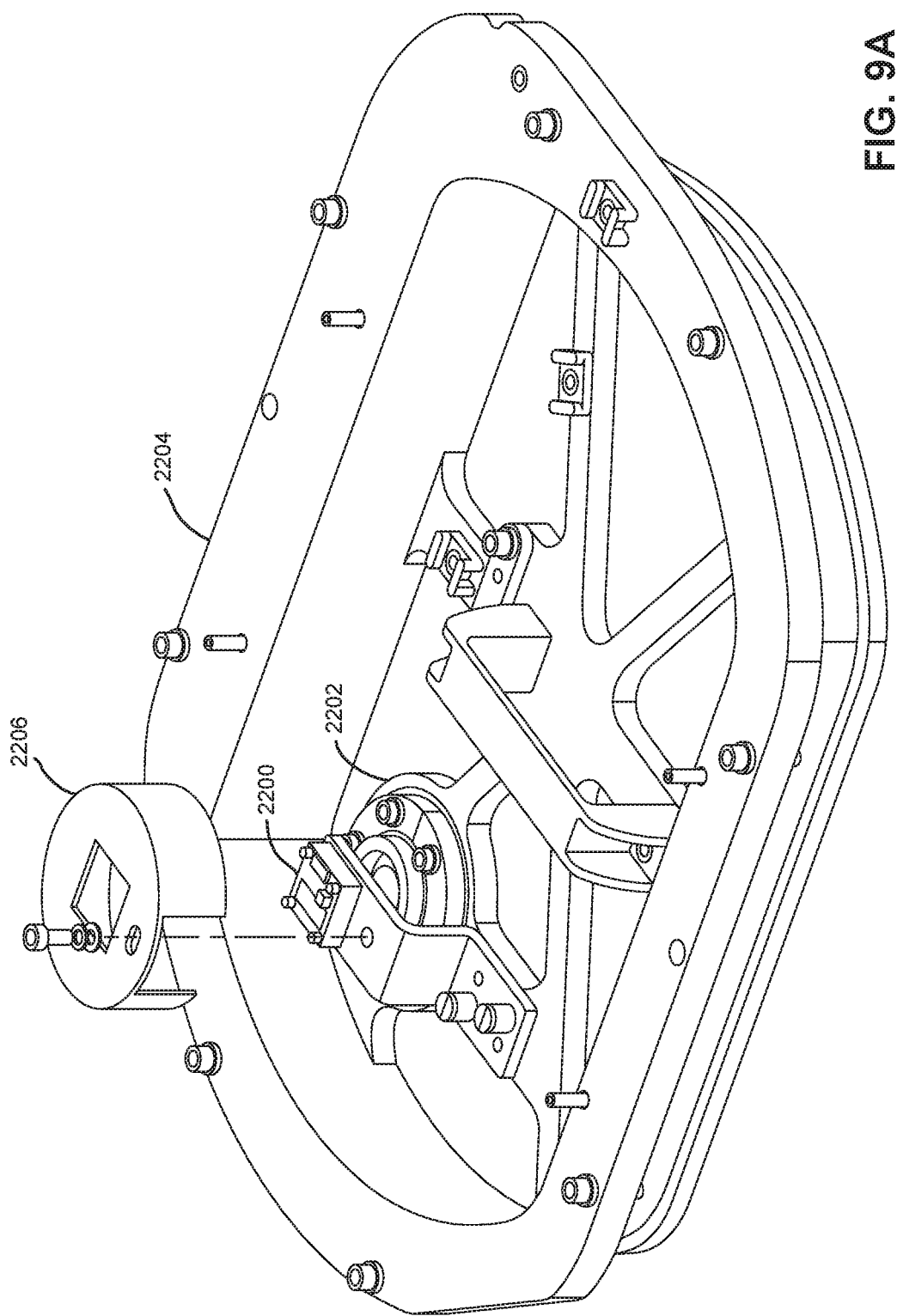
FIGS. 9A-9F show examples of locations in a tool for installing a camera used in the computer vision system according to certain features of the present disclosure.
Figure 9B:
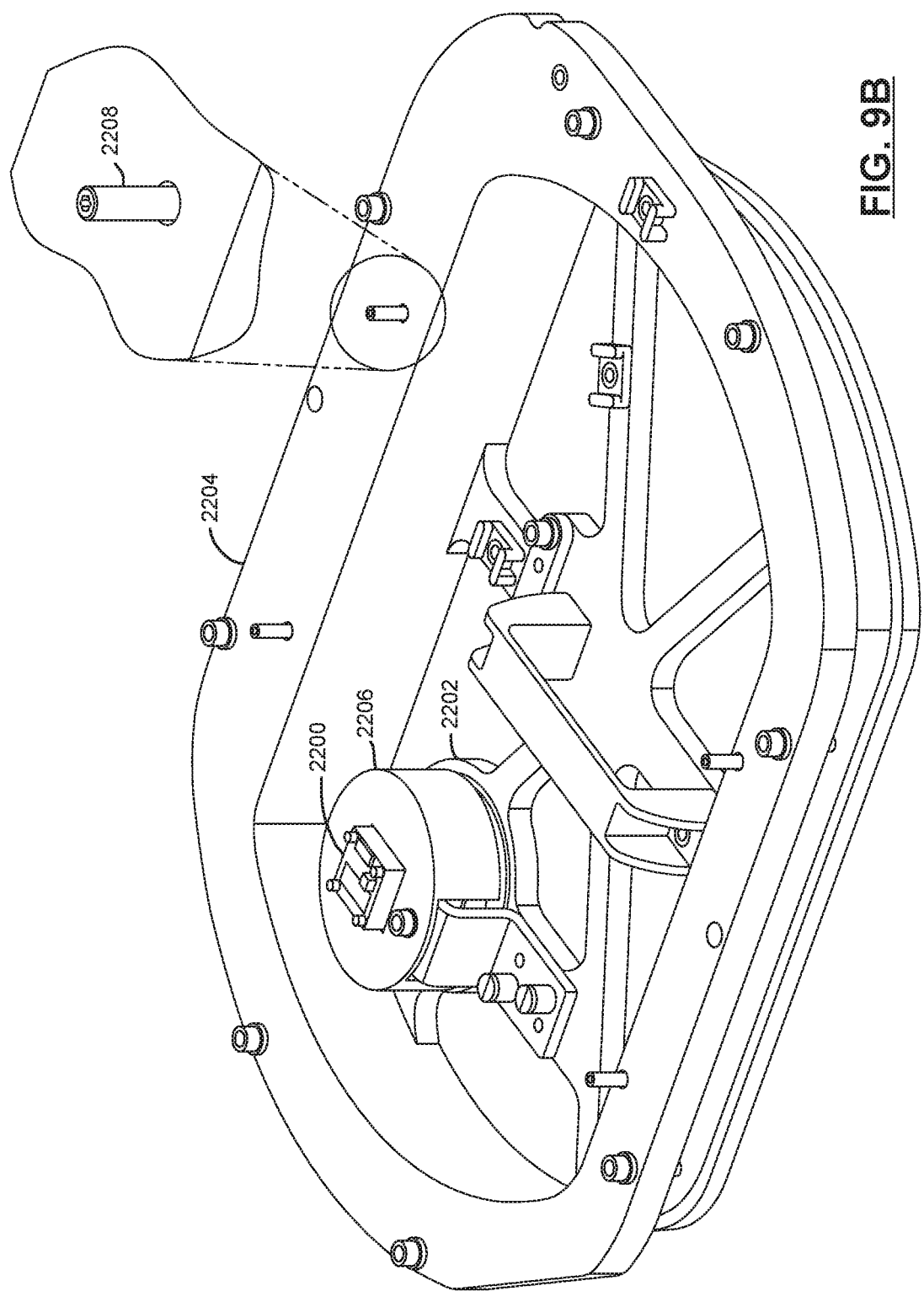
Figure 9C:
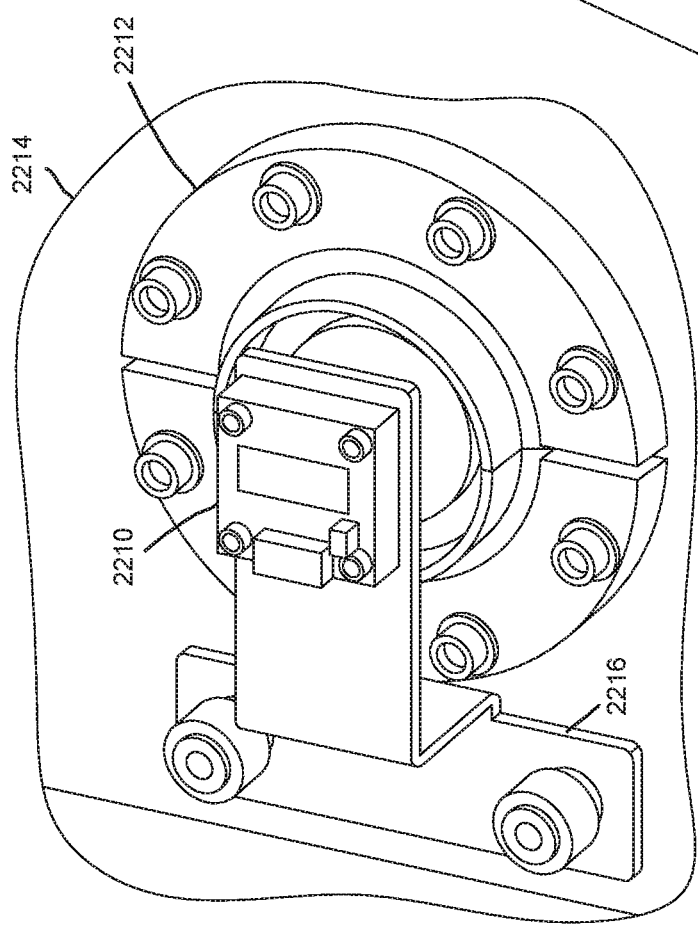
Figure 9D:
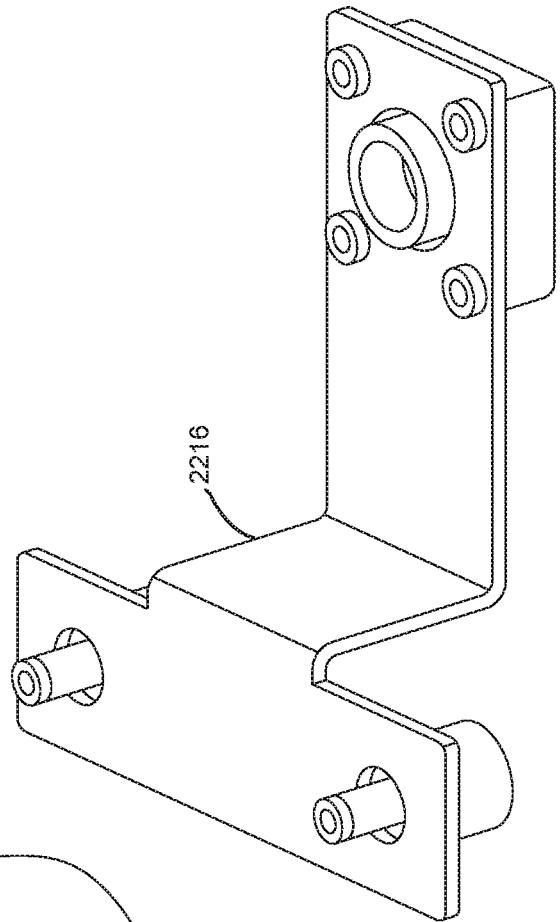

FIGS. 9A-9F show examples of cameras installed in various locations in a tool. In FIG. 9A, for example only, a camera 2200 is arranged (facedown) on a viewing port 2202 of an airlock lid 2204. A cover 2206 surrounds the camera 2200 to block outside light. FIG. 9B shows the cover 2206 installed around the camera 2200. Further, a set of receptacles 2208 to receive fasteners is arranged on the airlock lid 2204 for the purpose of stacking one lid over another during servicing. FIG. 9C shows another camera 2210 that can be arranged on a viewing port 2212 on a side of a load lock, a portion of which is shown at 2214. FIG. 9D shows a mounting assembly 2216 used to mount the camera 2210. The camera 2210 can be used as an alternative to or in combination with the camera 2200.

Figure 9E:
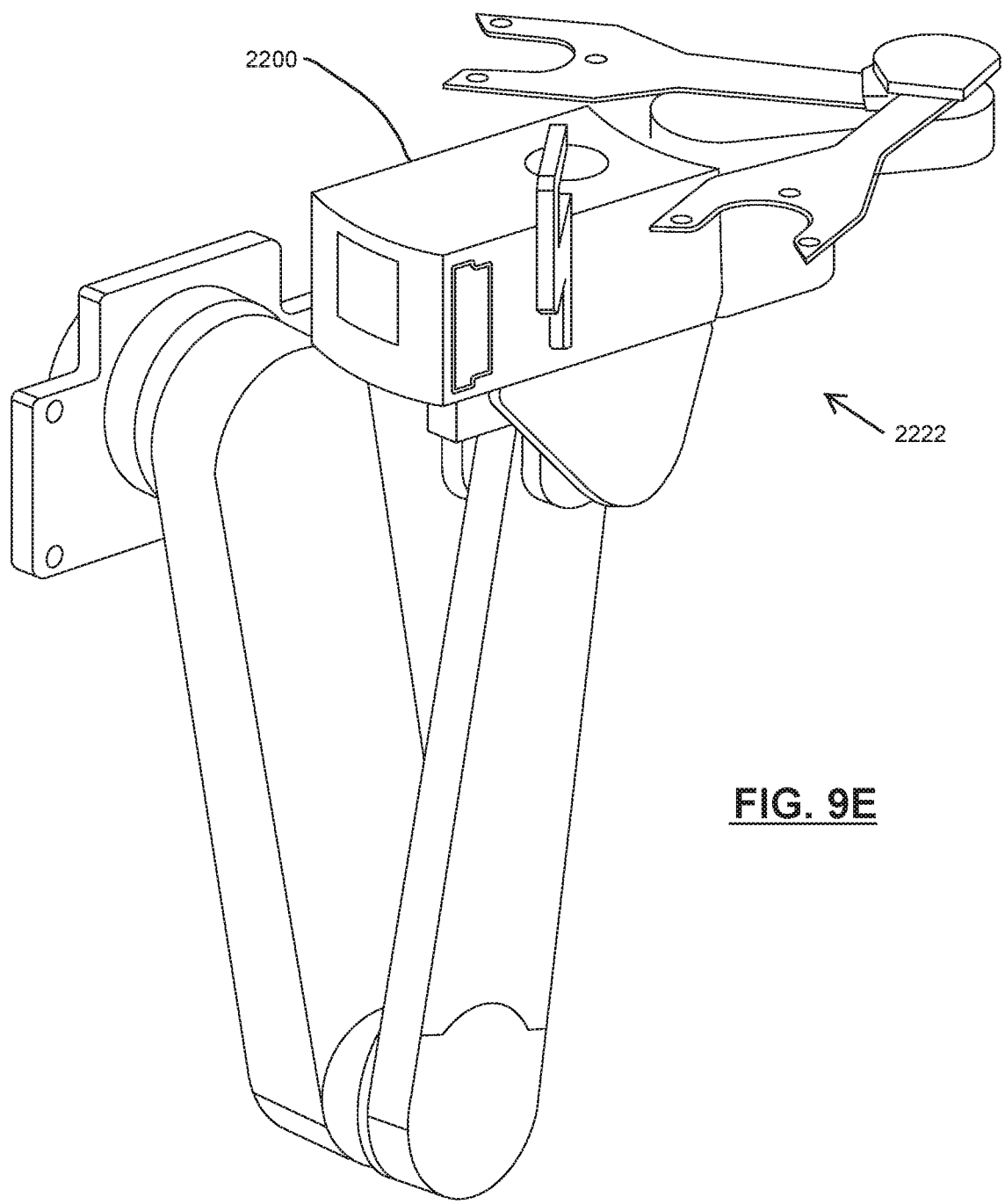
Figure 9F:
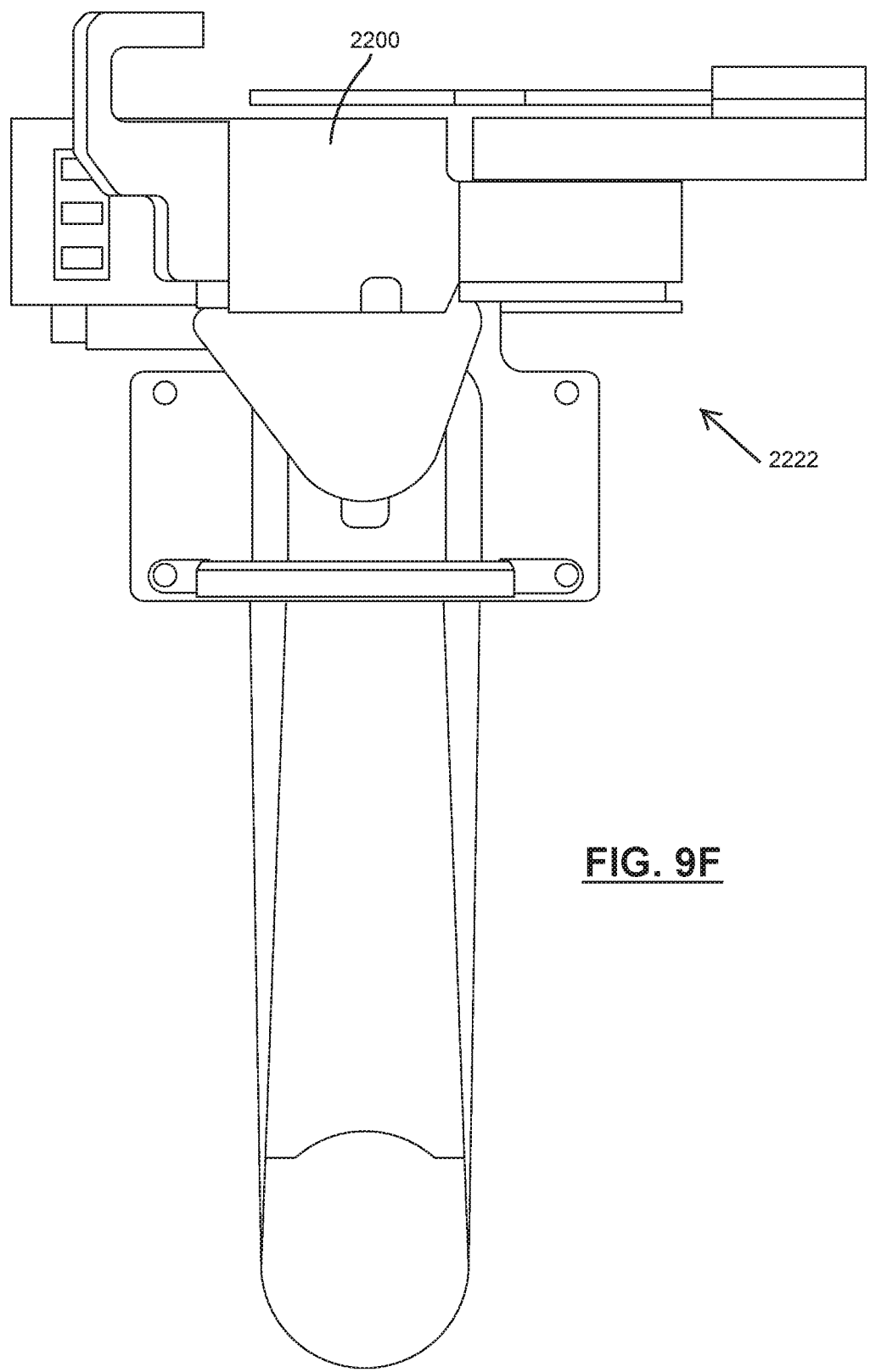

FIGS. 9E and 9F show schematically a camera 2220 that is installed on a robot 2222 with an onboard aligner as another example of camera placement in a tool. FIG. 9E shows a side view of the robot 2222 with the onboard aligner. The camera 2220 can be placed facing down on the aligner head as shown in FIG. 9F.

It should be understood that one or more cameras can be arranged anywhere in the travel path of wafers in a tool. It should be further understood that these cameras are not the cameras that are typically located adjacent to PMs to monitor the interior of the PMs. Nor are these cameras associated with any metrology apparatus integrated with or external to the tool.

FIG. 10A shows a schematic representation of components located in a load lock of a tool that are monitored by the camera 2200. A vertical dotted line is drawn to indicate that only a right hand side of the components is shown and that a symmetric replica of the components exists on the left hand side of the dotted line. Airlock fingers 2300, 2302 respectively include finger pads 2304, 2306. A wafer 2308 is transported by a robot into the load lock and rests on the finger pad 2304. The robot's end effector 2310 has a pad 2312. An edge coupling ring 2314 rests on a pad 2316 located on the finger 2300.

The camera 2200 located on the airlock lid captures images (photographs) of the wafer 2308 and the edge coupling ring 2314. The camera 2200 also captures images of the pads 2304, 2306, 2312, 2316 when the wafer 2308 is not present in the load lock. For example, in addition to capturing images of the surfaces of the wafer 2308 and the edge coupling ring 2314, the camera 2200 captures images of the outer diameter (OD) of the wafer 2308, the inner diameter (ID) of the edge coupling ring 2314, the robot's end effector 2310, and the pads 2304, 2306, 2312, 2316.

FIG. 10B shows an arrangement of cameras for capturing three-dimensional images of the components shown in FIG. 10A. For stereo applications, where three-dimensional images are needed (e.g., to obtain a full 3D image of the edge coupling ring), one or more cameras are needed to obtain the depth information. An example of an arrangement including at least two cameras (e.g., the cameras 2200 and 2201) as shown provides the depth information needed to obtain full 3D images for such stereo applications. In another implementation, stereo image processing with only one camera can be used to create a 3D point cloud of an edge coupling ring's thickness profile as described below with reference to FIG. 18.

FIG. 11 shows a computer vision system 2400 that processes the images captured by one or more cameras 2402 (e.g., elements 2200, 2201, and 2210 shown in FIGS. 9A-10B) installed in a tool 2404 (e.g., any tool shown in FIGS. 1-6C) according to certain embodiments. While only one tool is shown for example only, the computer vision system 2400 comprises a plurality of tools similar to the tool 2404. The cameras 2402 capture images of one or more tool components 2406 such as those described with reference to FIGS. 10A and 10B above. In areas of the tool 2402 such as load locks, where it is dark, a light source 2407 is arranged to illuminate the tool components 2406 so that the cameras 2402 can capture their images. While only one light source 2407 is shown for example, various types of light sources and lighting configurations with different wavelengths can be used. Further, while not shown, the tool 2404 comprises one or more sensors in the path traveled by wafers during processing.

An image processor 2408 processes the images captured by the cameras 2402. For example, the image processor 2408 may clean and/or format an image. For example, the image processor 2408 may adjust brightness, enhance contrast, and perform operations such as noise filtering, histogram equalization, edge detection, object recognition and tracking, image segmentation, image de-blurring, geometric transformations, feature detection, depth estimation, and so on of an image. The image processor 2408 may be located on (e.g., embedded in) the camera 2402 or may be external to the camera 2402 (e.g., on a PCB).

A system computer 2410 controls the tool 2404. In one implementation, raw images may be sent to a remote data center 2412 for processing and/or analysis. Alternatively, in another implementation, the images are processed by the image processor 2408, which may be located in the camera 2402 or on a PCB outside the camera 2402, and only some of the analyzed data is sent to the system computer 2410 and/or the remote data center 2412. The system computer 2410 may send the images to the remote data center 2412 in real time or in batches via the distributed communications system 2010 shown in FIGS. 8B-8D. In addition, the system computer 2410 may send data collected from other sensors in the tool 2404 and sensors in the PMs of the tool 2404 to the remote data center 2412. In some implementations, the system computer 2410 may include an edge computing device.

For example, the remote data center 2412 may comprise a plurality of the servers 2030 shown in FIGS. 8B-8D. At the remote data center 2412, using machine learning, the several models are trained based on the data collected from the plurality of tools such as the tool 2404. The training and functions of the models are explained below in detail. Using the trained models received from the remote data center 2412, the system computer 2410 operates the tool 2404 based on data collected from new images as explained below.

In some embodiments, the system computer 2410 performs various operations recommended by the trained models on the tool 2404. For example, the operations include performing preventive maintenance (e.g., changing one or more of the pads described with reference to FIGS. 10A and 10B, changing CWAC wafer, performing robot maintenance, etc.). The system computer 2410 correlates the health of the tool 2404 to a type of an incoming wafer (logic/memory/3D NAND, etc.) and a type of recipe used in a PM of the tool 2404 by recognizing a die pattern on a wafer, as explained below in detail.

For example, this information can be used to determine an optimal period in which wet clean, Waferless Auto Clean (WAC), Cover Wafer Area Clean (CWAC) procedure can be used based on the recipe used and the incoming wafer type. For example, this information can be used to fine tune the height of the edge coupling ring above the chuck by adjusting the lift pins based on the incoming wafer type. For example, a change in gray value distribution of different channels on an RGB camera for an incoming and outgoing wafer can be used to quantify the quality of on-wafer process results. Measuring these quantities and monitoring their drift over time can be used to identify tool health and perform corrective measures to account for such drifts and to achieve PM matching.

In some embodiments, the system computer 2410 performs various adaptations recommended by the trained models. For example, the system computer 2410 monitors the accuracy of wafer placement in an airlock and makes corrections, if any, in real time when a robot places a new wafer in the airlock. The system computer 2410 automatically adjusts the recipe used in a PM based on reduction in thickness of an incoming and outgoing edge coupling ring. The system computer 2410 determines an etch rate in a PM based on a detected change in inner diameter (i.e., change in edge erosion profile) or thickness of incoming/outgoing edge coupling rings. The system computer 2410 uses this information to automatically adjust a recipe in a PM for tool-to-tool PM matching or to adjust the height of the edge coupling ring above the chuck by adjusting the lift pins. These and other functions performed by the computer vision system 2400 based on the images captured by the cameras 2402 are now described in detail.

Throughout the present disclosure, a wafer is called an incoming wafer if the wafer is not yet processed, and the wafer is coming from EFEM and is going to VTM; and a wafer is called an outgoing wafer if the wafer is already processed in a PM and is leaving the VTM towards EFEM.

In use, the shape of the various pads shown and described with reference to FIGS. 10A and 10B above changes over time. The camera 2402 captures the images of these pads for every wafer processed in the tool 2404. From an analysis (e.g., correlation) of these images captured over time (performed at the camera 2402, the image processor 2408 on a PCB near the camera 2402, the system computer 2410, or the data center 2412), the computer vision system 2400 can detect if a pad is dirty, needs to be cleaned, or replaced. The computer vision system 2400 monitors the wear on these pads, learns from their images over time, and trains a model (at the data center 2412) to predict service and/or replacement of these pads. The computer vision system 2400 continues to learn more about the wear on these pads from each image and refines the model to improve the predictions. These predictions can improve the service and/or replacement procedures for these pads, which can reduce costs and improve the efficiency of the tools.

For example, if the computer vision system 2400 identifies that robot end effector pads need cleaning, an automated procedure can be developed where the end effector is placed under load lock purge ports, which are located on the top ceiling of the load lock. A gas (e.g., N2) is blown at a high flow rate from the purge ports towards the end effector, which can remove particles from the robot end effector and the pads. It should be appreciated that this procedure fully automates the cleaning of the robot end effector(s) in a closed-loop manner.

The CWAC wafers change color over time. In some embodiments, the computer vision system 2400 is also configured to capture images of these wafers. The computer vision system 2400 monitors the change in color of these wafers, learns from their images over time, and trains a model (at the data center 2412) to predict replacement times for these wafers. The computer vision system 2400 continues to learn more about the change in color of these wafers from each image and refines the model to improve the predictions. These predictions can improve the replacement procedures for these wafers, which can reduce costs and improve the efficiency of the tools.

In some embodiments, the computer vision system 2400 observes the outer edges of each incoming and outgoing wafer. A drift in the wafer edges over time may indicate problems with an ATM/VTM robot. However, the problem may also occur because the wafer is not being picked up properly by the VTM robot from the PM due to issues with the lift pins, clamping force, and so on. For example, in a tool with six PMs, wafers removed from five PMs by the VTM robot may get properly placed in the load lock as indicated by monitoring the wafer edges, whereas wafers removed from only one PM by the same VTM may be slightly shifted when placed in the load lock. This information obtained from an analysis of the images captured by the computer vision system 2400 can help identify the source for the shift, which may be due to the lift pins in the one PM, and not due to any issue with the VTM robot.

Dynamic alignment sensors in the tool 2404 also monitor wafer placement. The data collected via the camera 2402 for the wafer edge can be used together with data from dynamic alignment (DA) sensors via a sensor fusion algorithm to better identify the sources of an issue. Data from these sensors also helps in troubleshooting problems in the tool 2404. Further, several calibration procedures are performed on such components of the tool 2404 so that troubleshooting based on sensor data can be accurate and does not result in false alarms. The data captured from the images can complement the data from these and other sensors in the tool 2404 and from the calibration and troubleshooting procedures, and can help pinpoint the root cause of a problem. For example, many sensors and actuators in the path traveled by a wafer from a PM to the load lock in the tool 2404 may provide data, which can be correlated with the data captured by the images. Based on the correlation, the exact sensor or actuator causing the problem can be identified.

In some embodiments, the computer vision system 2400 can train a model to identify a type of each wafer processed by the tool 2404. Different devices (e.g., memory, processor, etc.) may be manufactured on different wafers using several tools in a fabrication facility (e.g., see FIG. 2). Knowing the type of wafer can help identify problems in the tools. The type of wafer can be identified by processing an image of a wafer (e.g., whether a wafer is a memory wafer, a processor wafer, and so on). For example, an image of a wafer may show a die pattern including features with different shapes (e.g., squares, rectangles, etc.), different sizes, different colors, and so on. The die patterns on the wafers can be found via object detection algorithms, monitored and learned, and a model can be trained to identify a type of each wafer, using the images of the wafers captured over a period of time.

Subsequently, using the trained model, any deviation in the die pattern on wafers from one of the PMs or tools can be detected based on data gathered from the images of those wafers and correlating the data with the learned die patterns. Further, using the learned patterns (i.e., using the trained model), together with other data collected from images of wafers and/or other (e.g., sensor based) diagnostic systems, a problem with a particular PM in a particular tool and/or a problem with a particular component in the PM or the tool can be identified.

For example, often a recipe is used to condition (e.g., clean) a PM. While performing the recipe, a non-production wafer (e.g., a dummy wafer or a conditioning wafer) is used. The dummy wafer does not have any die pattern. The dummy wafer is sent through the same wafer flow and process recipe that the production wafers would go through. Current systems cannot distinguish these dummy wafers from production wafers. The computer vision system 2400, which can identify a type of wafer based on a die pattern on the wafer, can distinguish these dummy wafers from production wafers and know the type of wafer before the processing begins. Again, the same model that is used to identify a type of wafer can be further trained and used to also identify the dummy wafer.

In some tools, a sensor may be used to determine whether a wafer has a die pattern. However, in these tools, the sensor detects the die pattern at an end point of a process. If the detected die pattern is different than what the recipe is setup for, a recipe failure is declared and corresponding corrective procedures are triggered. Such failures may in fact be not failures when a dummy wafer is mistaken as a defective wafer due to a nonexistent die pattern on it, and a recipe correction may be unnecessarily be triggered. Such failures can be automatically prevented based on the awareness of the type of wafer and categorization of wafers provided by the computer vision system 2400.

For example, using the models trained by the computer vision system 2400, an image of an incoming wafer can be used to identify the type of wafer, and the PMs in the tool 2404 can be automatically informed about the type of the incoming wafer. The PMs can then automatically select proper recipes and/or adjustments thereto to process the incoming wafer. When the wafer is processed and leaves the tool 2404, an image of the outgoing wafer is again captured and compared with a database of previously captured images of wafers that have undergone similar processing to confirm whether the outgoing wafer was correctly processed. For example, the database may be maintained at the data center 2412, the computer system 2410, or at least partially on both the data center 2412 and the computer system 2410.

For example, depending on the type and stage of processing, simple indicators such as the color of the incoming and outgoing wafers can indicate the type of incoming wafer, the type of recipe to be selected by the PMs to process the incoming wafer, and whether the processing was successful. In other examples, the indicia for identifying the type of a wafer and determining whether a wafer was successfully processed can also include a gray value (light intensity) of an image of the wafer at different pixels, features on the wafer, dimensions and colors of certain features on the wafer, and so on.

Many wafer categories can be observed and stored in a database based on images of numerous wafers captured over time. Comparing images of new wafers with images from multiple categories of wafers can improve the detection of wafer type and slight variations in the processed (and to be processed) wafers. Features such as dimensions and colors of certain areas of the wafer can be determined over time based on numerous images of each type of wafer captured over time. The model used to classify the wafer type can be further trained to receive a feature extracted from an incoming or an outgoing wafer and to output a wafer type based on a comparison of the received feature with a database of features built over time by observing many wafers. The database may be maintained at the data center 2412, the computer system 2410, or at least partially on both.

For example, categorization of wafers may be based on the types of features that are observed on the wafers. When a wafer arrives in the view of the camera 2402, whether before or after processing, an image of the wafer is captured, one or more features are extracted from the image, the features are compared and correlated with the features stored in a database, and a wafer type and/or success or failure of the process performed on the wafer can be determined. Similar methodology can be used to select a recipe to process the identified wafer as well. Notably, all these operations can be performed automatically (i.e., without human intervention) using the models trained by the computer vision system 2400.

Note that not only the computer vision system 2400 captures images of the wafers using cameras in the airlocks, but the computer vision system 2400 can operate in conjunction with other data collected by many other systems (e.g., sensors, cameras associated with PMs, etc.) located in the tool 2404. For the computer vision system 2400 to be reliable, many factors such as lighting, camera orientation and leveling, and so on need to be relatively constant. To allow for any variations in these factors, which may be inevitable sometimes, the data collected by the computer vision system 2400 may be normalized using the data collected by these other systems to minimize or eliminate the effect of disparities in these factors.

In this manner, the computer vision system 2400 not only identifies the type of an incoming wafer but also verifies whether an outgoing wafer was properly processed. Further, if the outgoing wafer was not properly processed due to a failure somewhere in the tool 2404, the computer vision system 2400 can identify the root cause of failure using models trained by historically labeled data. Furthermore, the computer vision system 2400 can (e.g., based on observing the pads, wafers, etc.) prevent problems from occurring (e.g., by suggesting replacement of parts, preventive maintenance, etc.) and can also suggest corrective operations by pinpointing the root cause of a problem.

Some tools include integrated metrology modules that analyze wafers before and after processing. However, the computer vision system 2400 not only analyzes wafers before and after processing (i.e., between two processes), which eliminates the need for metrology, but also analyzes the performance of wafer transport mechanisms (robots, pads, associated sensors, etc.) and of the PMs themselves, which the metrology modules cannot perform. The computer vision system 2400 performs these functions using data from the captured images of the wafers and other components such as the various pads and using the operational and diagnostic data from other mechanisms (e.g., sensors in the tools and the PMs), which augments the performance of the tools (i.e., the transport mechanisms in the tools) and the PMs.

The camera(s) 2402 can be placed at other locations in the tool 2404. These cameras 2402 are separate and in addition to any cameras placed proximate to the PMs and those used by metrology apparatuses, whether integrated in the tool 2404 or external to the tool 2404. Further, the cameras 2402 can be placed in tools across a fleet of tools. This can enlarge the database of the images captured, which can improve the training of the models built at the data center 2412 based on the image data and can make the models more robust. The robust models can perform the functions of the computer vision system 2400 with increased statistical confidence, which can improve the overall performance of the PMs, the tools, and the fleet of tools.

The computer vision system 2400 can also assist in PM matching. PMs are regularly cleaned after a certain number of wafers are processed. However, different incoming wafer types could have different materials outgassed into PMs. In addition, different processes performed on wafers in a PM leave different byproducts in the PM, which need to be cleaned. Using the same cleaning recipe for all incoming wafer types may not clean the chamber adequately to process the next incoming wafer. The computer vision system 2400 knows the process performed in a PM based on the image captured of the outgoing wafer. The computer vision system 2400 can leverage past data of cleaning processes performed on PMs and can assist the PM in selecting the proper recipe for cleaning the PM so that the PM is in condition to process the next incoming wafer.

Since every wafer is photographed in the tool 2404 and the models are continually refined at the data center 2412, the tool 2404 can be optimized based on the data amassed by the computer vision system 2400. For example, the number of cleaning cycles of the PMs in the tool 2404 can be optimized. For example, cleaning of a PM in the tool 2404, although recommended by another mechanism in the tool 2404, may be deferred or delayed based on the images of outgoing wafers that were processed in that PM. Notably, these images are instantly available and are analyzed in real time or near real time by the computer vision system 2400. Accordingly, the optimization of the tool 2404 can be performed on the fly. Such optimization cannot be performed using traditional metrology, which can take hours or days to provide results. Using the computer vision system 2400, a model can be trained at the data center 2412 to receive as input the images of outgoing wafers processed in a PM and provide an output controlling when cleaning may be performed in the PM. It can be appreciated that the procedure fully automates PM cleaning via WAC or CWAC in a closed-loop manner.

As another example, the speed of one or more robots in the tool 2404 may be increased until a slight degradation in performance is observed based on the images of the wafers.

In other words, the throughput of the tool 2404 can be automatically increased in real time or near real time without performing metrology. Further, wait times of wafers between processes can be optimized based on the recent image data. Thus, the computer vision system 2400 can provide better than metrology-level performance using non-metrology optics (i.e., without performing spectroscopic analysis of wafers and by performing optical analysis of an image of a wafer or a portion of a wafer instead). Notably, the computer vision system 2400 is not only faster than metrology but is also less expensive than metrology.

The computer vision system 2400 can also analyze edge coupling rings. An edge coupling ring is typically transferred from EFEM to airlock to PM, where it is placed around an ESC. The edge coupling ring has a particular thickness, inner diameter, and profile. These and other parameters of the edge coupling ring are observed by capturing an image of the edge coupling ring before the edge coupling ring is transferred to the PM. In the PM, the edge coupling ring is exposed to the process performed on the wafer. As a result, one or more parameters of the edge coupling ring may change. The edge coupling ring is designed for use for a certain number of RF hours. Similar edge coupling rings may be used in PMs performing similar process for similar duration (i.e., number of RF hours).

Subsequently, when the edge coupling ring is fully used, it is transferred out of the tool via the load lock. Images of the outgoing edge coupling rings from these PMs are captured, and the geometrical parameters are measured and correlated by the computer vision system 2400. For example, one edge coupling ring may exhibit more change than others (e.g., a different gray value in the image, indicating a different surface roughness relative to others). The change in the one edge coupling ring is analyzed, optionally along with other data (e.g., from other sensors in the tool 2404), to identify the root cause for the change or to control operating conditions of the PM to achieve optimal on-wafer process quality or PM matching.

For example, based on the analysis of the change, which indicates that one of the PMs is operating differently (i.e., producing different effects on the edge coupling ring) although the same process is performed in that PM as in the other PMs for the same number of RF hours. The recipe for the process performed in that PM may be adjusted using a model trained by the computer vision system 2400. Alternatively, the positioning (height, tilt angle, etc.) of the edge coupling ring in that PM may be adjusted using a model trained by the computer vision system 2400. Further, different PMs may use edge coupling rings having different parameters. The analysis of an incoming edge coupling ring can also be used to confirm if the correct type of edge coupling ring is being used in that PM.

Using the computer vision system 2400, different models can be trained to perform these different functions. Once sufficiently trained, these models can receive images of the edge coupling rings as inputs and can provide outputs such as adjustments to be made to a recipe, adjustments to be made to the height of the lift pins of an edge coupling ring, and so on. Ongoing training refines (i.e., improves the accuracy of) the outputs of these models. It can be appreciated that such a system allows for autonomous control of the tool for PM matching via edge coupling ring height measurement and control.

Edge coupling rings can also be tracked by capturing their serial numbers from their images. Typically, one edge coupling ring is to be used in one particular PM type. That is, the edge coupling rings may not be moved across the PM types. Monitoring of the serial numbers of the edge coupling rings can be used to verify whether the correct edge coupling rings are being used in respective PMs. This determination can also help in isolating some of the problems that may be arising due to switching of the edge coupling ring and ascertaining that the problems are not occurring due to faulty sensors, improper recipe, etc. The serial number tracking can also help in ascertaining if an edge coupling ring is supplied by a third party, which can also be the cause of some of the problems. A model can be trained to output a serial number of an edge coupling ring upon receiving an image of the edge coupling ring as input, which can be used in troubleshooting.

Further, after the cleaning performed in a PM, a witness wafer can be dispatched to a PM after an edge coupling ring. By capturing images of the witness wafer before and after the wafer is processed, the quality of cleaning performed in the PM can be automatically inspected. A similar inspection of a PM can be performed by analyzing images of an edge coupling ring using the computer vision system 2400 after the edge coupling ring is used for some time. Again, a model can be trained to recognize the effect of the processing on the edge coupling ring based on an image of the edge coupling ring as an input to the model and to provide an output indicating the quality of cleaning performed in the PM or an output suggesting when and what type of cleaning may be performed in the PM.

Furthermore, as explained below in detail, the edge coupling ring in a PM can be typically adjusted during the time period between two consecutive cleaning operations in the PM and also during the processing of a wafer itself in the PM. Inspecting the image of the edge coupling ring after the wafer is processed, along with the data about the adjustments performed for the edge coupling ring during the processing of the wafer in the PM, can provide an indication of the health of the PM. A model can be trained to output an indication of the health of the PM upon receiving an image of the edge coupling ring as input.

This procedure is explained in detail by referring to FIGS. 8A, 10B, and 11. Some edge coupling rings allow for better control of plasma field within etch PMs to achieve optimized on-wafer process results. These edge coupling rings can be automatically transferred from EFEM to PMs via a transfer module (TM), which makes it possible to achieve continuous production without the need to open the PM for a long time (e.g., up to a year). However, due to the difference in conditions of PMs within a tool or across different tools, on-wafer results are not always similar.

To achieve PM-to-PM matching, techniques are needed to measure etch rate across different tools, monitor their drift over time, record their change after maintenance (e.g., wet clean, CWAC), and create procedures to automatically adjust etch process parameters of PMs (e.g., recipe, ESC temperature, gas flow, time duration, etc.) to correct for such changes. A new technique is outlined here that allows for automated measurement of in-/out-bound (new/used) edge coupling ring parameters and the corresponding system (see FIGS. 8A, 10B, and 11) for automated PM-to-PM matching. The system measures the thickness change between a new edge coupling ring going into a PM and the same edge coupling ring leaving the PM at the end of its life. The system also automatically adjusts process parameters of the PM for PM-to-PM matching.

The system comprises two cameras placed in the TM at a location where a new/used edge coupling ring will pass through (e.g., airlock, aligner, robot arm, etc.). This allows for accurate measurement of thickness reduction of a used edge coupling ring. Knowing the usage history of the edge coupling ring (e.g., the number of RF hours for which the edge coupling ring has been used) and its thickness reduction, the PM's erosion rate can be determined. FIG. 10A shows schematically how placing the cameras in the airlock above the edge coupling ring can be implemented. FIGS. 8A and 11 show overall data flow infrastructure used for automatically adjusting PM process parameters for PM-to-PM matching.

According to certain embodiments, the cameras measure and send change in thickness of the edge coupling ring to the system computer. The system computer stores the data for the preceding 1-3 months, sends the data to the host/cloud (e.g., the data center) in real-time. The host comprises infrastructure (e.g., servers, storage, etc.) big data analysis. The host determines the etch rate of the PM based on change in thickness between incoming/outgoing edge coupling ring. The host trains machine learning (e.g., neural network, Tensor flow, etc.) based models using data from all similar PMs that run the same recipe on daily/weekly basis (data science infrastructure). The host uses the trained model and real-time data to recommend adjustments to PM process parameters for PM-to-PM matching. The system computer performs the recommended actions on the PM to auto-adjust the PM process parameters for PM-to-PM matching.

In general, tools include several control parameters that can be monitored (observed) using the computer vision system 2400. Based on the observed data about these parameters, the computer vision system 2400 can train models to ascertain whether automatic process control loops employed in the tool 2404 are operating properly or not. Thus, the computer vision system 2400 can use trained models to automate the management of a host of components of tools in a fleet. For example, the computer vision system 2400 can use the trained models to automatically adjust the height of the edge coupling rings, the CWAC duration and interval, the robot end effector cleaning, and so on, which improves the overall performance, efficiency, throughput, and life of the tools.

Flowcharts and Models

FIGS. 12A-13F show examples of various methods performed by the servers 2030 and the system computer 2410 shown in FIG. 11. FIGS. 12A-12F show methods performed by the servers 2030 to train various models using perception, sensor fusion, and machine learning algorithms based on images captured from various tools. FIGS. 13A-13F show methods performed by the servers 2030 and the system computer 2410 using the trained models based on images captured in real time (i.e., on the fly, or when the tool is being used during production to process wafers).

Figures 12A, 12B:
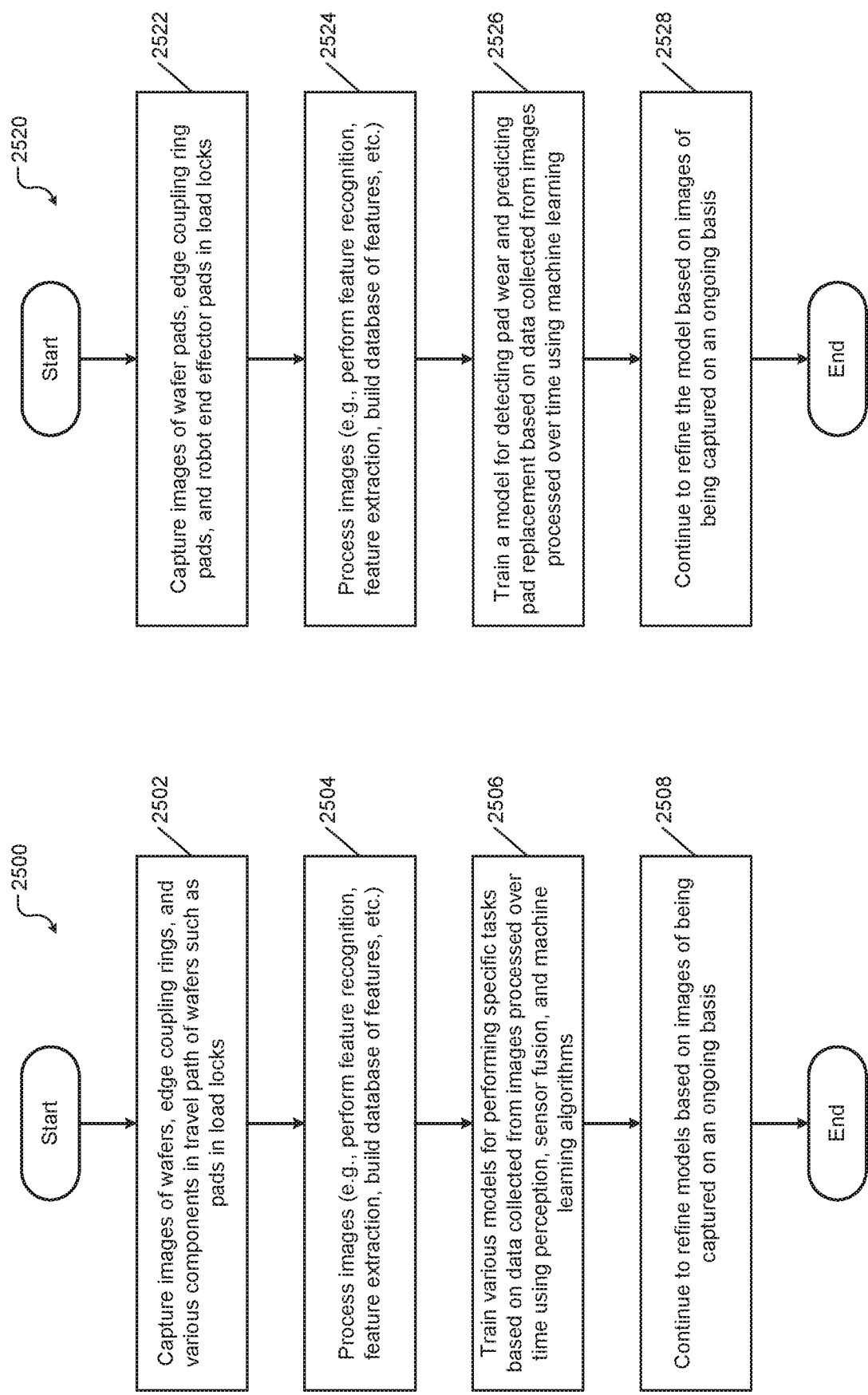
FIGS. 12A-12F show example flowcharts of methods for training various models using machine learning based on images captured by the computer vision system from various tools.

FIG. 12A shows a method 2500 for capturing images of wafers, various pads, and edge coupling rings from various tools and training various models based on the captured images using perception, sensor fusion, and machine learning algorithms according to some embodiments. At 2502, the method 2500 captures images of wafers, edge coupling rings, and various pads at locations such as load locks. At 2504, the method 2500 processes the images. For example, the images may be cleaned and formatted. Further, brightness, contrast, and so on of the images may be adjusted. For example, the method 2500 may adjust brightness, enhance contrast, and perform operations such as noise filtering, histogram equalization, edge detection, object recognition and tracking, image segmentation, image de-blurring, geometric transformations, feature detection, depth estimation, and so on of an image. Furthermore, features that can be used to determine a wafer type, to determine condition of an edge coupling ring, to determine condition of various pads may be recognized and extracted from the captured images and may be stored in one or more databases.

At 2506, the method 2500 trains various models for performing specific tasks based on the data collected from images processed over time using perception, sensor fusion, and machine learning algorithms. For example, the tasks may include but are not limited to determining a wafer type, determining condition of an edge coupling ring, determining condition of various pads, determining preventive maintenance and cleaning schedules, determining replacement schedules for components such as pads and conditioning wafers, determining etch rates, adjusting PM recipes, and so on. At 2508, the method 2500 continues to refine (i.e., further train) these models based on images captured and processed using the trained models on an ongoing basis.

FIG. 12B shows a method 2520 for training a model for detecting pad wear and predicting pad replacement in load locks according to certain embodiments. At 2522, the method 2520 captures images of wafer pads, edge coupling ring pads, and robot end effector pads in load locks. At 2524, the method 2520 processes the images. For example, the images may be cleaned and formatted. Further, brightness, contrast, and so on of the images may be adjusted. For example, the method 2520 may adjust brightness, enhance contrast, and perform operations such as noise filtering, histogram equalization, edge detection, object recognition and tracking, image segmentation, image de-blurring, geometric transformations, feature detection, depth estimation, and so on of an image. Furthermore, features that can be used to determine condition of the various pads may be recognized and extracted from the captured images and may be stored in one or more databases.

At 2526, the method 2520 trains a model for determining the condition of the various pads, determining preventive maintenance schedules, and determining replacement or auto-cleaning schedules for the various pads. For example, if the method 2520 identifies that robot end effector pads need cleaning, an automated procedure is developed where the end effector is placed under load lock purge ports, which are located on the top ceiling of the load lock. A gas (e.g., N2) is blown at a high flow rate from the purge ports towards the end effector, which can remove particles from the robot end effector and the pads. It should be appreciated that this procedure fully automates the cleaning of the robot end effector(s) in a closed-loop manner. At 2528, the method 2520 continues to refine (i.e., further train) the model based on images captured and processed using the trained model on an ongoing basis.

Figure 12D:
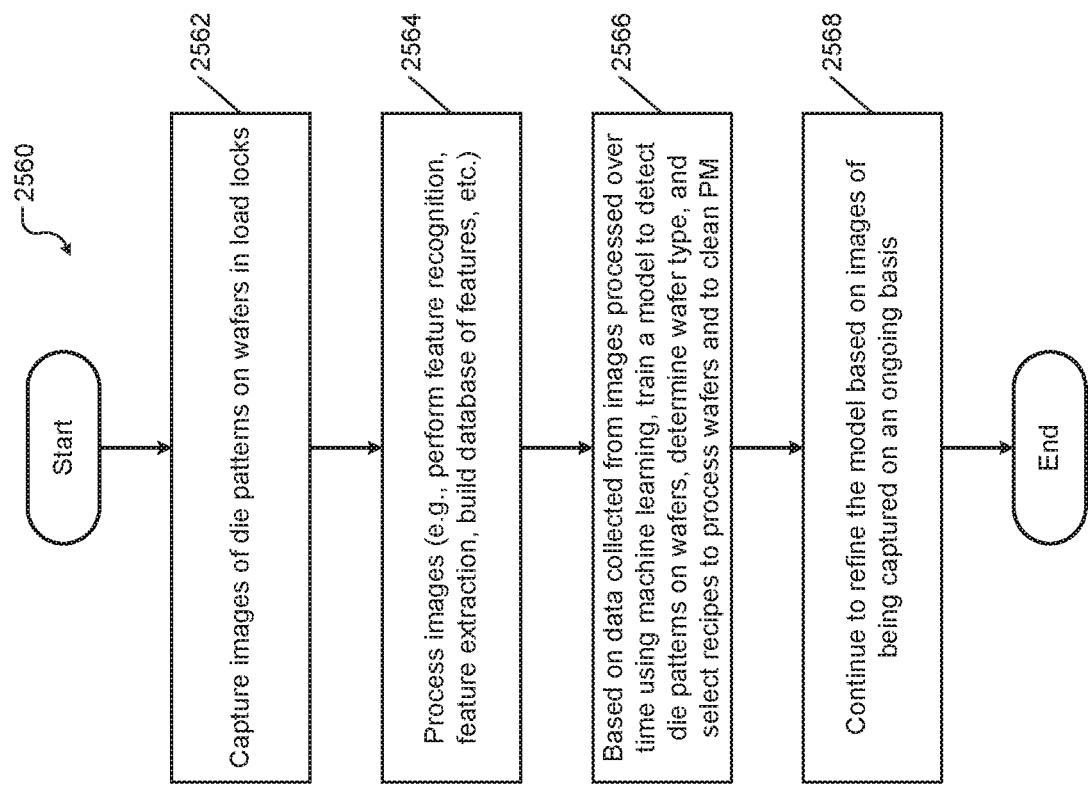
Figure 12C:
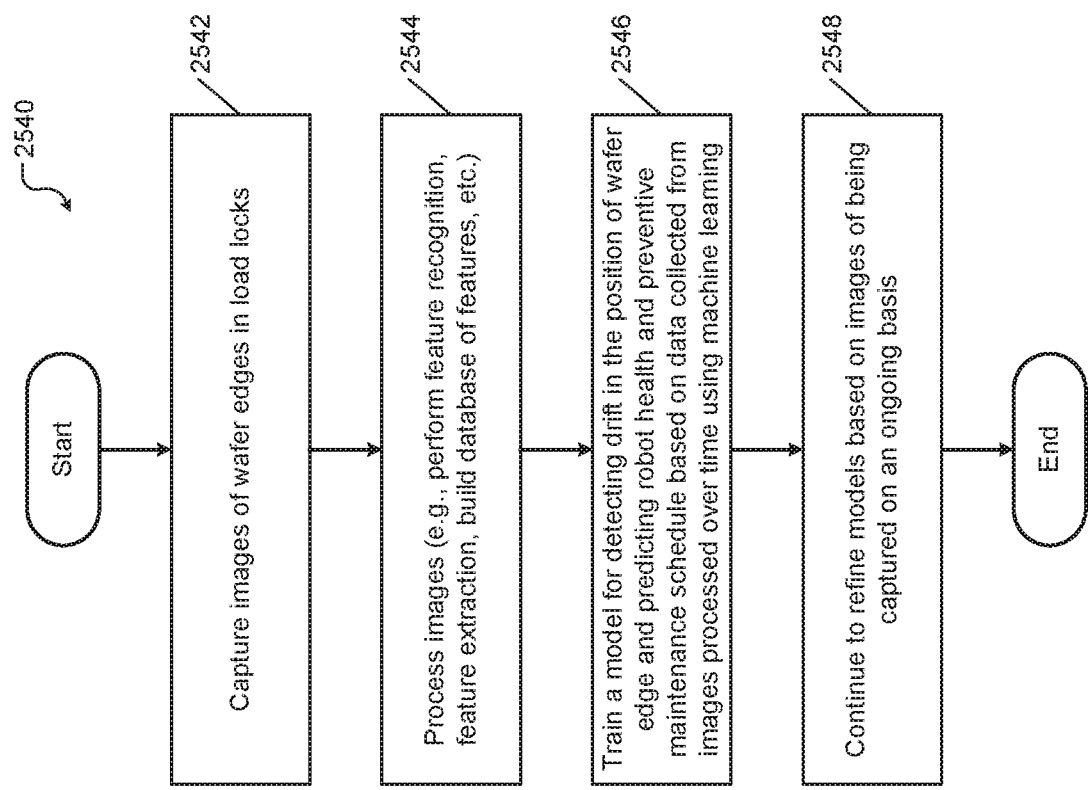

FIG. 12C shows a method 2540 for training a model for detecting drift in wafer placement in load locks and predicting robot health and preventive maintenance schedule according to certain embodiments. At 2542, the method 2540 captures images of wafer edges in load locks. At 2544, the method 2540 processes the images. For example, the images may be cleaned and formatted. Further, brightness, contrast, and so on of the images may be adjusted. For example, the method 2540 may adjust brightness, enhance contrast, and perform operations such as noise filtering, histogram equalization, edge detection, object recognition and tracking, image segmentation, image de-blurring, geometric transformations, feature detection, depth estimation, and so on of an image.

Furthermore, features that can be used to determine drift in wafer placement in load locks may be recognized and extracted from the captured images and may be stored in one or more databases. At 2546, the method 2540 trains a model for detecting drift in wafer placement in load locks and predicting robot health and preventive maintenance schedule. At 2548, the method 2540 continues to refine (i.e., further train) the model based on images captured and processed using the trained model on an ongoing basis.

FIG. 12D shows a method 2560 for training a model for detecting die patterns on wafers and determining types of wafers based thereon according to certain embodiments. At 2562, the method 2560 captures images of wafers in load locks. At 2564, the method 2560 processes the images. For example, the images may be cleaned and formatted. Further, brightness, contrast, and so on of the images may be adjusted. For example, the method 2560 may adjust brightness, enhance contrast, and perform operations such as noise filtering, histogram equalization, edge detection, object recognition and tracking, image segmentation, image de-blurring, geometric transformations, feature detection, depth estimation, and so on of an image.

Furthermore, features that can be used for detecting die patterns on wafers and determining types of wafers based thereon may be recognized and extracted from the captured images and may be stored in one or more databases. At 2566, the method 2560 trains a model for detecting die patterns on wafers and determining types of wafers based thereon. At 2568, the method 2560 continues to refine (i.e., further train) the model based on images captured and processed using the trained model on an ongoing basis.

Figures 12E, 12F:
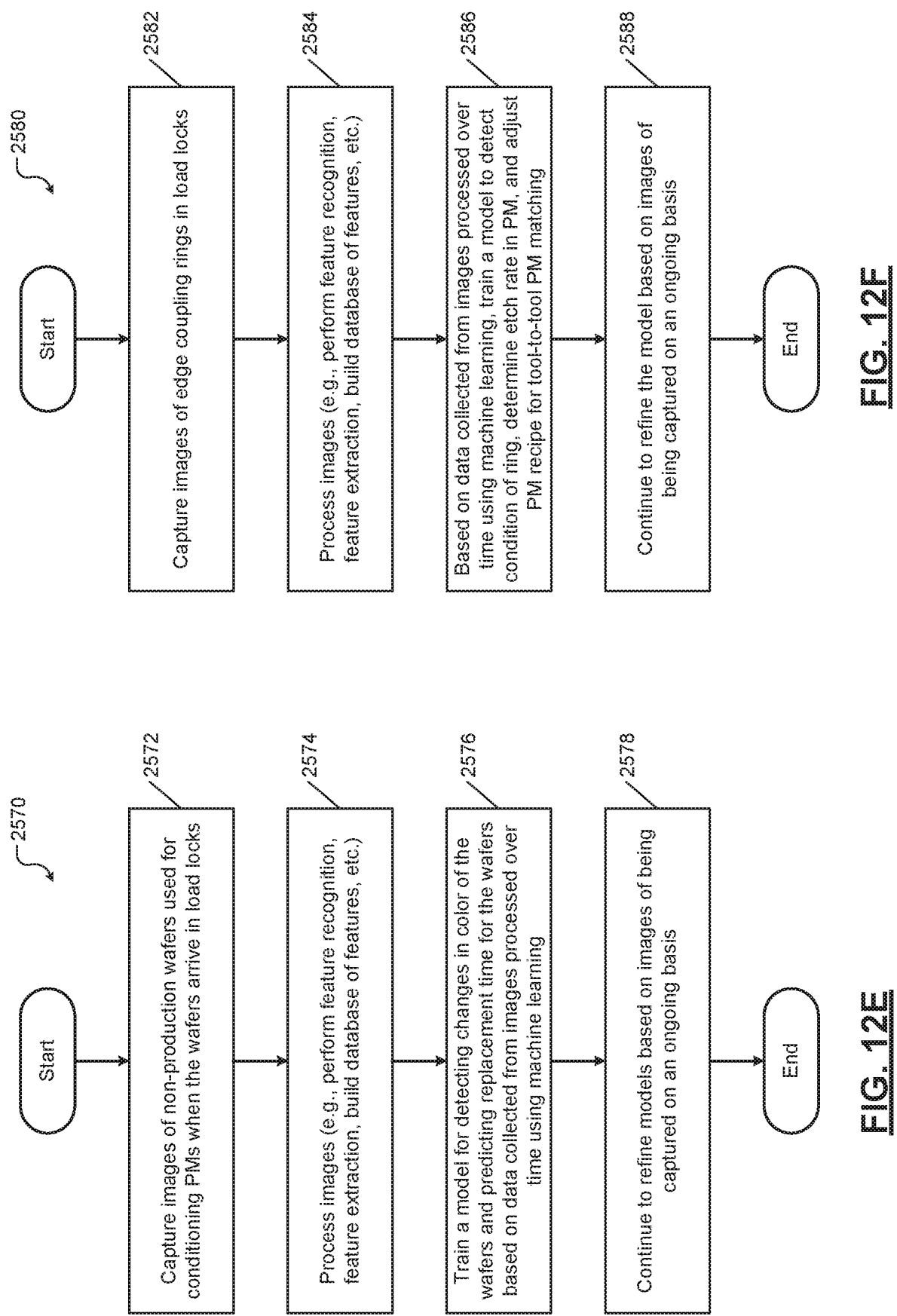

FIG. 12E shows a method 2570 for training a model for detecting changes in color of conditioning wafers and predicting replacement time for the conditioning wafers according to certain embodiments. At 2572, the method 2570 captures images of conditioning wafers in load locks. At 2574, the method 2570 processes the images. For example, the images may be cleaned and formatted. Further, brightness, contrast, and so on of the images may be adjusted. For example, the method 2570 may adjust brightness, enhance contrast, and perform operations such as noise filtering, histogram equalization, edge detection, object recognition and tracking, image segmentation, image de-blurring, geometric transformations, feature detection, depth estimation, and so on of an image.

Furthermore, features that can be used for detecting changes in color of the conditioning wafers and predicting the replacement time for the conditioning wafers may be recognized and extracted from the captured images and may be stored in one or more databases. At 2576, the method 2570 trains a model for detecting changes in color of the conditioning wafers and predicting replacement time for the conditioning wafers. At 2578, the method 2570 continues to refine (i.e., further train) the model based on images captured and processed using the trained model on an ongoing basis.

FIG. 12F shows a method 2580 for training a model for detecting condition of edge coupling rings, determining etch rates in PMs, and adjusting recipes in the PMs for tool-to-tool matching according to certain embodiments. At 2582, the method 2580 captures images of edge coupling rings in load locks. At 2584, the method 2580 processes the images. For example, the images may be cleaned and formatted. Further, brightness, contrast, and so on of the images may be adjusted. For example, the method 2580 may adjust brightness, enhance contrast, and perform operations such as noise filtering, histogram equalization, edge detection, object recognition and tracking, image segmentation, image de-blurring, geometric transformations, feature detection, depth estimation, and so on of an image.

Furthermore, features that can be used for detecting condition of edge coupling rings, determining etch rates in PMs, and adjusting recipes in the PMs for tool-to-tool matching may be recognized and extracted from the captured images and may be stored in one or more databases. At 2586, the method 2580 trains a model for detecting condition of edge coupling rings, determining etch rates in PMs, and adjusting recipes in the PMs for tool-to-tool matching. At 2588, the method 2580 continues to refine (i.e., further train) the model based on images captured and processed using the trained model on an ongoing basis.

FIG. 13A shows an exemplary method 2600 for capturing images of wafers, various pads, and edge coupling rings from various tools and using trained models, determining a wafer type, determining condition of an edge coupling ring, determining condition of various pads, determining preventive maintenance schedules, determining replacement schedules for components such as pads and conditioning wafers, determining etch rates, adjusting PM recipes, and so on. At 2602, the method 2600 captures images of wafers, edge coupling rings, and various pads at locations such as load locks.

At 2604, the method 2600 processes the images. For example, the images may be cleaned and formatted. Further, brightness, contrast, and so on of the images may be adjusted. For example, the method 2600 may adjust brightness, enhance contrast, and perform operations such as noise filtering, histogram equalization, edge detection, object recognition and tracking, image segmentation, image de-blurring, geometric transformations, feature detection, depth estimation, and so on of an image. Furthermore, features that can be used to determine a wafer type, to determine condition of an edge coupling ring, to determine condition of various pads may be recognized and extracted from the captured images.

At 2606, using various trained models, the method 2600 performs various tasks based on the data collected from images. For example, the tasks may include but are not limited to determining a wafer type, determining condition of an edge coupling ring, determining condition of various pads, determining preventive maintenance schedules, determining replacement schedules for components such as pads and conditioning wafers, determining etch rates, adjusting PM recipes, and so on. At 2608, the method 2600 updates (i.e., further trains) these trained models based on data collected from captured images and processed using the trained models.

FIG. 13B shows an exemplary method 2620 for detecting pad wear and predicting pad replacement in load locks using a trained model (as described with reference to FIG. 12B). At 2622, the method 2620 captures images of wafer pads, edge coupling ring pads, and robot end effector pads in load locks. At 2624, the method 2620 processes the images. For example, the images may be cleaned and formatted. Further, brightness, contrast, and so on of the images may be adjusted. For example, the method 2620 may adjust brightness, enhance contrast, and perform operations such as noise filtering, histogram equalization, edge detection, object recognition and tracking, image segmentation, image de-blurring, geometric transformations, feature detection, depth estimation, and so on of an image.

Furthermore, features that can be used to determine condition of the various pads may be recognized and extracted from the captured images. At 2626, using the trained model, the method 2620 determines the condition of the various pads, determine preventive maintenance schedules, and determines replacement schedules for the various pads. At 2628, the method 2620 updates (i.e., further trains) the trained model based on data collected from the captured images and processed using the trained model.

Figure 13D:
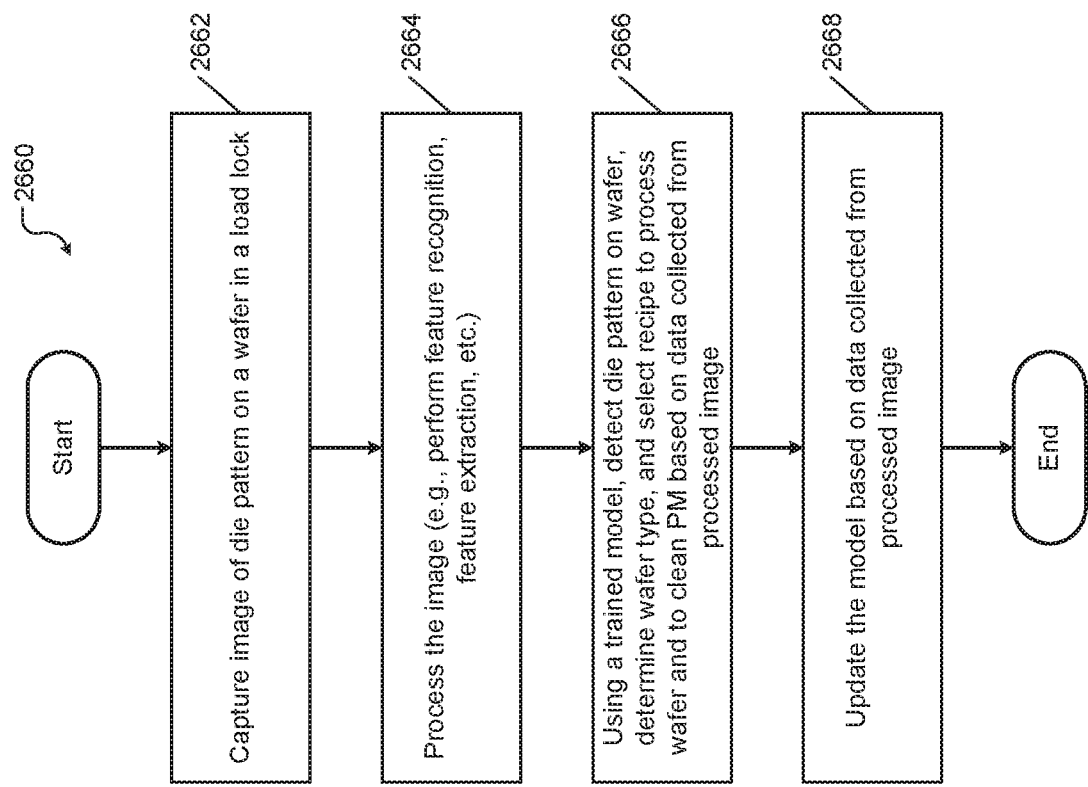
Figure 13C:
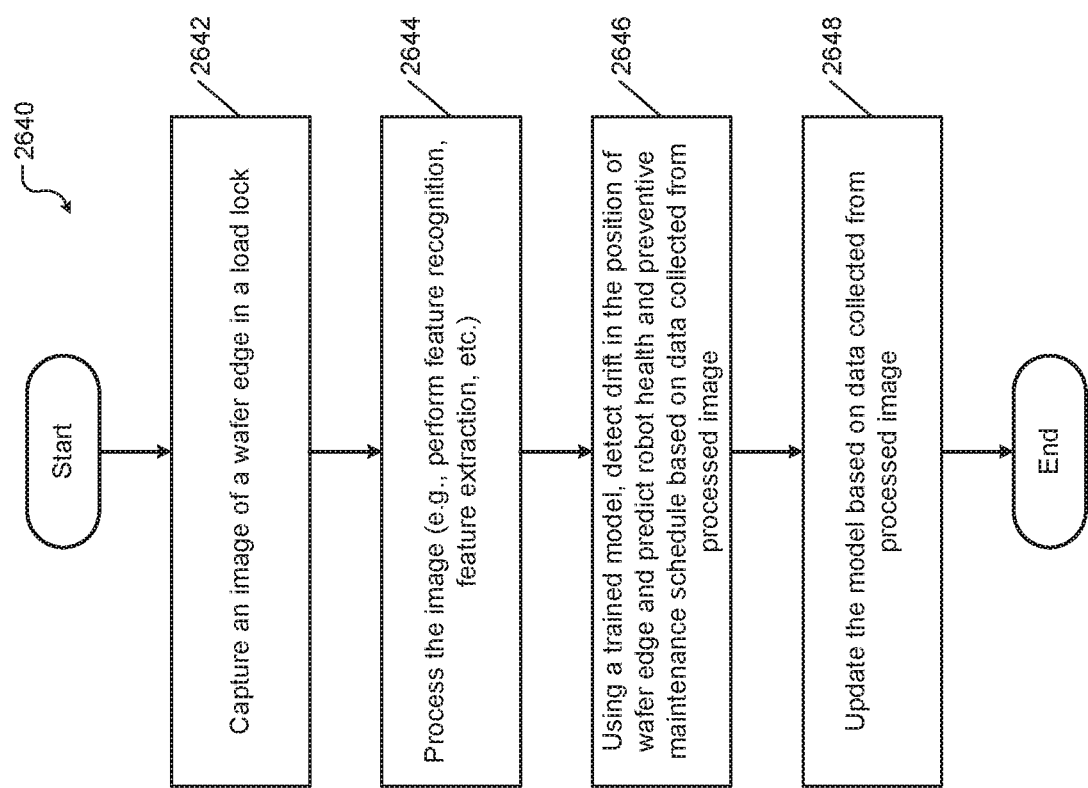

FIG. 13C shows an exemplary method 2640 for detecting drift in wafer placement in load locks and predicting robot health and preventive maintenance schedule using a trained model (as described with reference to FIG. 12C). At 2642, the method 2640 captures an image of a wafer edge in a load lock. At 2644, the method 2640 processes the image. For example, the image may be cleaned and formatted. Further, brightness, contrast, and so on of the image may be adjusted. For example, the method 2640 may adjust brightness, enhance contrast, and perform operations such as noise filtering, histogram equalization, edge detection, object recognition and tracking, image segmentation, image de-blurring, geometric transformations, feature detection, depth estimation, and so on of an image.

Furthermore, features that can be used to determine drift in wafer placement in the load lock may be recognized and extracted from the captured image. At 2646, using the trained model, the method 2640 detects drift in wafer placement in the load lock and predicts robot health and preventive maintenance schedule. At 2648, the method 2640 updates (i.e., further trains) the trained model based on data collected from the captured image and processed using the trained model.

FIG. 13D shows an exemplary method 2660 for detecting a die pattern on a wafer and determining a type of the wafer based thereon using a trained model (as described with reference to FIG. 12D). At 2662, the method 2660 captures an image of a wafer in a load lock. At 2664, the method 2660 processes the image. For example, the image may be cleaned and formatted. Further, brightness, contrast, and so on of the image may be adjusted. For example, the method 2660 may adjust brightness, enhance contrast, and perform operations such as noise filtering, histogram equalization, edge detection, object recognition and tracking, image segmentation, image de-blurring, geometric transformations, feature detection, depth estimation, and so on of an image.

Furthermore, features that can be used for detecting a die pattern on the wafer and determining a type of the wafer based thereon may be recognized and extracted from the captured image. At 2666, using the trained model, the method 2560 detects the die pattern on the wafer and determines the type of wafer based thereon. At 2668, the method 2660 updates (i.e., further trains) the trained model based on data collected from the captured image and processed using the trained model.

Figure 13F:
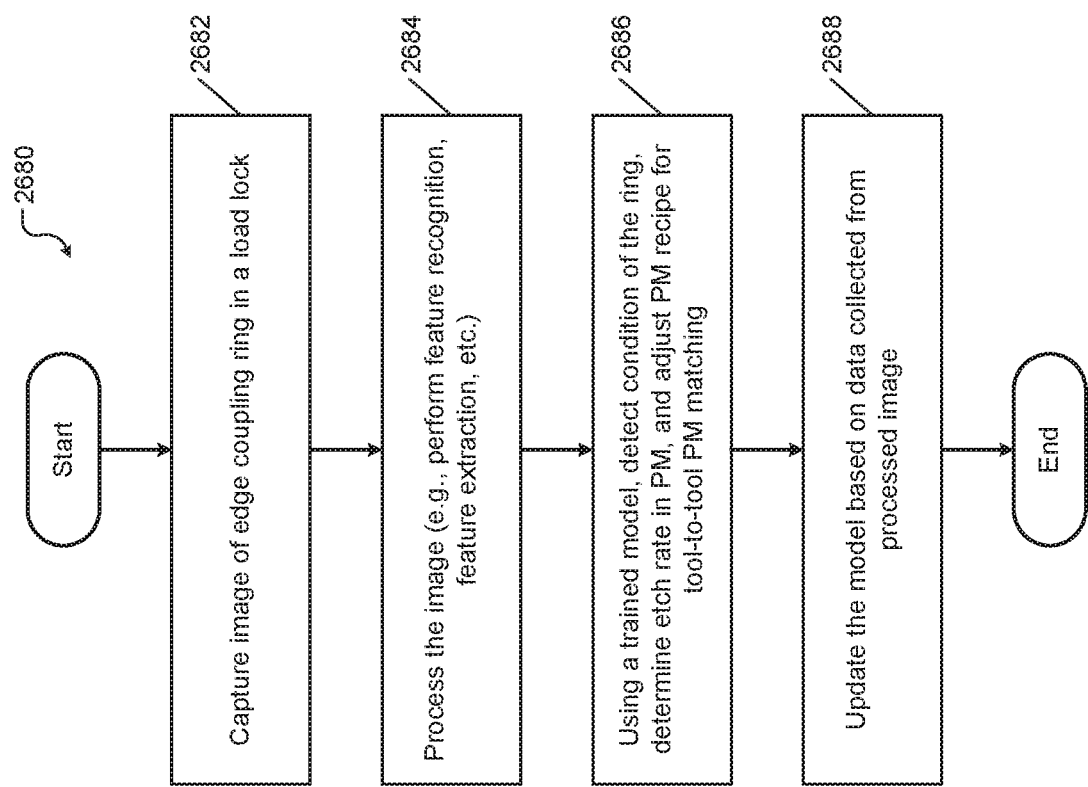
Figure 13E:
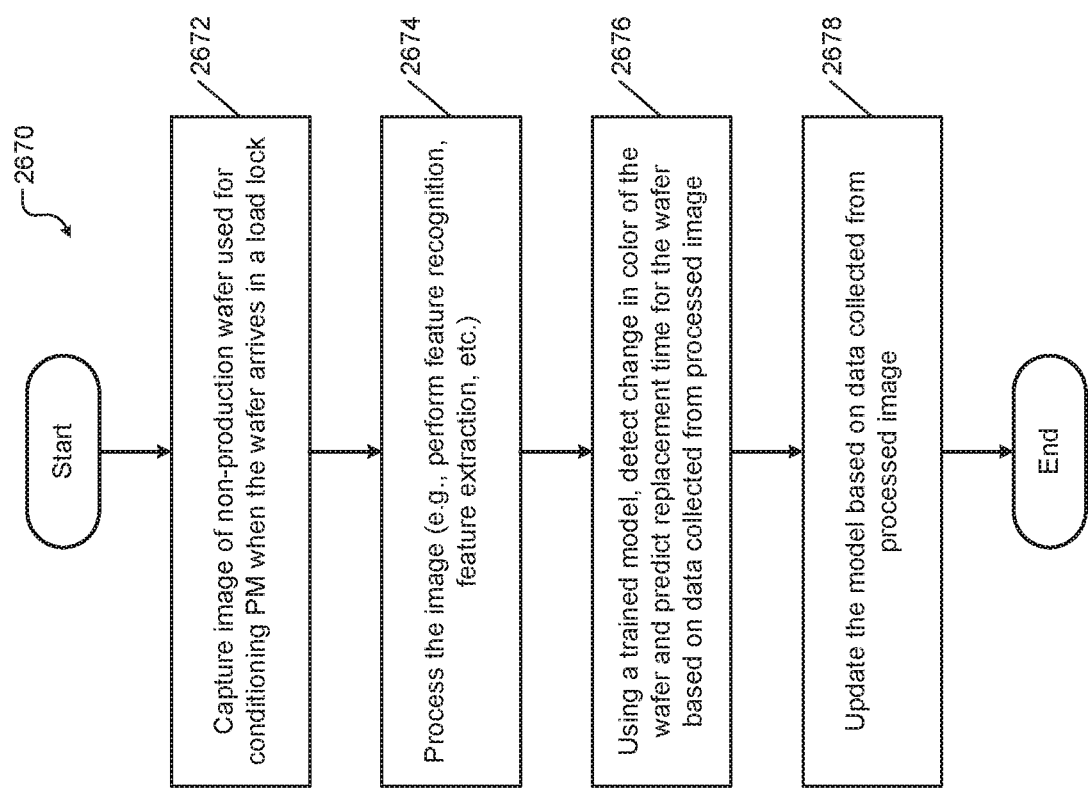

FIG. 13E shows an exemplary method 2670 for detecting changes in color of a conditioning wafer and predicting replacement time for the conditioning wafer using a trained model (as described with reference to FIG. 12E). At 2672, the method 2670 captures an image of a conditioning wafer in a load lock. At 2674, the method 2670 processes the image. For example, the image may be cleaned and formatted. Further, brightness, contrast, and so on of the image may be adjusted. For example, the method 2670 may adjust brightness, enhance contrast, and perform operations such as noise filtering, histogram equalization, edge detection, object recognition and tracking, image segmentation, image de-blurring, geometric transformations, feature detection, depth estimation, and so on of an image.

Furthermore, features that can be used for detecting change in color of the conditioning wafer and predicting the replacement time for the conditioning wafer may be recognized and extracted from the captured image. At 2676, using the trained model, the method 2670 detects change in color of the conditioning wafer and predicts replacement time for the conditioning wafer. At 2678, the method 2670 updates (i.e., further trains) the trained model based on data collected from the captured image and processed using the trained model.

FIG. 13F shows an exemplary method 2680 for detecting condition of an edge coupling ring, determining an etch rate in a PM, and adjusting a recipe in the PM for tool-to-tool matching using a trained model (as described with reference to FIG. 12F). At 2682, the method 2680 captures an image of an edge coupling ring in a load lock. At 2684, the method 2680 processes the image. For example, the image may be cleaned and formatted. Further, brightness, contrast, and so on of the image may be adjusted. For example, the method 2680 may adjust brightness, enhance contrast, and perform operations such as noise filtering, histogram equalization, edge detection, object recognition and tracking, image segmentation, image de-blurring, geometric transformations, feature detection, depth estimation, and so on of an image.

Furthermore, features that can be used for detecting condition of the edge coupling ring, determining etch rate in the PM, and adjusting recipe in the PM for tool-to-tool matching may be recognized and extracted from the captured image. At 2686, using the trained model, the method 2680 detects condition of the edge coupling ring, determines etch rate in the PM, and adjusts recipe in the PM for tool-to-tool matching. At 2688, the method 2680 updates (i.e., further trains) the trained model based on data collected from the captured image and processed using the trained model.

Additional Models

FIGS. 14A-14I show various additional examples of methods performed by the servers 2030 and the system computer 2410 using models trained based on images captured in real time (i.e., on the fly, or when the tool is being used during production to process wafers). The models used by these methods can be trained using the computer vision system 2400 and can be used to perform various operations. These are non-limiting examples. Additional use cases are contemplated.

In these examples, the training of the respective models using data collected from images to perform the described functions and using perception, sensor fusion, and machine learning algorithms, including the ongoing updating of the trained models, is similar to the training of the models described above with reference to FIGS. 12A-12F. The training of the models used in the following methods is therefore presumed and not described for brevity. In use, similar to the models described with reference to FIGS. 13A-13F, these models receive data from an image as input and output results such as scheduling service, replacement, and so on.

Figure 14B:
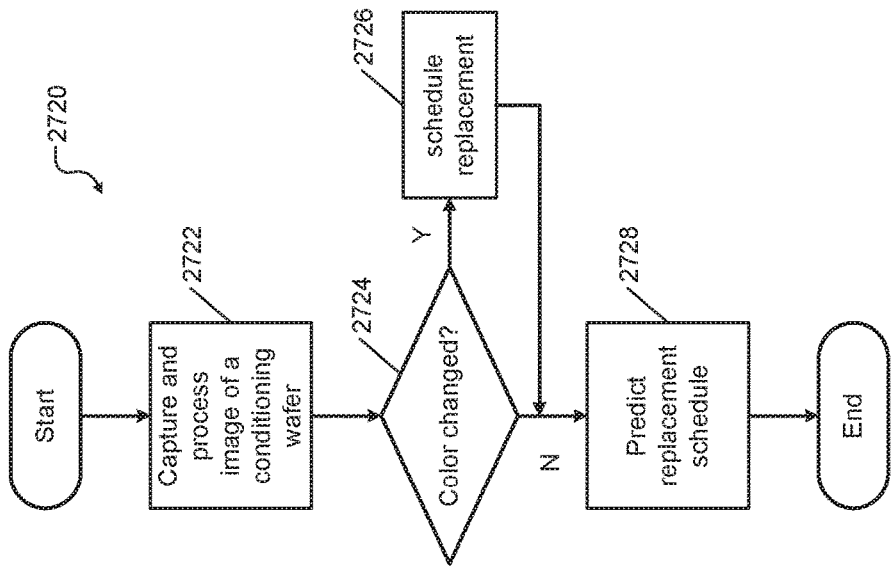
FIGS. 14A-14I show example flowcharts of additional model-based methods performed for improving operations of tools using a computer vision system according to certain features of the present disclosure.
Figure 14A:
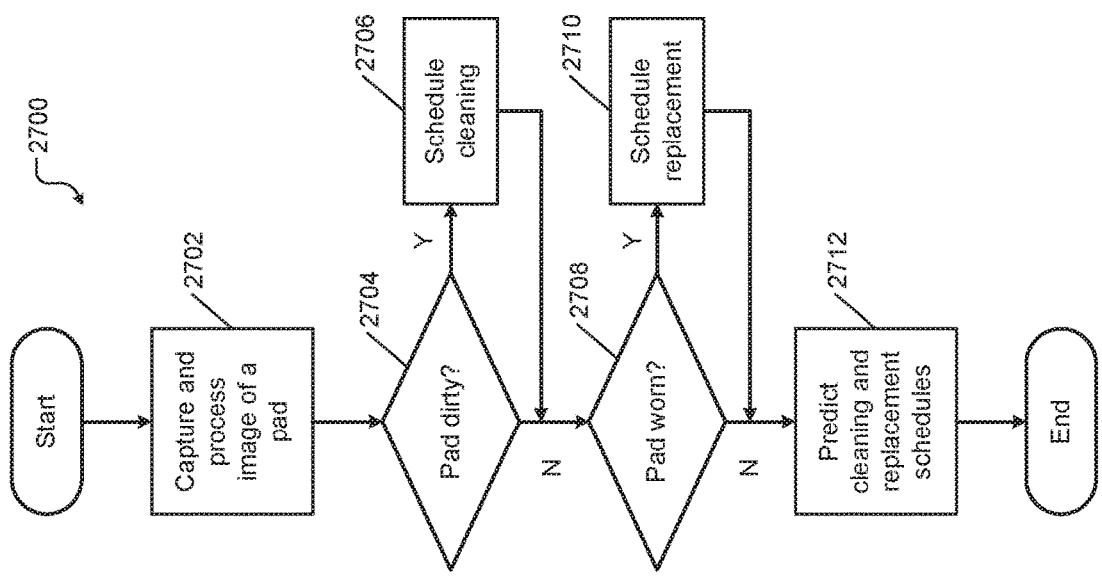

FIG. 14A shows a method 2700 for scheduling maintenance of various pads in a load lock using a model trained using perception, sensor fusion, and machine learning algorithms according to certain embodiments. At 2702, the method 2700 captures and processes an image of a pad (e.g., a pad associated with a wafer, an edge coupling ring, or an end effector of a robot transporting the wafer in and out of the load lock). For example, the method 2700 may adjust brightness, enhance contrast, and perform operations such as noise filtering, histogram equalization, edge detection, object recognition and tracking, image segmentation, image de-blurring, geometric transformations, feature detection, depth estimation, and so on of an image. Data such as a feature useful for diagnosing the health of the pad is extracted from the processed image and is input to a model trained for diagnosing the health of the pad.

At 2704, based on the data, the method 2700 determines using the trained model whether the pad is dirty. At 2706, if the pad is dirty, the method 2700 schedules, using the trained model, a cleaning of the pad. At 2708, if pad is not dirty, the method 2700 determines using the trained model if the pad is worn. At 2710, if the pad is worn, the method 2700 schedules, using the trained model, a replacement of the pad. At 2712, if the pad is neither dirty nor worn, the method 2700 predicts, using the trained model, auto-cleaning and replacement schedules for the pad.

For example, if the method 2700 determines that robot end effector pads need cleaning, an automated procedure is developed where the end effector is placed under load lock purge ports, which are located on the top ceiling of the load lock. A gas (e.g., N2) is blown at a high flow rate from the purge ports towards the end effector, which can remove particles from the robot end effector and the pads. It should be appreciated that this procedure fully automates the cleaning of the robot end effector(s) in a closed-loop manner.

FIG. 14B shows a method 2720 for diagnosing the health of a conditioning wafer and scheduling replacement of the conditioning wafer using a model trained using perception, sensor fusion, and machine learning algorithms according to certain embodiments. At 2722, the method 2720 captures and processes an image of a conditioning wafer when the conditioning wafer is transported to a load lock. For example, the method 2720 may adjust brightness, enhance contrast, and perform operations such as noise filtering, histogram equalization, edge detection, object recognition and tracking, image segmentation, image de-blurring, geometric transformations, feature detection, depth estimation, and so on of an image. Data such as a feature (e.g., color) useful for diagnosing the health of the conditioning wafer is extracted from the processed image and is input to a model trained for diagnosing the health of the conditioning wafer.

At 2724, based on the data, the method 2720 determines using the trained model whether the color of the conditioning wafer has changed and the extent of the change in the color. At 2726, if the color has changed more than a predetermined threshold, the method 2720 schedules, using the trained model, a replacement of the conditioning wafer. At 2728, if color has not changed more than the predetermined threshold, the method 2720 predicts, using the trained model, a replacement schedule for the conditioning wafer.

Figure 14D:
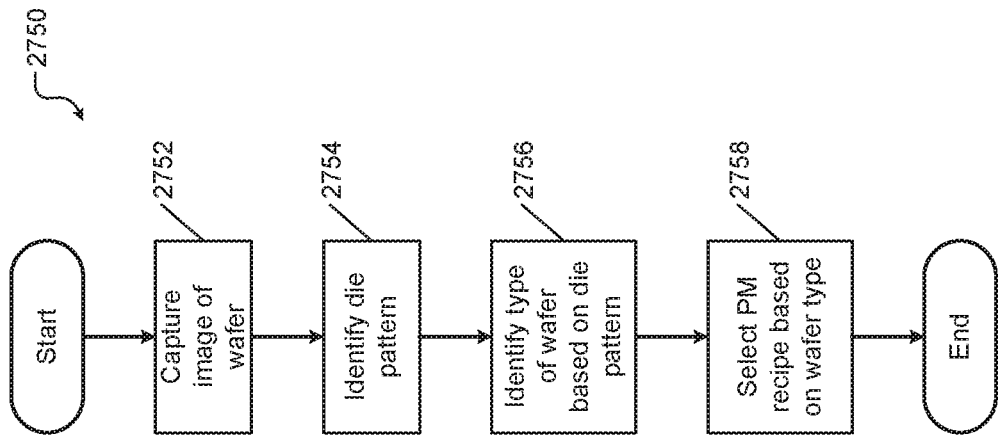
Figure 14C:
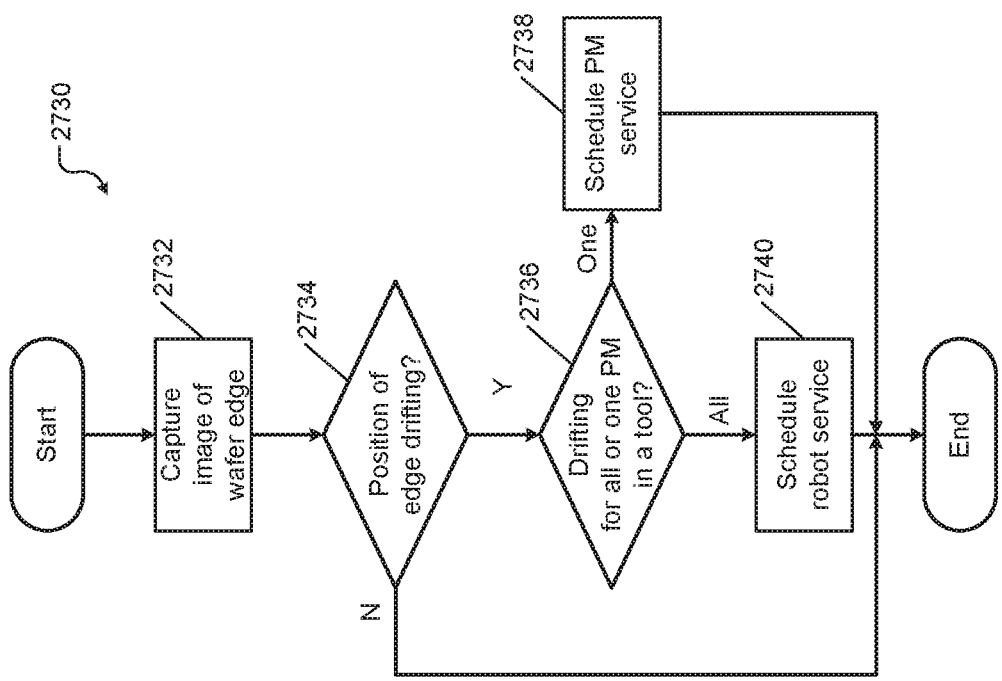

FIG. 14C shows a method 2730 for diagnosing the health of a robot transporting wafers in and out of a load lock and scheduling service for the robot or a PM using a model trained using perception, sensor fusion, and machine learning algorithms according to certain embodiments. At 2732, the method 2730 captures and processes an image of a wafer edge when the wafer is transported from a PM to a load lock. For example, the method 2730 may adjust brightness, enhance contrast, and perform operations such as noise filtering, histogram equalization, edge detection, object recognition and tracking, image segmentation, image de-blurring, geometric transformations, feature detection, depth estimation, and so on of an image. Data such as a feature useful for detecting a drift in the position of the wafer in the load lock is extracted from the processed image and is input to a model trained for detecting the drift.

At 2734, based on the data, the method 2730 determines using the trained model whether the position of the wafer is drifting over time. At 2736, if the position of the wafer is drifting over time, the method 2730 determines using the model trained using the sensor fusion algorithm whether the position of wafers transported from more than one PM is drifting or the position of a wafer from only one PM is drifting. Dynamic alignment (DA) sensors can be used in the sensor fusion algorithm. The DA sensors indicate how far off the wafer is located from the robot end effector center while the wafer is being removed from the PM.

At 2738, if the position of a wafer from only one PM is drifting, the method 2730 schedules, using the trained model, service for that PM since the position of the wafer from that PM is drifting due to a problem in that PM and not due to a problem with the robot. At 2740, if the position of wafers from more than one PM is drifting, the method 2730 schedules, using the trained model, service for the robot since the position of the wafers from more than one PM is drifting due to a problem with the robot and not due to a problem in the PMs. The method 2730 can also send a command to the robot to perform real-time correction for wafer placement in a closed-loop manner.

FIG. 14D shows a method 2750 for identifying a wafer type and selecting a PM recipe based on the wafer type using a model trained using perception, sensor fusion, and machine learning algorithms according to certain embodiments. At 2752, the method 2750 captures and processes an image of a wafer in a load lock that is to be transported to a PM. For example, the method 2750 may adjust brightness, enhance contrast, and perform operations such as noise filtering, histogram equalization, edge detection, object recognition and tracking, image segmentation, image de-blurring, geometric transformations, feature detection, depth estimation, and so on of an image. Data such as a feature (e.g., color, shape, etc.) useful for identifying a wafer type is extracted from the processed image and is input to a model trained for detecting a wafer type.

At 2754, based on the data, the method 2750 identifies, using the trained model, a die pattern on the wafer, which includes determining whether a die pattern is present on the wafer. At 2756, the method 2750 determines the wafer type using the trained model. For example, the trained model may determine that the wafer is a production wafer (e.g., a wafer for producing memory or processor) or a non-production wafer (e.g., a conditioning wafer or a dummy wafer) used during PM cleaning. At 2758, based on the detected wafer type, the method 2750 selects a recipe to be used in the PM using the trained model. For example, the selected recipe may be to further process the wafer if the wafer is a production wafer or a recipe to clean the PM if the wafer is a conditioning wafer.

Figure 14G:
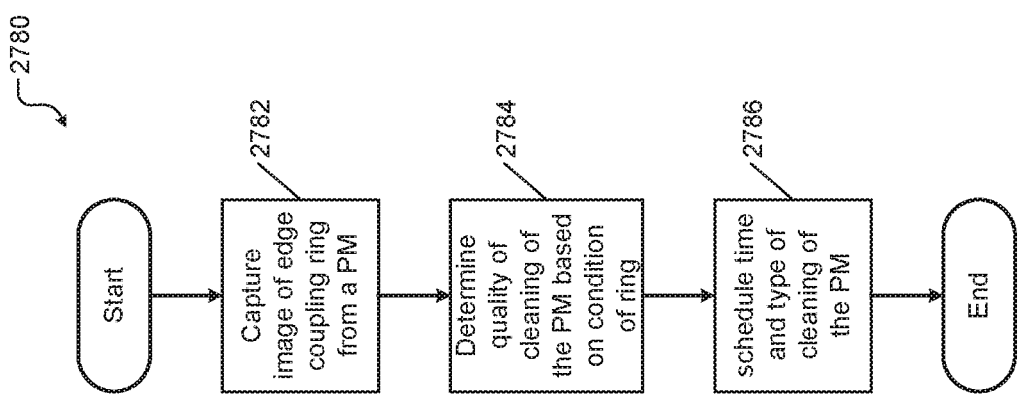
Figure 14F:
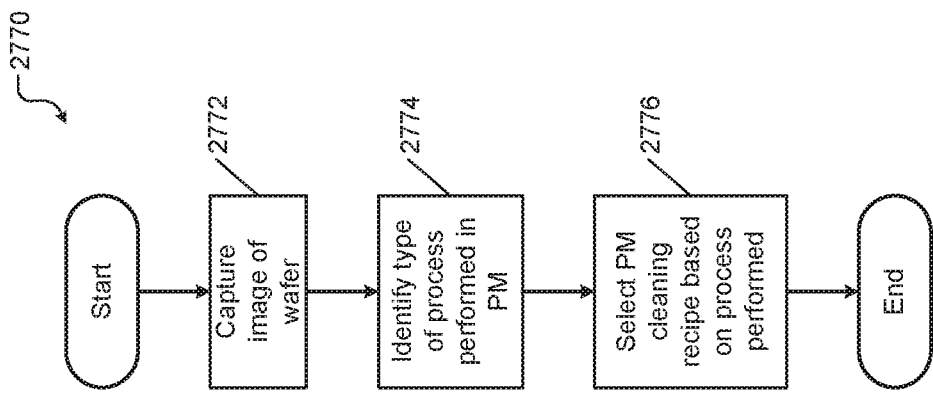
Figure 14E:
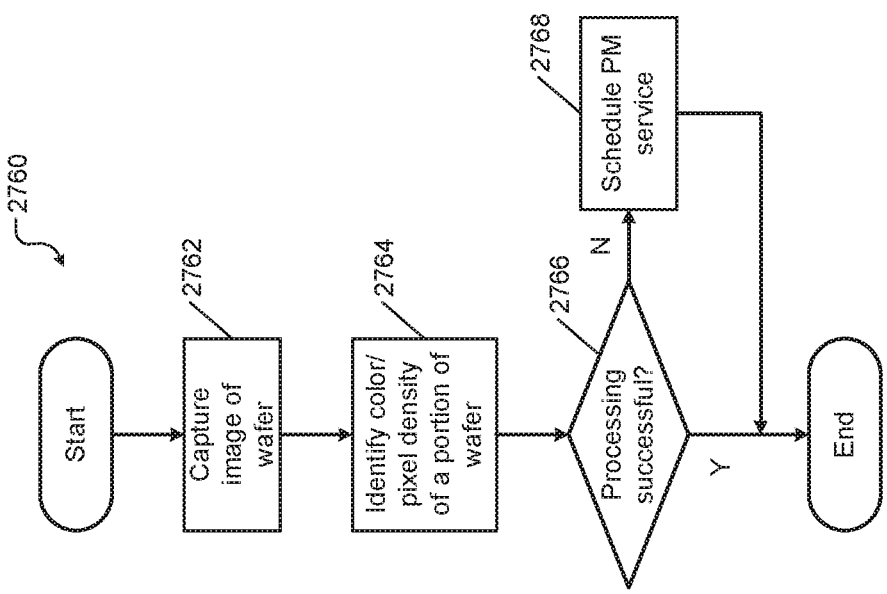

FIG. 14E shows a method 2760 for determining whether a wafer is successfully processed in a PM and whether to schedule service for the PM using a model trained using perception, sensor fusion, and machine learning algorithms according to certain embodiments. At 2762, the method 2760 captures and processes an image of a wafer transported from a PM to a load lock. For example, the method 2760 may adjust brightness, enhance contrast, and perform operations such as noise filtering, histogram equalization, edge detection, object recognition and tracking, image segmentation, image de-blurring, geometric transformations, feature detection, depth estimation, and so on of an image. At 2764, the method 2760 identifies and extracts from the processed image data such as a feature (e.g., color, light intensity etc. of a portion of the wafer) useful for determining whether a wafer is successfully processed in a PM (e.g., whether there is any deviation or variation in the processing of the wafer). The method 2760 inputs the data to a model trained for determining whether a wafer is successfully processed in a PM. At 2766, based on the data, the method 2760 determines, using the trained model, whether the wafer was successfully processed in the PM. At 2768, if the wafer was not successfully processed in the PM, the method 2760 automatically schedules service for the PM using the trained model.

FIG. 14F shows a method 2770 for identifying a category type of an incoming wafer and a category of a process out of a list of processes performed in a PM and selecting a proper cleaning recipe for the PM using a model trained using perception, sensor fusion, and machine learning algorithms according to certain embodiments. At 2772, the method 2770 captures and processes an image of a wafer transported from a PM to a load lock. For example, the method 2770 may adjust brightness, enhance contrast, and perform operations such as noise filtering, histogram equalization, edge detection, object recognition and tracking, image segmentation, image de-blurring, geometric transformations, feature detection, depth estimation, and so on of an image.

At 2774, the method 2770 extracts data such as a feature from the processed image that is useful for identifying a category of a process out of a list of processes performed in a PM. The method 2770 inputs the data to a model trained for identifying a category of a process out of a list of processes performed in a PM. Based on the data, the trained model identifies a process performed on the wafer in the PM. At 2776, based on the process performed in the PM, the method 2770 automatically selects, a cleaning recipe for the PM using the trained model.

FIG. 14G shows a method 2780 for determining quality of cleaning of a PM by observing edge coupling ring and scheduling service for the PM using a model trained using perception, sensor fusion, and machine learning algorithms according to certain embodiments. To quantify cleaning quality, a witness non-production wafer can be dispatched into the PM, a process can be performed, and then the wafer can be transported to the load lock to capture an image. Large set of data across the fleet is collected and labeled over a long time to achieve this objective.

At 2782, the method 2780 captures and processes an image of an edge coupling ring transported from a PM to a load lock. For example, the method 2780 may adjust brightness, enhance contrast, and perform operations such as noise filtering, histogram equalization, edge detection, object recognition and tracking, image segmentation, image de-blurring, geometric transformations, feature detection, depth estimation, and so on of an image. At 2784, the method 2780 extracts data such as a feature from the processed image that is useful for determining quality of cleaning of a PM. The method 2780 inputs the data to a model trained for determining quality of cleaning of a PM. Based on the data, the trained model determines the quality of cleaning performed in the PM. At 2786, based on the determined quality, the method 2780 automatically schedules, using the trained model, when and what type of cleaning may be performed in the PM. Thus, an inspection of the PM is obviated.

In the methods shown in FIGS. 14H and 14I described below, the edge coupling rings are inspected after they are fully used and are leaving the PM to infer PM problems. Inspecting one edge coupling ring on one tool will probably be insufficient in achieving this objective. Rather, to achieve this objective, data across the fleet is collected for a long time. During this time, the collected data may be labeled manually, where a user assigns a label to a signature of an image of each edge coupling ring. For example, a label may indicate which subsystem malfunction in a PM caused what kind of signature for the edge coupling ring from the PM, etc.

Figure 14I:
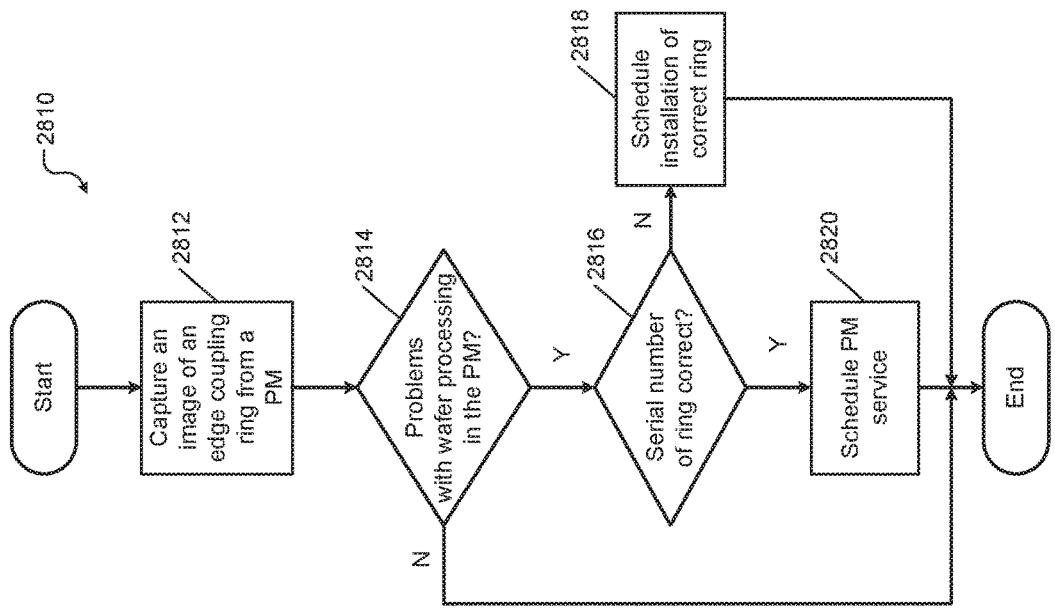
Figure 14H:
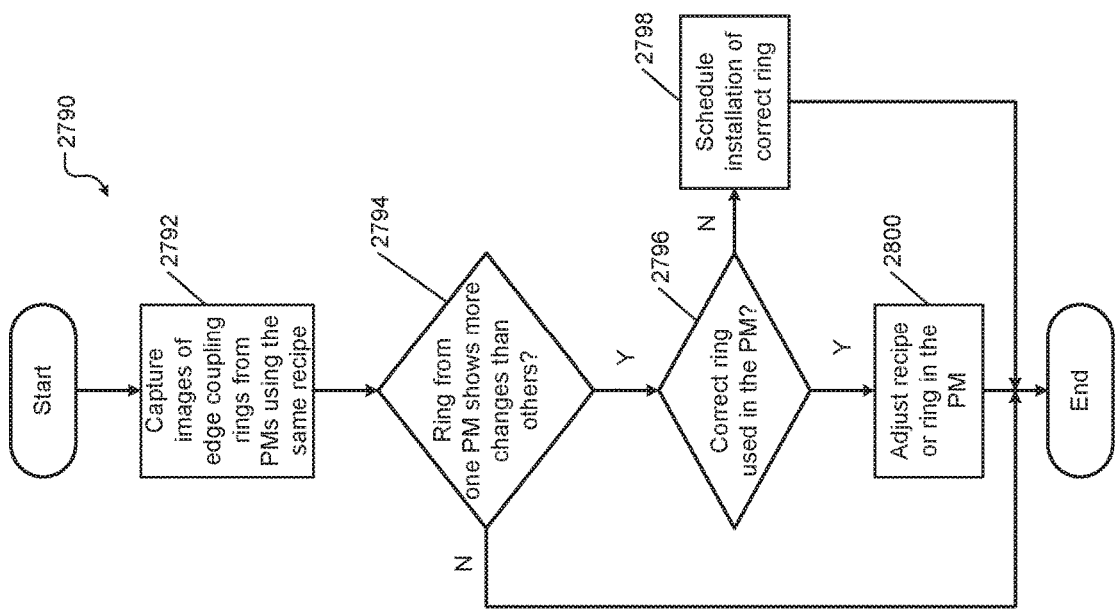

FIG. 14H shows a method 2790 for diagnosing various problems with edge coupling rings and recipes used in PMs by observing edge coupling rings using a model trained using perception, sensor fusion, and machine learning algorithms according to certain embodiments. At 2792, the method 2790 captures and processes images of edge coupling ring transported from PMs of a tool using the same recipe to a load lock of the tool. For example, the method 2790 may adjust brightness, enhance contrast, and perform operations such as noise filtering, histogram equalization, edge detection, object recognition and tracking, image segmentation, image de-blurring, geometric transformations, feature detection, depth estimation, and so on of an image. At 2794, the method 2790 extracts data from the processed images that is useful for diagnosing various problems with the edge coupling rings and the PMs. The method 2790 inputs the data to a model trained for diagnosing the various problems.

At 2794, based on the data, the trained model determines whether an edge coupling ring from one PM shows more changes than the edge coupling rings from the other PMs although all the PMs used the same recipe to process wafers. At 2796, If one edge coupling ring shows more changes, the method 2790 determines using the trained model whether a correct edge coupling ring is used in that PM (e.g. whether ring from another PM or a ring made by a different supplier is used in that PM). At 2798, if an incorrect or improper edge coupling ring is being used in the PM, the method 2790, using the trained model, schedules installation of a correct or new ring in the PM. At 2800, if a correct or proper edge coupling ring is being used in the PM, the method 2790, using the trained model, adjusts the recipe being used in the PM.

FIG. 14I shows a method 2810 for diagnosing various problems with wafer processing in a PM by observing edge coupling rings using a model trained using perception, sensor fusion, and machine learning algorithms according to certain embodiments. Serial number of an edge coupling ring is verified before the edge coupling ring goes into a PM to make sure that a wrong edge coupling ring is not loaded. This can be done without machine learning. Alternatively, the method 2810 may be performed as follows. At 2812, the method 2810 captures and processes an image of an edge coupling ring transported from a PM to a load lock. For example, the method 2810 may adjust brightness, enhance contrast, and perform operations such as noise filtering, histogram equalization, edge detection, object recognition and tracking, image segmentation, image de-blurring, geometric transformations, feature detection, depth estimation, and so on of an image.

At 2814, the method 2810 extracts serial number of the edge coupling ring and other data from the processed images that is useful for diagnosing various problems with wafer processing in a PM. The method 2810 inputs the data to a model trained for diagnosing the various problems. Based on the data, the method 2810 determines, using the trained model, whether there are any problems with wafer processing in the PM. At 2816, if any problems with wafer processing in the PM are detected, the method 2810 determines, using the trained model, whether the serial number of the edge coupling ring is correct. At 2818, if the serial number is incorrect, the method 2810, using the trained model, schedules installation of a correct or new ring in the PM. At

2820, if the serial number is correct, the method 2810, using the trained model, schedules service for the PM.

In some implementations, the computer vision system 2400 may send raw images from tools to the data center in cloud, and all of the processing of the images and the training of the models may be performed in the cloud. Further, image processing and recommendations by the trained models during use of the tools may be performed in the cloud. In such implementations, the computer vision system 2400 may be deployed in the cloud as Software-as-a-Service (SaaS).

Model Training and Verification

Figure 15C:
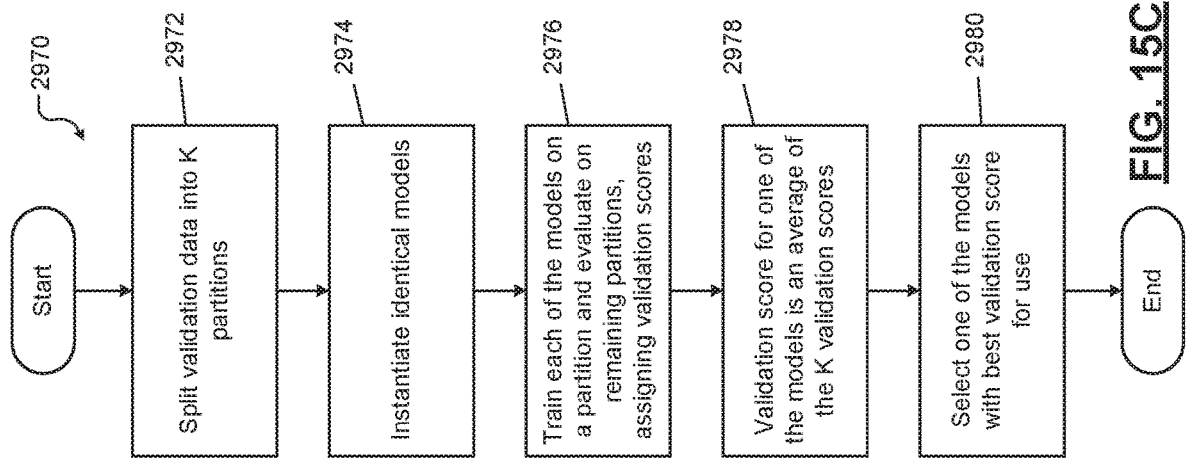
FIGS. 15A, 15B, and 15C show example flowcharts of methods for generating, training, and validating models.
Figure 15B:
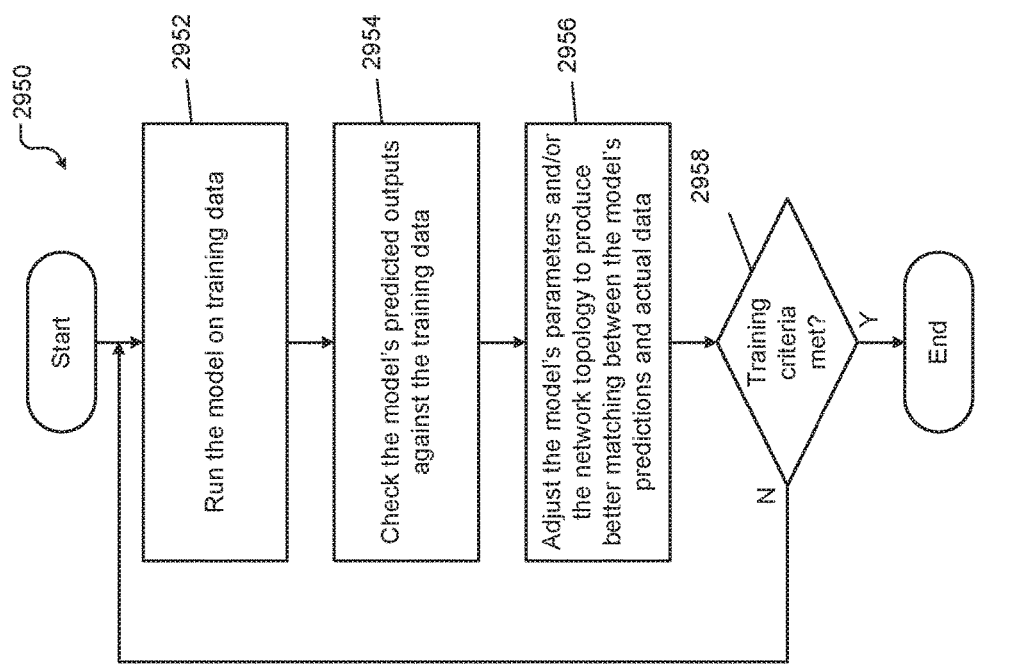
Figure 15A:
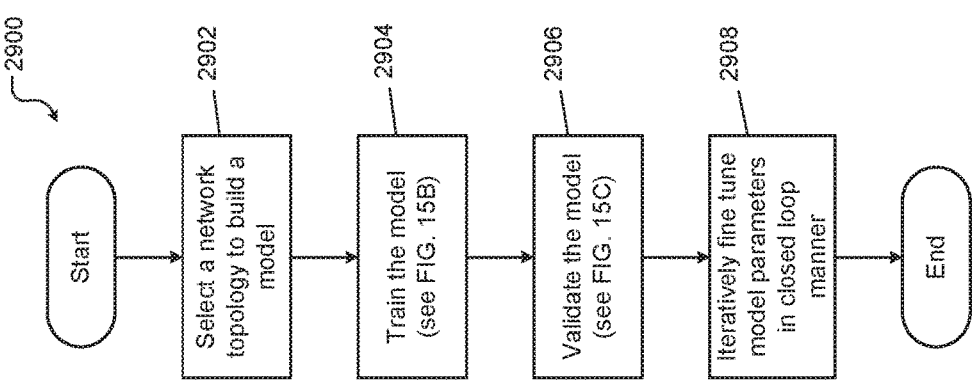

FIGS. 15A-15C show examples of methods for generating, training, and validating models such as those described with reference to FIGS. 12A-14I above. These methods are performed by one or more applications executed by the servers 2030, which are referred to as control in the following description of the methods.

FIG. 15A shows a method 2900 for generating a model according to some embodiments. At 2902, control selects a machine learning model (e.g., supervised or unsupervised classification model, deep neural network, tensor flow, etc.) network topology to define and build a model. The machine learning model need not be a neural network. Any classification method may be used. Some examples of machine learning algorithms that can be used include K-nearest neighbor, support vector machines, K-means clustering, deep neural networks, and so on. For example, control may define the model by selecting a network topology for a recurrent neural network.

An example of a recurrent neural network is shown in FIG. 16A. For example, selecting a network topology includes selecting number of inputs, number of neurons, and number of layers of the recurrent neural network. FIGS. 16A and 16B and corresponding description below explain model generation in further detail. At 2904, control trains the model. FIG. 15B and corresponding description below explain model training in further detail. At 2906, control validates the model. At 2908, control iteratively fine tunes model parameters in closed-loop manner. FIG. 15C and corresponding description below explain model validation in further detail.

FIG. 15B shows a method 2950 for training a model according to some embodiments. At 2952, control runs the model on training data (e.g., data from images collected over a few months). At 2954, control checks the outputs predicted by the model against the labeled training data. At 2956, control adjusts the model's parameters and/or the network topology to produce better matching between the model's predictions and the actual data (e.g., to minimize the error between model predication and training data). At 1958, control determines whether the model meets some predetermined training criteria. Control returns to the 2952 if the model does not meet the predetermined training criteria. Control ends if the model meets the predetermined training criteria.

FIG. 15C shows a method 2970 for validating a model according to some embodiments. The method 2970 is called a K-fold validation method and is shown as an example only. There are other methods of validating models that may be employed instead to validate the various models described above with reference to FIGS. 12A-14I.

At 2972, control splits the data used for validation (e.g., some of the data that is not used for training) into K partitions, where K is an integer greater than one. At 2974, control instantiates plural identical models. At 2976, for each instantiated model, control trains a model on one partition and evaluates the model on the remaining partitions. Control assigns validation scores for each evaluation. At 2978, control determines an average of K validation scores of a model as the validation score for the model. At 2980, control selects one of the models with the highest validation score for use.

Other validation methods can be used to validate the models. For example, an N-fold cross-validation method may be used. In this method, a dataset is divided into one final test set and N other subsets, where N is an integer greater than one. Each model is trained on all but one of the subsets to get N different estimates of a validation error rate. The model with the lowest validation error rate is selected for use.

FIGS. 16A and 16B show an example of a recurrent neural network used to generate models such as those described above with reference to FIGS. 12A-14I using machine learning techniques. Machine learning is a method used to devise complex models and algorithms that lend themselves to prediction (e.g., predictions for scheduling service and replacement of components described above). The models generated using machine learning such as those described above with reference to FIGS. 12A-14I can produce reliable, repeatable decisions and results, and uncover hidden insights through learning from historical relationships and trends in the data.

The purpose of using the recurrent neural-network-based model and training the model using machine learning as described above with reference to FIGS. 12A-15B is to directly predict dependent variables without casting relationships between the variables into mathematical form. The neural network model includes a large number of virtual neurons operating in parallel and arranged in layers. The first layer is the input layer and receives raw input data. Each successive layer modifies outputs from a preceding layer and sends them to a next layer. The last layer is the output layer and produces output of the system.

FIG. 16A shows a fully connected neural network, where each neuron in a given layer is connected to each neuron in a next layer. In the input layer, each input node is associated with a numerical value, which can be any real number. In each layer, each connection that departs from an input node has a weight associated with it, which can also be any real number (see FIG. 16B). In the input layer, the number of neurons equals number of features (columns) in a dataset. The output layer can have multiple continuous outputs.

The layers between the input and output layers are hidden layers. The number of hidden layers can be one or more (one hidden layer may be sufficient for most applications). A neural network with no hidden layers can represent linear separable functions or decisions. A neural network with one hidden layer can perform continuous mapping from one finite space to another. A neural network with two hidden layer can approximate any smooth mapping to any accuracy.

The number of neurons can be optimized. At the beginning of training, a network configuration is more likely to have excess nodes. Some of the nodes may be removed from the network during training that would not noticeably affect network performance. For example, nodes with weights approaching zero after training can be removed (this process is called pruning). The number of neurons can cause underfitting (inability to adequately capture signals in dataset) or over-fitting (insufficient information to train all neurons; network performs well on the training dataset but not on the test dataset).

Various methods and criteria can be used to measure performance of a model. For example, root mean squared error (RMSE) measures the average distance between observed values and model predictions. Coefficient of Determination ($R^2$) measures correlation (not accuracy) between observed and predicted outcomes. This method may not be reliable if the data has a large variance. Other performance measures include irreducible noise, model bias, and model variance. A high model bias for a model indicates that the model is not able to capture true relationship between predictors and the outcome. Model variance can indicate whether a model is not stable (a slight perturbation in the data will significantly change the model fit).

In addition to capturing and processing images of substrates and portions of surrounding apparatuses in tools for feature recognition and feature extraction, the systems and methods of the present disclosure described below can automatically configure tools and perform automatic error detection and error recovery for some errors (e.g., recoverable errors) that may occur in the tools during operation. Specifically, a system according to the present disclosure may be implemented in a tool (e.g., tools shown in FIGS. 1-6C) and may include a plurality of cameras installed in various locations in the tool to capture images of various subsystems of the tool at the time of tool set up (i.e., when a tool is being installed and set up). The system can use computer vision algorithms to automatically identify the subsystems and determine the tool configuration based on the captured images of the subsystems and then automatically configure the tool based on the identified subsystems. For example, the system can automatically identify the configuration details of the tool including but not limited to the number and types of buffers, load locks (LLs)/load port modules (LPMs), robots, end effectors (EEs), equipment front end modules (EFEMs), buffer stations, and so on installed in the tool. This data can then be used to automatically configure the tool at the time of initial installation or setup, or after an upgrade or service performed on the tool, where one or more subsystems are added, removed, replaced, or upgraded.

According to certain embodiments, using real time video processing (object tracking and localization performed using algorithms such as Region-based Convolutional Neural Networks (R-CNN), Single Shot Detection (SSD), You Only Look Once (YOLO)), the system can track locations and statuses of moving objects in the tool (e.g., robot location, robot end effector extended/retracted, LL/LPM door open/close, substrate/edge coupling ring present on EE, etc.). If there is an error in operation of an object (e.g., a robot) and if the tool stops an operation (e.g., transfer of a substrate), the system can identify tool status and can automatically take a corrective action to resume the operation if possible. The corrective action can be initiated remotely. Further, if the corrective action is manually performed at the tool, the system can identify manual intervention and prevent the tool from being remotely controlled or can coordinate manual intervention and remote control of the tool. These and other additional features of the system are described below in detail.

Throughout the following description, one or more light sources are disposed in dark areas of the tool so that the camera(s) can capture images and/or videos of the objects as described below. For example, as shown and described above with reference to FIG. 11, in areas of the tool such as load locks, where it is dark, a light source is arranged to illuminate the tool components so that the camera(s) can capture their images/videos. Various types of light sources and lighting configurations with different wavelengths can be used. For example, the tool can comprise one light source in the EFEM, one light source in each LL, and two light sources for VTM. For the LL and the VTM, the light sources are located near the cameras. For substrates with light sensitive materials, light source with appropriate wavelength is used to avoid the light from the light source affecting the substrate's outer film layer. Cameras with appropriate spectral response (visible light, near IR, IR) are used accordingly to capture high quality images and videos.

Figure 17A:
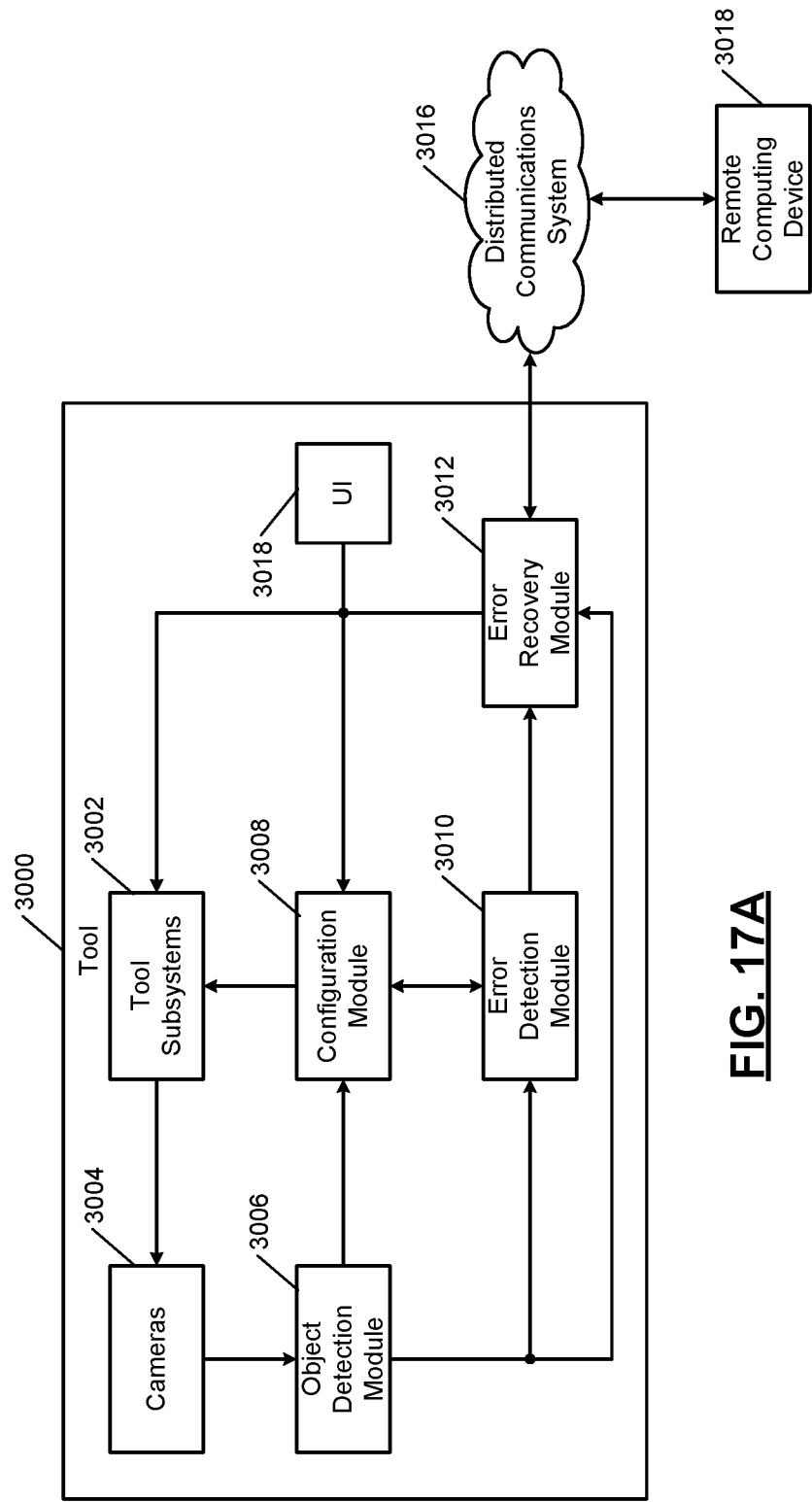
FIG. 17A shows an example of a system that is configured to perform auto-configuration and automatic error detection and error recovery in substrate processing systems shown in FIGS. 1-6C.

FIG. 17A shows a system according to certain embodiments of the present disclosure that can perform auto-configuration and automatic error detection and error recovery on a tool 3000. For example, the system may be implemented in any tool shown in FIGS. 1-6C (i.e., the tool 3000 may include any tool shown in FIGS. 1-6C). The tool 3000 comprises a plurality of subsystems 3002, a plurality of cameras 3004, light sources 3005 to illuminate objects of the subsystems 3002, an object detection module 3006, a configuration module 3008, an error detection module 3010, and an error recovery module 3012. The tool 3000 communicates with a remote computing device 3014 (e.g., element 2130 shown in FIGS. 8A-8C) via a distributed communications system 3016 (e.g., element 2010 shown in FIGS. 8A-8C).

Non-limiting examples of the subsystems 3002 include buffers, load locks (LLs)/load port modules (LPMs), robots, end effectors (EEs), equipment front end modules (EFEMs), and so on installed in the tool 3000. The cameras 3004 may be placed at various locations in the tool 3000. The number and location of the cameras 3004 may depend on the configuration of the tool 3000. For example, see FIGS. 1-6C showing various tool configurations, each of which may require different number of cameras arranged at different locations depending on the tool configuration.

Figure 17B:
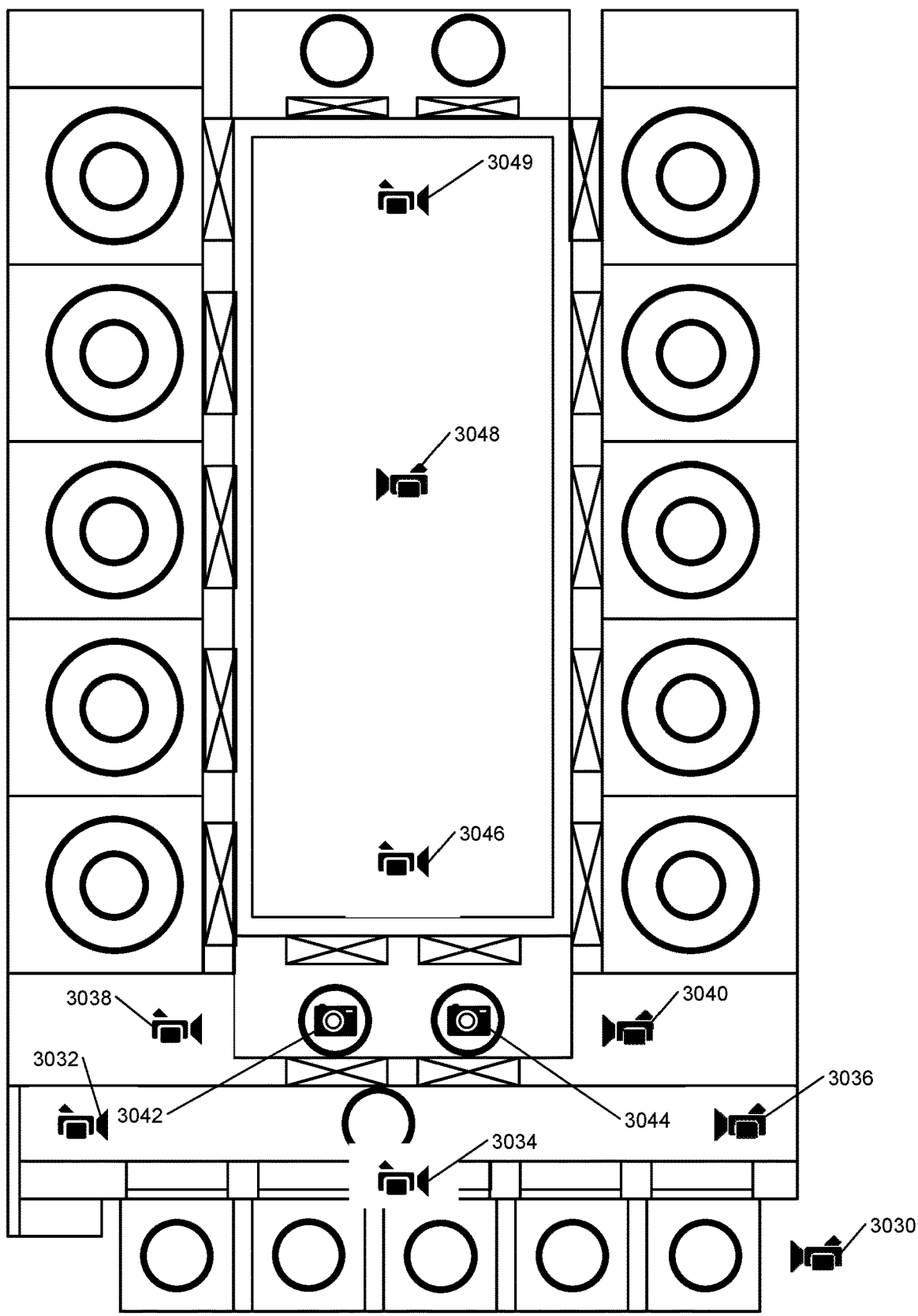
FIG. 17B shows an example of a tool used in the substrate processing system of FIG. 17A with cameras arranged at various locations in the tool.

FIG. 17B shows an example of a tool 3000 used in the system of FIG. 17A with cameras arranged at various locations in the tool. Two types of cameras are shown: first, image processing cameras; and second, video streaming and video processing cameras (called video cameras). For example, a video camera 3030 is located in a load port module (LPM) of the tool. Three video cameras 3032, 3034, and 3036 are located in an equipment front end module (EFEM) of the tool. Two video cameras 3038 and 3040 are located in an airlock (AL) of the tool. Additionally, two image processing cameras 3042 and 3044 are located in an airlock (AL) of the tool. Three video cameras 3046, 3048, and 3049 are located in a vacuum transfer module (VTM) of the tool. Various other arrangements of a different number of each type of cameras at different locations are contemplated depending on the tool configuration.

In FIG. 17A, the object detection module 3006 uses various real time video processing algorithms (described below) to detect movements of objects (e.g., the subsystems 3002 and their components) and their locations in the tool 3000 in real time. The quality of object detection performed by the object detection module 3006 depends on many factors. For example, the factors may include the type of algorithm(s) used. The factors may include capabilities (e.g., resolution) of the cameras 3004. The factors may also include the number and locations of the cameras 3004.

For example, the quality of object detection performed by the object detection module 3006 may be proportional to the number of the cameras 3004. In some tool configurations, relatively high quality of object detection can be performed with few cameras if the cameras can be placed at strategic locations in the tool (e.g., when one or more cameras can view relatively large portions of the tool). In some tool configurations, relatively large number of cameras may be needed if some of the cameras cannot be placed at strategic locations in the tool.

In some embodiments, the object detection module 3006 processes images of the subsystems 3002 and identifies the subsystems 3002. For example, the object detection module 3006 can identify how many buffers, load locks (LLs)/load port modules (LPMs), robots, end effectors (EEs), equipment front end modules (EFEMs), and so on are installed in the tool 3000. In addition, the object detection module 3006 can identify types of these subsystems 3002.

According to some embodiments, based on these identifications, the configuration module 3008 can automatically configure the tool 3000. For example, the configuration module 3008 can load software modules for operating and controlling the identified subsystems 3002. For example, the configuration module 3008 can automatically configure a user interface (UI) 3018 of the tool 3000. For example, the configuration module 3008 can automatically make some features available in drop down menus in the UI 3018 for operating and controlling the identified subsystems 3002 while making other features unavailable that are inapplicable to or are incompatible with the identified subsystems 3002. For example, depending on the identified subsystems 3002 the configuration module 3008 may automatically allow performance of only some processes/operations (e.g., processes/operations that can be performed on or using the identified subsystems 3002) while prohibiting performance of other processes (e.g., processes/operations that cannot be performed on or using the identified subsystems 3002).

According to some embodiments, the error detection module 3010 detects errors in the tool 3000 (see examples below) based on the object detection performed by the object detection module 3006 by monitoring the movements and locations of the objects (e.g., robots, substrates, edge coupling rings, doors of PMs/LLs/LPMs, etc.) in the tool 3000. The error recovery module 3012 automatically corrects some of the errors detected by the error detection module 3010. For example, the error recovery module 3012 automatically corrects only the recoverable errors detected by the error detection module 3010.

In some implementations, the error recovery module 3012 may communicate with the remote computing device 3014 via the distributed communications system 3016. The remote computing device 3014 may remotely correct some of the errors by communicating with the tool 3000 via the error recovery module 3012. During remote control of the tool 3000 by the remote computing device 3014, manual intervention in the tool 3000 can be disabled by the configuration module 3008. Conversely, if an error requires manual intervention, the remote control of the tool 3000 by the remote computing device 3014 can be disabled for the safety of the service person servicing the tool 3000. The cameras 3004 can detect the presence of manual intervention (e.g., a service person's body part) in the tool 3000, and the configuration module 3008 can disable the remote control of the tool 3000 by the remote computing device 3014 to ensure the safety of the service person. In some implementations, using the UI 3018, the service person may be able to coordinate error correction by manual intervention as well as by the remote computing device 3014.

The following are some non-limiting examples of error detection and error recovery performed by the error detection module 3010 and the error recovery module 3012. For example, due to unsuccessful de-chucking of a substrate in a process module (PM) in the tool 3000, or due to a lift pin malfunction in the PM, the substrate may be off-center on the substrate support (ESC) in the PM. When the VTM robot enters the PM to remove the substrate, the dynamic alignment (DA) sensors in the PM may detect an offset that is outside a specified range. Accordingly, the tool 3000 can generate or indicate an error, and the VTM robot stops movement of the substrate to avoid the substrate from colliding against walls/doors of the PM.

In the above example, based on data received from the cameras 3004 monitoring the VTM robot, the object detection module 3006 identifies the tool state including the robot location, the robot end effector (EE) location, and the state of the PM door (open/close). If the cameras 3004 identify that the PM door is open and the substrate is still on the EE, the error detection module 3010 identifies the error, and the error recovery module 312 causes the robot to re-enter the PM, place the substrate on the lift pins, and pick up the substrate again with a new correct offset calculated by the DA sensors. This recovery procedure is currently performed manually and requires a service person to be present at the tool 3000. Further, the procedure may require opening the VTM or PM, which increases man hour cost and down time for tool operation. Instead, by automatically correcting the error, the system shown in FIG. 17A removes the need to open the PM, which reduces the man hour cost and down time.

In another example, when the VTM robot places a processed substrate into an airlock in the tool 3000, if the temperature of the substrate is too high and/or if the EE pads are sticky, the substrate may not be placed on the airlock fingers properly. As a result, the substrate may slide and hang from the airlock fingers. If the airlock doors close, the substrate may get stuck in between the airlock door and may get damaged. Alternatively, when the ATM robot enters into the airlock to pick up the substrate, if the substrate is cross slotted, the EE may damage the wafer.

In the above example, based on data received from the cameras 3004, the object detection module 3006 can detect improper substrate placement and can identify the substrate center and plane. The error detection module 3010 detects an error due to the improper substrate placement. The error recovery module 3012 communicates the substrate center and plane to the robot. The robot finds a path in X/Y/Z coordinates to pick up the substrate if possible in a live closed-loop manner. Alternatively, this operation can be performed remotely using the remote computing device 3014 by jogging the robot slowly in the right direction while watching the live video stream received from the error recovery module 3012. This obviates the need for a service person to be present at the tool 3000, removes the need to open the LL, and reduces tool down time and labor cost.

In some embodiments, the error detection module 3010, the error recovery module 3012, and the configuration module 3008 can respond to errors in other ways depending on the type of error. For example, if an error for a subsystem 3002 is irrecoverable (e.g., if a replacement part is needed and the part is unavailable), the configuration module 3008 can temporarily disable the subsystem 3002. For example, the configuration module 3008 can disable the menu selections for the subsystem 3002 in the UI 3018. For example, the configuration module 3008 may alter the processing sequence of the substrates so as to avoid the subsystem 3002. For example, the configuration module 3008 may shut down the subsystem 3002 to avoid its inadvertent use until it is serviced.

Figure 17D:
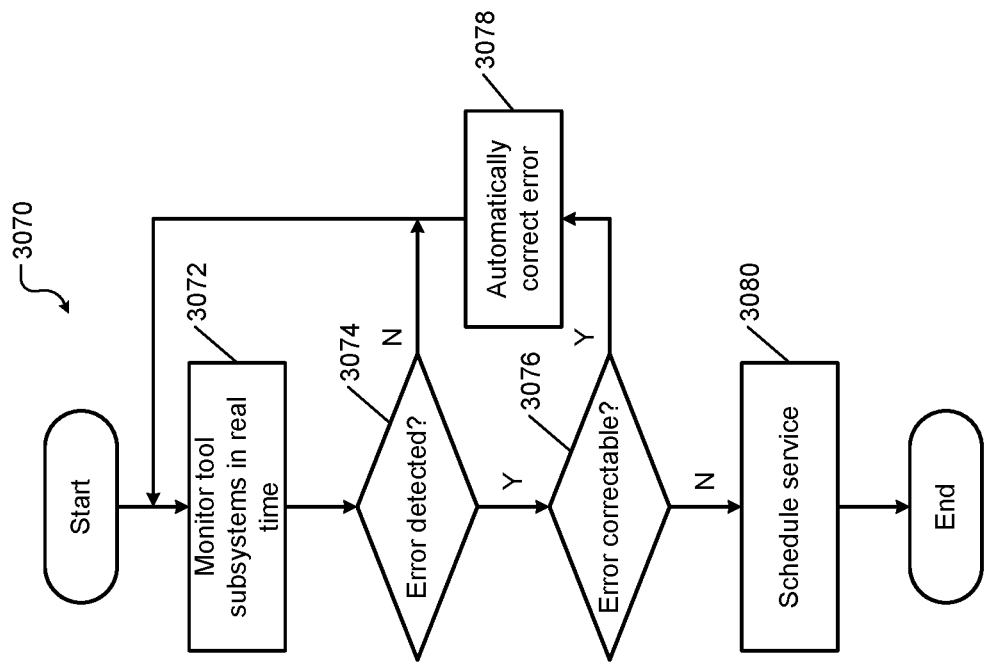
FIG. 17D shows a flowchart of an example method for performing automatic error recovery in a substrate processing system using the system of FIG. 17A.
Figure 17C:
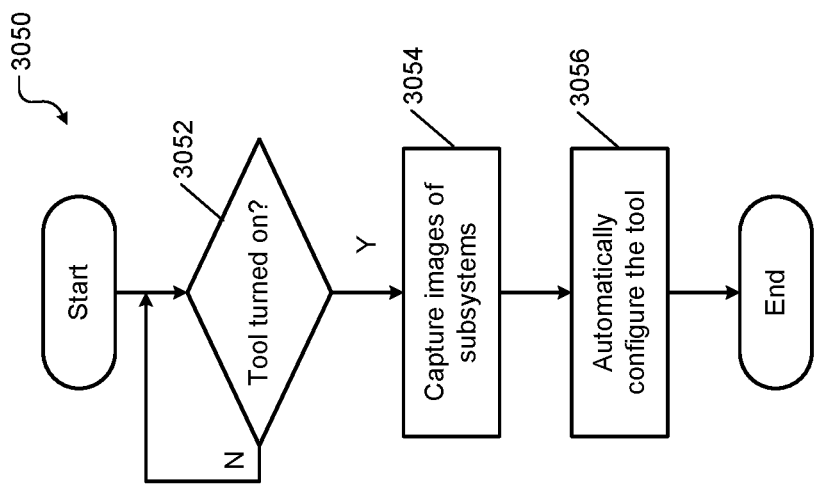
FIG. 17C shows a flowchart of an example method for performing auto-configuration of a substrate processing system using the system of FIG. 17A.

FIG. 17C shows a method 3050 for automatically configuring a tool according to certain embodiments of the present disclosure. For example, the system shown in FIG.

17A can perform the method 3050 as follows. At 3052, the method 3050 determines if power to the tool 3000 is turned on. If power to the tool 3000 is turned on, at 3054, the method 3050 captures images of the subsystems 3002 of the tool 3000 using the cameras 3004 installed at various locations in the tool 3000. At 3056, the method 3050 automatically configures the tool 3000 based on the subsystems 3002 detected by the cameras 3004 as explained in detail above with reference to FIG. 17A.

FIG. 17D shows a method 3070 for automatically correcting errors detected in a tool according to certain embodiments of the present disclosure. For example, the system shown in FIG. 17A can perform the method 3070 as follows. At 3072, the method 3070 monitors the subsystems 3002 of the tool 3000 in real time using cameras 3004 installed at various locations in the tool 3000. At 3074, the method 3070 determines if an error is detected in the tool 300 (e.g., using the cameras 3004, the object detection module 3006, and the error detection module 3010 as explained in detail above with reference to FIG. 17A). The method 3070 continues to monitor the subsystems 3002 of the tool 3000 in real time using cameras 3004 if no error is detected.

If an error is detected at 3076, the method 3070 determines if the error is correctable automatically without manual intervention. If the error is correctable automatically without manual intervention, at 3078, the method 3070 automatically corrects the error as explained in detail above with reference to FIG. 17A. If the error is not correctable automatically, at 3080, the method 3070 schedules/requests a service (e.g., notifies the tool operator via the UI 3018.)

FIG. 10B shows a stereo image processing system using at least two cameras 2200 and 2201. As explained below with reference to FIGS. 18A-18E, in some implementations, stereo image processing using a single camera (e.g., 2200 or 2201) can be used to create a 3D point cloud of an edge coupling ring's thickness profile. For example, a single camera (2200 or 2201) can be used to capture one or more images of the edge coupling ring 2314 (shown in FIG. 10B). Then, using stereo image processing techniques, a 3D point cloud of the edge coupling ring's thickness profile can be created from the images captured by the camera.

A 3D point cloud is a set of data points of an object (e.g., the edge coupling ring 2314 in FIG. 10B) or a portion thereof in space. According to some embodiments, the 3D point cloud is produced by measuring many points on external surfaces of the edge coupling ring 2314. The 3D point cloud can be directly analyzed or can be converted into a mesh, a surface model, or a 3D model. The 3D point cloud can then be aligned to a model of the edge coupling ring 2314 that was generated when the edge coupling ring 2314 was new (i.e., had no erosion) and compared to determine differences. The amount of erosion of the edge coupling ring 2314 can be determined based on the differences. For example, the differences can indicate changes in dimensions such as thickness reduction in the edge coupling ring 2314 due to erosion.

The 3D point clouds can also be used to represent volumetric data of the edge coupling ring 2314, which can then be used to determine thickness reduction in the edge coupling ring 2314 due to erosion. The image processor 2408 of the computer vision system 2400 described with reference to FIG. 11 can perform the stereo image processing including the 3D point cloud generation, the thickness profile generation based on the point cloud data, and the analysis of the edge coupling ring's thickness profile to assess the amount of erosion of the edge coupling ring 2314.

Figure 18A:
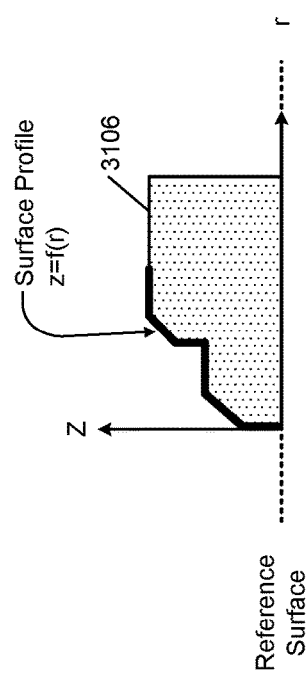
FIGS. 18A-18D show an example of a system for performing stereo image processing using a single camera according to certain features of the present disclosure.

FIG. 18A shows an example of a system 3100 for performing stereo image processing using a single camera according to certain embodiments. The system 3100 creates a 3D point cloud of an edge coupling ring using only one camera. In some embodiments, a robot moves the edge coupling ring in the load lock, and a single camera in the load lock takes one image of the edge coupling ring. Then the robot moves the edge coupling ring by a predetermined distance, and the camera takes another image of the edge coupling ring. Then an image processor performs triangulation using these two images to calculate the 3D point cloud. The robot can additionally move the edge coupling by the predetermined distance, and after each movement, the camera can take additional images for point cloud calculations, which can increase the accuracy of the measurement.

Figure 18B:
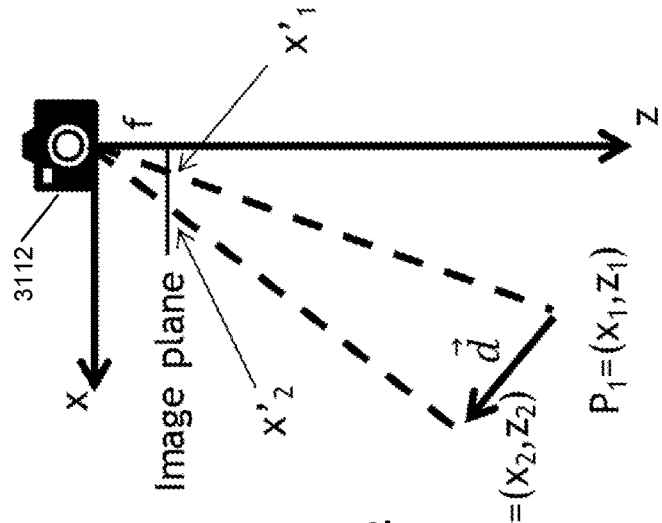
Figure 18C:
Figure 18D:
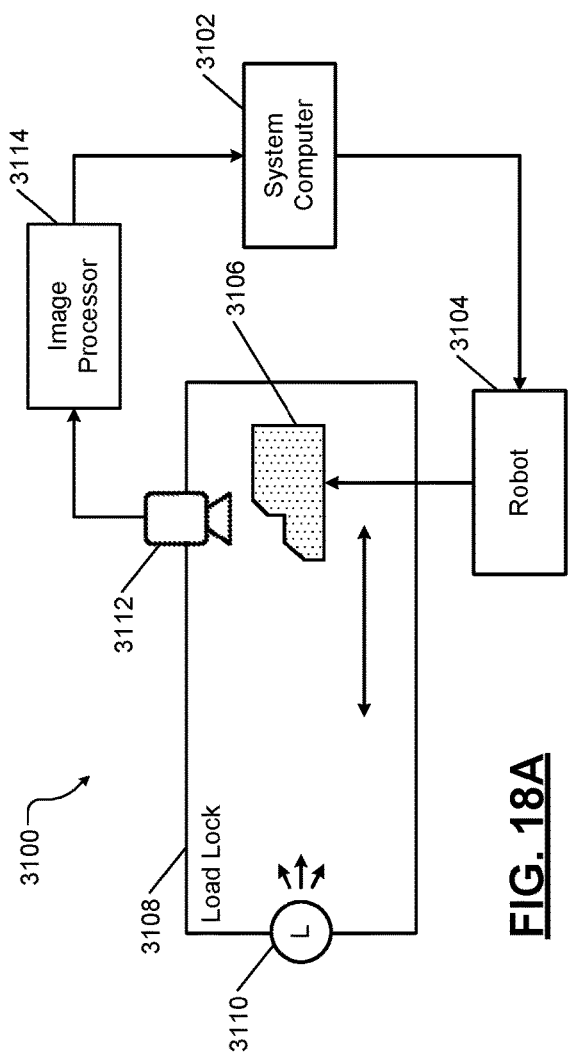

In the example shown, the system 3100 comprises a system computer 3102 that controls a robot 3104. The robot 3104 moves an edge coupling ring 3106 in a load lock 3108. A light source 3110 illuminates the edge coupling ring 3106. A single camera 3112 captures images of the edge coupling ring 3106 each time the robot 3104 moves the edge coupling ring 3106 by a predetermined distance as shown in FIG. 18B. An image processor 3114 coupled to the camera 3112 processes the images using triangulation as shown in FIG. 18C to calculate a 3D point cloud. The image processor 3114 generates a surface profile (i.e., a thickness profile) of the edge coupling ring 3106 as shown in FIG. 18D based on the 3D point cloud. The image processor 3114 performs stereo image processing including the 3D point cloud generation using the triangulation, the thickness profile generation based on the 3D point cloud data, and the analysis of the edge coupling ring's thickness profile to assess the amount of erosion of the edge coupling ring 3106. In some embodiments, the image processor 3114 and the camera 3112 can be similar to the image processor 2408 and the camera 2402 of the computer vision system 2400 shown in FIG. 11. In some implementations, the system computer 3102 may include an edge computing device.

FIG. 18D shows that the surface profile z of the edge coupling ring 3106 can be described as a function of the radius r of the edge coupling ring 3106 using the equation $z=f(r)$. FIG. 18B shows that the edge coupling ring 3106 is moved by a predetermined distance d1 from x1 to x2 along the x-axis. $P1=(x1, z1)$ and $P2=(x2, z2)$ respectively represent two points on the edge coupling ring 3106 captured by the camera 3112. $x1'$ and $x2'$ are projections of those points on an image sensor in the camera 3112 along the x-axis. The image sensor is generally shown by the line with $x1'$ and $x2'$. FIG. 18C shows the triangulation performed by the image processor 3114 using the data P1 and P2.

Figure 18E:
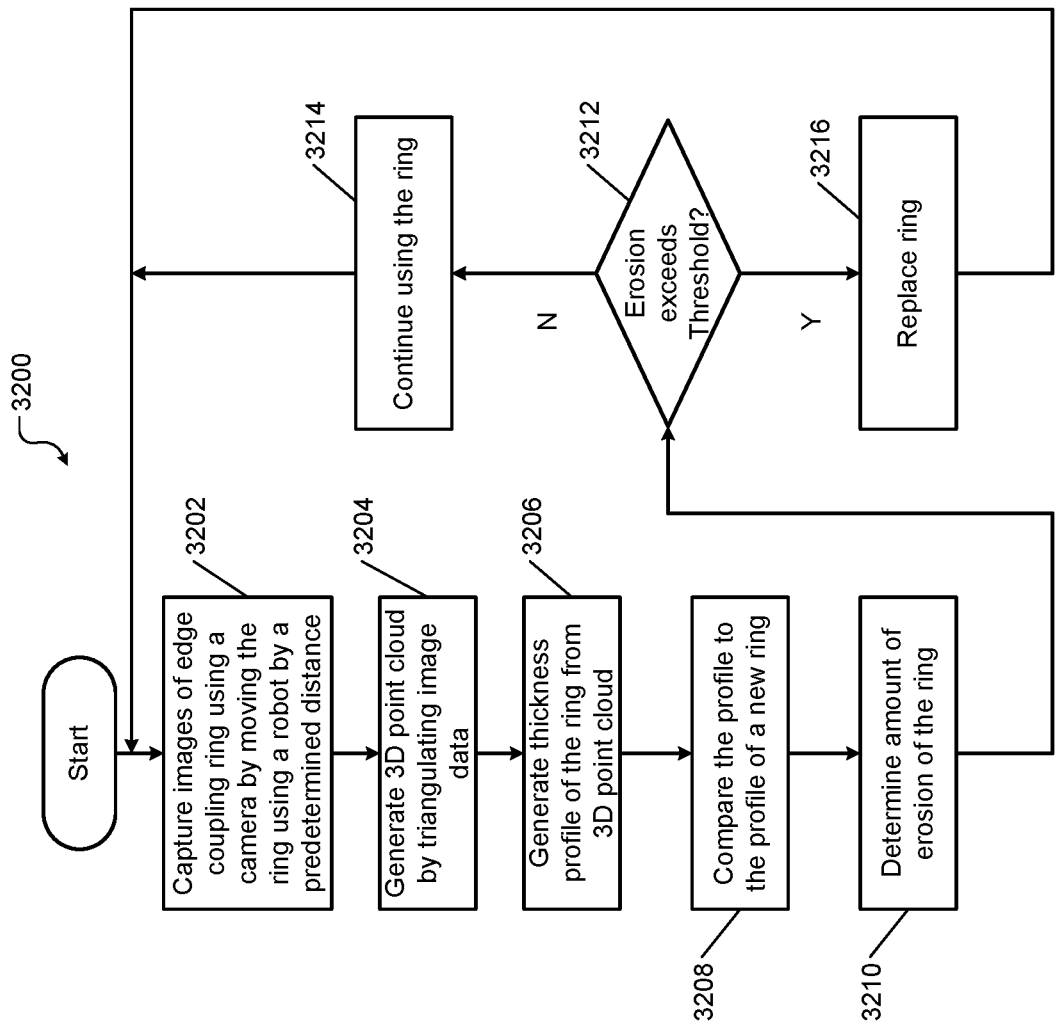
FIG. 18E shows a flowchart of an example method for performing stereo image processing using a single camera according to certain features of the present disclosure.

FIG. 18E shows a method 3200 of performing stereo image processing using a single camera (e.g., the camera 3112 shown in FIG. 18A) according to some embodiments. The method 3200 can be used to create a 3D point cloud of an edge coupling ring's thickness profile. For example, the method 3200 can be performed by the image processor 3114 and the camera 3112 shown in FIG. 18A, or by the image processor 2408 and the camera 2402 of the computer vision system 2400 shown in FIG. 11.

At 3202, the method 3200 captures images of the edge coupling ring 3106 using the camera 3112 by moving the edge coupling ring 3106 using the robot 3104 by a predetermined distance as shown in FIG. 18B and as described above. At least two images are captured at different locations. At 3204, the method 3200 generates a 3D point cloud by triangulating the data from the images captured by the camera 3112 as shown in FIG. 18C and as described above.

At 3206, the method 3200 generates a thickness profile of the edge coupling ring 3106 as shown in FIG. 18D and as described above.

At 3208, the method 3200 compares the thickness profile to a prior thickness profile of the edge coupling ring 3106 when the edge coupling ring 3106 was new, which was also generated using the same technique. At 3210, the method 3200 determines an amount of erosion of the edge coupling ring 3106 based on the comparison.

At 3212, the method 3200 determines if the amount of erosion of the edge coupling ring 3106 is greater than or equal to a predetermined threshold. If the amount of erosion of the edge coupling ring 3106 is not greater than or equal to the predetermined threshold, at 3214, the method 3200 continues using the edge coupling ring 3106, and the method returns to 3102. If the amount of erosion of the edge coupling ring 3106 is greater than or equal to the predetermined threshold, at 3216, the method 3200 determines that the edge coupling ring 3106 should be replaced with a new edge coupling ring, and the method returns to 3202 after the replacement.

The foregoing description is merely illustrative in nature and is not intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure.

Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements.

As used herein, the phrase at least one of A, B, and C should be construed to mean a logical (A OR B OR C), using a non-exclusive logical OR, and should not be construed to mean "at least one of A, at least one of B, and at least one of C."

In some implementations, a controller is part of a system, which may be part of the above-described examples. Such systems can comprise semiconductor processing equipment, including a processing tool or tools, chamber or chambers, a platform or platforms for processing, and/or specific processing components (a wafer pedestal, a gas flow system, etc.). These systems may be integrated with electronics for controlling their operation before, during, and after processing of a semiconductor wafer or substrate.

The electronics may be referred to as the "controller," which may control various components or subparts of the system or systems. The controller, depending on the processing requirements and/or the type of system, may be programmed to control any of the processes disclosed herein, including the delivery of processing gases, temperature settings (e.g., heating and/or cooling), pressure settings, vacuum settings, power settings, radio frequency (RF) generator settings, RF matching circuit settings, frequency settings, flow rate settings, fluid delivery settings, positional and operation settings, wafer transfers into and out of a tool and other transfer tools and/or load locks connected to or interfaced with a specific system.

Broadly speaking, the controller may be defined as electronics having various integrated circuits, logic, memory, and/or software that receive instructions, issue instructions, control operation, enable cleaning operations, enable endpoint measurements, and the like. The integrated circuits may include chips in the form of firmware that store program instructions, digital signal processors (DSPs), chips defined as application specific integrated circuits (ASICs), and/or one or more microprocessors, or microcontrollers that execute program instructions (e.g., software).

The program instructions may be instructions communicated to the controller in the form of various individual settings (or program files), defining operational parameters for carrying out a particular process on or for a semiconductor wafer or to a system. The operational parameters may, in some embodiments, be part of a recipe defined by process engineers to accomplish one or more processing steps during the fabrication of one or more layers, materials, metals, oxides, silicon, silicon dioxide, surfaces, circuits, and/or dies of a wafer.

The controller, in some implementations, may be a part of or coupled to a computer that is integrated with the system, coupled to the system, otherwise networked to the system, or a combination thereof. For example, the controller may be in the "cloud" or all or a part of a fab host computer system, which can allow for remote access of the wafer processing. The computer may enable remote access to the system to monitor current progress of fabrication operations, examine a history of past fabrication operations, examine trends or performance metrics from a plurality of fabrication operations, to change parameters of current processing, to set processing steps to follow a current processing, or to start a new process.

In some examples, a remote computer (e.g. a server) can provide process recipes to a system over a network, which may include a local network or the Internet. The remote computer may include a user interface that enables entry or programming of parameters and/or settings, which are then communicated to the system from the remote computer. In some examples, the controller receives instructions in the form of data, which specify parameters for each of the processing steps to be performed during one or more operations. It should be understood that the parameters may be specific to the type of process to be performed and the type of tool that the controller is configured to interface with or control.

Thus as described above, the controller may be distributed, such as by comprising one or more discrete controllers that are networked together and working towards a common purpose, such as the processes and controls described herein. An example of a distributed controller for such purposes would be one or more integrated circuits on a chamber in communication with one or more integrated circuits located remotely (such as at the platform level or as part of a remote computer) that combine to control a process on the chamber.

Without limitation, example systems may include a plasma etch chamber or module, a deposition chamber or module, a spin-rinse chamber or module, a metal plating chamber or module, a clean chamber or module, a bevel edge etch chamber or module, a physical vapor deposition (PVD) chamber or module, a chemical vapor deposition (CVD) chamber or module, an atomic layer deposition (ALD) chamber or module, an atomic layer etch (ALE) chamber or module, an ion implantation chamber or module, a track chamber or module, and any other semiconductor processing systems that may be associated or used in the fabrication and/or manufacturing of semiconductor wafers.

As noted above, depending on the process step or steps to be performed by the tool, the controller might communicate with one or more of other tool circuits or modules, other tool components, cluster tools, other tool interfaces, adjacent tools, neighboring tools, tools located throughout a factory, a main computer, another controller, or tools used in material transport that bring containers of wafers to and from tool locations and/or load ports in a semiconductor manufacturing factory.

What is claimed is:

1. A substrate processing system comprising:
   a processor; and
   a memory storing instructions for execution by the processor to:
     process an image captured by a camera of at least one of a substrate and a component of the substrate processing system, wherein the component is associated with transporting the substrate between processing chambers of the substrate processing system or between the substrate processing system and a second substrate processing system, and wherein the camera is located along a travel path of the substrate in the substrate processing system between the processing chambers;
     transmit first data from the image to a remote server via a network; and
     receive second data from the remote server via the network in response to transmitting the first data to the remote server;
   wherein in response to the image being of the component and the component being an edge coupling ring associated with the substrate received from one of the processing chambers, the second data includes:
     an indication that a serial number of the edge coupling ring is incorrect;
     an indication that a problem associated with processing the substrate is due to the serial number of the edge coupling ring being incorrect; and
     a recommendation to replace the edge coupling ring with another edge coupling ring with a correct serial number for the one of the processing chambers; and
   wherein the instructions further cause the processor to:
     generate a schedule for replacing the edge coupling ring with the other edge coupling ring with the correct serial number for the one of the processing chambers in response to the second data including the recommendation; and
     operate the substrate processing system according to the schedule.

2. The system of claim 1 wherein in response to the image being of the component and the component including a pad located in a load lock of the substrate processing system, the pad being used to support the substrate, an edge coupling ring associated with the substrate, or a robot transporting the substrate, the second data includes one or more of:
   an indication of a condition of the pad; and
   a recommendation regarding one or more of service and replacement of the pad; and
   wherein the instructions further cause the processor to generate a schedule for one or more of servicing and replacing the pad in response to the second data including the recommendation regarding one or more of service and replacement of the pad.

3. The system of claim 1 wherein in response to the image being of the substrate and the substrate being used during cleaning of one of the processing chambers in the substrate processing system, the second data includes one or more of:
   an indication that the substrate is of a type that is used during cleaning of the one of the processing chambers in the substrate processing system;
   an indication of a condition of the substrate;
   a recommendation regarding replacement of the substrate; and
   a recommendation regarding selecting a recipe in the one of the processing chambers; and
   wherein the instructions further cause the processor to select the recipe in the one of the processing chambers in response to the second data including the recommendation regarding selecting the recipe.

4. The system of claim 1 wherein in response to the image being of the substrate, the second data includes one or more of:
   an indication of a type of the substrate; and
   an indication for selecting a recipe for processing the substrate; and
   wherein the instructions further cause the processor to select the recipe for processing the substrate in response to the second data including the indication regarding selecting the recipe.

5. The system of claim 1 wherein in response to the image being of the substrate, the second data includes one or more of:
   an indication of a type of the substrate;
   an indication of a process performed on the substrate in one of the processing chambers;
   an indication of a condition of the one of the processing chambers that processed the substrate; and
   an indication for selecting a recipe for cleaning the one of the processing chambers that processed the substrate; and
   wherein the instructions further cause the processor to:
     schedule service for the one of the processing chambers in response to the second data including the indication of the condition of the one of the processing chambers; and
     select the recipe for cleaning the one of the processing chambers that processed the substrate in response to the second data including the indication regarding selecting the recipe.

6. The system of claim 1 wherein in response to the image being of the substrate captured by the camera located in a load lock of the substrate processing system, the second data includes one or more of:
   an indication of a drift in placement of the substrate in the load lock by a robot transporting the substrate from one of the processing chambers that processed the substrate; and a recommendation regarding servicing the robot or the one of the processing chambers that processed the substrate; and wherein the instructions further cause the processor to:

generate a schedule for servicing the robot in response to the second data including the recommendation regarding servicing the robot; and perform an adjustment in the one of the processing chambers relating to releasing the substrate to the robot in response to the second data including the recommendation regarding servicing the one of the processing chambers that processed the substrate.

7. The system of claim 1 wherein in response to the image being of the component and the component being an edge coupling ring associated with the substrate received from one of the processing chambers, the second data includes one or more of:

an indication of an etch rate in the one of the processing chambers; and an indication of an adjustment for a recipe used in the one of the processing chambers; and wherein the instructions further cause the processor to adjust the recipe used in the one of the processing chambers in response to the second data including the indication regarding the adjustment.

8. A substrate processing system comprising:

a processor; and a memory storing instructions for execution by the processor to:

process an image captured by a camera of at least one of a substrate and a component of the substrate processing system, wherein the component is associated with transporting the substrate between processing chambers of the substrate processing system or between the substrate processing system and a second substrate processing system, and wherein the camera is located along a travel path of the substrate in the substrate processing system between the processing chambers;

transmit first data from the image to a remote server via a network; and receive second data from the remote server via the network in response to transmitting the first data to the remote server;

wherein in response to the image being of the component and the component being an edge coupling ring associated with the substrate received from one of the processing chambers, the second data includes:

an indication to adjust at least one of the edge coupling ring and a recipe used in the one of the processing chambers in response to the edge coupling ring being correct for the one of the processing chambers, the processing chambers using the same recipe, and the edge coupling ring exhibiting a different change than edge coupling rings in other processing chambers in the substrate processing system; and wherein the instructions further cause the processor to;

adjust at least one of the edge coupling ring and the recipe used in the one of the processing chambers; and operate the substrate processing system according to the adjusted at least one of the edge coupling ring and the recipe used in the one of the processing chambers.

9. A system comprising:

a processor; and a memory storing instructions for execution by the processor to:

receive, via a network, data from an image captured by a camera of at least one of a substrate and a component of a substrate processing system, wherein the component is associated with transporting the substrate between processing chambers of the substrate processing system or between the substrate processing system and a second substrate processing system, and wherein the camera is located along a travel path of the substrate in the substrate processing system between the processing chambers;

input a portion of the data to a model trained to provide an output useful for operating the substrate processing system; and transmit the output from the model to the substrate processing system via the network;

wherein in response to the image being of the component and the component being an edge coupling ring associated with the substrate received from one of the processing chambers, the output of the model includes:

an indication to adjust at least one of the edge coupling ring and a recipe used in the one of the processing chambers in response to the edge coupling ring being correct for the one of the processing chambers, the processing chambers using the same recipe, and the edge coupling ring exhibiting more change than edge coupling rings in other processing chambers in the substrate processing system.

10. The system of claim 9 wherein in response to the image being of the component and the component including a pad located in a load lock of the substrate processing system, the pad being used to support the substrate, an edge coupling ring associated with the substrate, or a robot transporting the substrate, the output of the model indicates a condition of the pad and includes a recommendation regarding one or more of service and replacement of the pad.

11. The system of claim 9 wherein in response to the image being of the substrate and the substrate being used during cleaning of one of the processing chambers in the substrate processing system, the output of the model includes one or more of:

an indication that the substrate is of a type that is used during cleaning of the one of the processing chambers in the substrate processing system;

an indication of a condition of the substrate;

a recommendation regarding replacement of the substrate; and a recommendation regarding selecting a recipe in the one of the processing chambers.

12. The system of claim 9 wherein in response to the image being of the substrate, the output of the model includes one or more of:

an indication of a type of the substrate; and an indication for selecting a recipe for processing the substrate.

13. The system of claim 9 wherein in response to the image being of the substrate, the output of the model includes one or more of:

an indication of a type of the substrate;

an indication of a process performed on the substrate in one of the processing chambers;

an indication of a condition of the one of the processing chambers that processed the substrate; and an indication for selecting a recipe for cleaning the one of the processing chambers that processed the substrate.

14. The system of claim 9 wherein in response to the image being of the substrate captured by the camera located in a load lock of the substrate processing system, the output of the model includes one or more of:

an indication of a drift in placement of the substrate in the load lock by a robot transporting the substrate from one of the processing chambers that processed the substrate; and a recommendation regarding servicing the robot or the one of the processing chambers that processed the substrate.

15. The system of claim 9 wherein in response to the image being of the component and the component being an edge coupling ring associated with the substrate received from one of the processing chambers, the output of the model includes one or more of:

a serial number of the edge coupling ring; and a recommendation regarding replacing the edge coupling ring with a second edge coupling ring having a correct serial number for the one of the processing chambers.

16. The system of claim 9 wherein in response to the image being of the component and the component being an edge coupling ring associated with the substrate received from one of the processing chambers, the output of the model includes one or more of:

an indication that the edge coupling ring is incorrect;

an indication that a problem associated with processing the substrate is due to the edge coupling ring being incorrect; and a recommendation to replace the edge coupling ring with a correct edge coupling ring for the one of the processing chambers.

17. The system of claim 9 wherein in response to the image being of the component and the component being an edge coupling ring associated with the substrate received from one of the processing chambers, the output of the model includes one or more of:

an indication of an etch rate in the one of the processing chambers; and an indication of an adjustment for a recipe used in the one of the processing chambers.

18. A system comprising:

a processor; and a memory storing instructions for execution by the processor to:

receive a first image of an edge coupling ring captured by a single camera arranged in a substrate processing system;

move the edge coupling ring by a predetermined distance using a robot;

receive a second image of the edge coupling ring captured by the single camera after the robot moves the edge coupling ring by the predetermined distance;

perform triangulation using the first and second images to generate a three-dimensional point cloud representing a thickness profile of the edge coupling ring;

determine an amount of erosion of the edge coupling ring based on the thickness profile;

determine whether the amount of erosion is greater than or equal to a predetermined threshold; and operate the robot to replace the edge coupling ring in response to the amount of erosion being greater than or equal to the predetermined threshold.

19. The system of claim 18 wherein the instructions cause the processor to determine the predetermined threshold based on the thickness profile to a prior thickness profile generated from a prior three-dimensional point cloud created when the edge coupling ring is first installed in the substrate processing system.

* * * * *